(12) United States Patent
Fukushima et al.

(10) Patent No.: US 10,625,782 B2
(45) Date of Patent: Apr. 21, 2020

(54) SURROUNDINGS MONITORING APPARATUS

(71) Applicant: AISIN SEIKI KABUSHIKI KAISHA, Kariya-shi, Aichi-ken (JP)

(72) Inventors: Itsuko Fukushima, Nagoya (JP); Kazuya Watanabe, Anjo (JP); Kinji Yamamoto, Anjo (JP); Tetsuya Maruoka, Okazaki (JP); Takayuki Nakasho, Anjo (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

(21) Appl. No.: 16/149,338

(22) Filed: Oct. 2, 2018

(65) Prior Publication Data

US 2019/0100245 A1    Apr. 4, 2019

(30) Foreign Application Priority Data

Oct. 3, 2017 (JP) .................................. 2017-193649
Oct. 10, 2017 (JP) ................................ 2017-197230

(51) Int. Cl.
| | |
|---|---|
| *B62D 15/02* | (2006.01) |
| *B62D 13/06* | (2006.01) |
| *B60W 50/08* | (2020.01) |
| *B60W 50/14* | (2020.01) |
| *B60R 11/04* | (2006.01) |
| *B60R 1/00* | (2006.01) |

(52) U.S. Cl.
CPC ............ *B62D 15/0275* (2013.01); *B60R 1/00* (2013.01); *B60R 11/04* (2013.01); *B60W 50/085* (2013.01); *B60W 50/14* (2013.01);
*B62D 13/06* (2013.01); *B60W 2050/146* (2013.01); *B60W 2300/14* (2013.01)

(58) Field of Classification Search
CPC ...... B62D 15/0275; B62D 13/06; B60R 11/04; B60W 50/085; B60W 50/14; B60W 2050/146; B60W 2300/14
USPC ....................................................... 340/932.2
See application file for complete search history.

(56) References Cited

U.S. PATENT DOCUMENTS 8,044,776 B2 * 10/2011 Schofield ............ B60C 23/0408
                                                   340/425.5
2010/0171828 A1 * 7/2010 Ishii ........................... B60R 1/00
                                                         348/135

(Continued)

FOREIGN PATENT DOCUMENTS

JP    2008-149764 A    7/2008

*Primary Examiner* — Omar Casillashernandez
(74) *Attorney, Agent, or Firm* — Sughrue Mion, PLLC

(57) ABSTRACT

A surroundings monitoring apparatus according to embodiments, as an example, includes a control unit causing a display device to display a display image where an indicator which indicates a towed vehicle coupled to a towing vehicle is superimposed on a vehicle surrounding image including the towing vehicle and surroundings of the towing vehicle based on a captured image obtained by being imaged by an imaging unit which images the surroundings of the towing vehicle, the control unit acquiring towed vehicle information related to the towed vehicle and changing a display mode of the indicator based on the towed vehicle information. Thus, according to the surroundings monitoring apparatus of the embodiments, the towed vehicle may be easily imagined from the display image.

8 Claims, 30 Drawing Sheets

(56) References Cited

U.S. PATENT DOCUMENTS

| | | | |
|---|---|---|---|
| 2013/0321634 A1* | 12/2013 | Okano | B60R 1/00 |
| | | | 348/148 |
| 2014/0324295 A1* | 10/2014 | Lavoie | B60R 1/003 |
| | | | 701/41 |
| 2016/0023526 A1* | 1/2016 | Lavoie | B60D 1/305 |
| | | | 701/41 |
| 2016/0264052 A1* | 9/2016 | Lynam | B60K 35/00 |
| 2017/0151846 A1* | 6/2017 | Wuergler | B60D 1/62 |
| 2017/0217368 A1* | 8/2017 | Lewis | B60R 1/00 |
| 2017/0280091 A1* | 9/2017 | Greenwood | H04N 5/23238 |
| 2018/0061102 A1* | 3/2018 | Goto | B60D 1/36 |
| 2019/0162545 A1* | 5/2019 | Greenwood | G01C 21/3407 |
| 2019/0166338 A1* | 5/2019 | Greenwood | H04N 9/3185 |

* cited by examiner

C=1000mm

C=2000mm

C=3000mm

C=4000mm

SURROUNDINGS MONITORING APPARATUS

CROSS REFERENCE TO RELATED APPLICATIONS

This application is based on and claims priority under 35 U.S.C. § 119 to Japanese Patent Application 2017-193649, filed on Oct. 3, 2017, and Japanese Patent Application 2017-197230, filed on Oct. 10, 2017, the entire contents of which are incorporated herein by reference.

TECHNICAL FIELD

This disclosure relates to a surroundings monitoring apparatus.

BACKGROUND DISCUSSION

A technique is developed in which an overhead view image of a towing vehicle and a towed vehicle viewed from above on a basis of a captured image obtained by imaging surroundings of the towing vehicle by an imaging unit is displayed on a display device (see JP2008-149764A, for example).

Unless the towed vehicle is taken into consideration upon generating the image which is displayed on the display device based on the captured image, the image may be generated so that circumstances related to the towed vehicle is difficult to be imagined.

A need thus exists for a surroundings monitoring apparatus which is not susceptible to the drawback mentioned above.

SUMMARY

A surroundings monitoring apparatus according to embodiments, as an example, includes a control unit causing a display device to display a display image where an indicator which indicates a towed vehicle coupled to a towing vehicle is superimposed on a vehicle surrounding image including the towing vehicle and surroundings of the towing vehicle based on a captured image obtained by being imaged by an imaging unit which images the surroundings of the towing vehicle, the control unit acquiring towed vehicle information related to the towed vehicle and changing a display mode of the indicator based on the towed vehicle information. Thus, according to the surroundings monitoring apparatus of the embodiments, the towed vehicle may be easily imagined from the display image.

In addition, the surroundings monitoring apparatus according to the embodiment, as an example, includes am image acquiring portion which acquires the plural captured images including the rear-side an image acquiring portion acquiring a plurality of captured images which includes a rear-side captured image imaging a rear side of a towing vehicle which tows a towed vehicle, a left-side captured image imaging a left side of the towing vehicle and a right-side captured image imaging a right side of the towing vehicle, a captured image selecting portion selecting any of the plurality of captured images based on a connection angle serving as an angle of the towed vehicle relative to the towing vehicle or a type of the towed vehicle during a backward driving of the towing vehicle, and a display image generating portion generating a display image including a surrounding image generated from the selected captured image.

DETAILED DESCRIPTION

Embodiments disclosed here are explained with reference to the attached drawings. Configurations of the embodiments described below, and operations, results, and effects brought about by the configurations are examples. The invention may be realized by a configuration other than the configurations disclosed in the following embodiments and at least one of various effects based on the basic configuration and derived effects may be obtained.

A towing vehicle at which a surroundings monitoring apparatus according to the present embodiment is mounted may be an automobile (internal combustion engine automobile) using an internal combustion engine (engine) as a driving source, an automobile (electric automobile, fuel cell automobile, or the like) using an electric motor (motor) as a driving source, or an automobile (hybrid automobile) using both the engine and the motor as a driving source. The towing vehicle may be a Sport Utility Vehicle (SUV) or a so-called "pickup truck" in which a loading platform is provided at a rear side of the vehicle. In addition, the towing vehicle may be a general passenger car. Further, various transmission devices, various devices (systems, parts, or the like) necessary for driving the internal combustion engine or the electric motor may be mounted at the towing vehicle. A type, the number, a layout, and the like of the devices related to driving of vehicle wheels in the towing vehicle may be variously set.

First Embodiment

Figure 1:
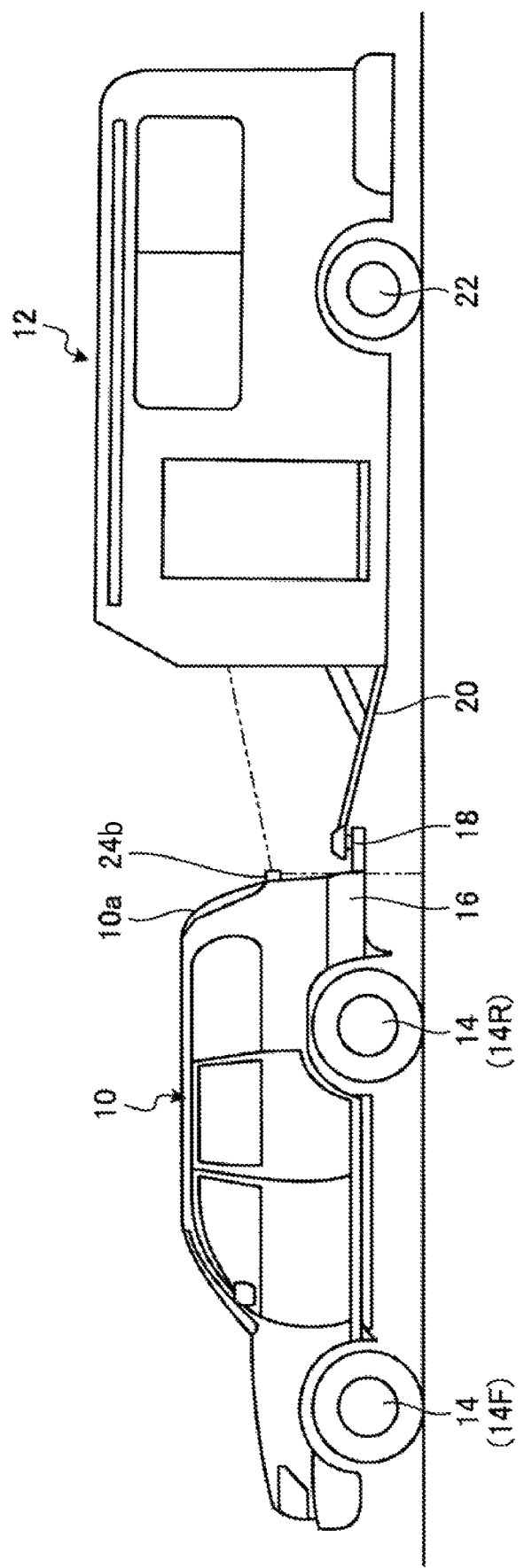
FIG. 1 is a side view illustrating a towing vehicle at which a surroundings monitoring apparatus of a first embodiment is mounted and a towed vehicle which is towed by the towing vehicle.
Figure 2:
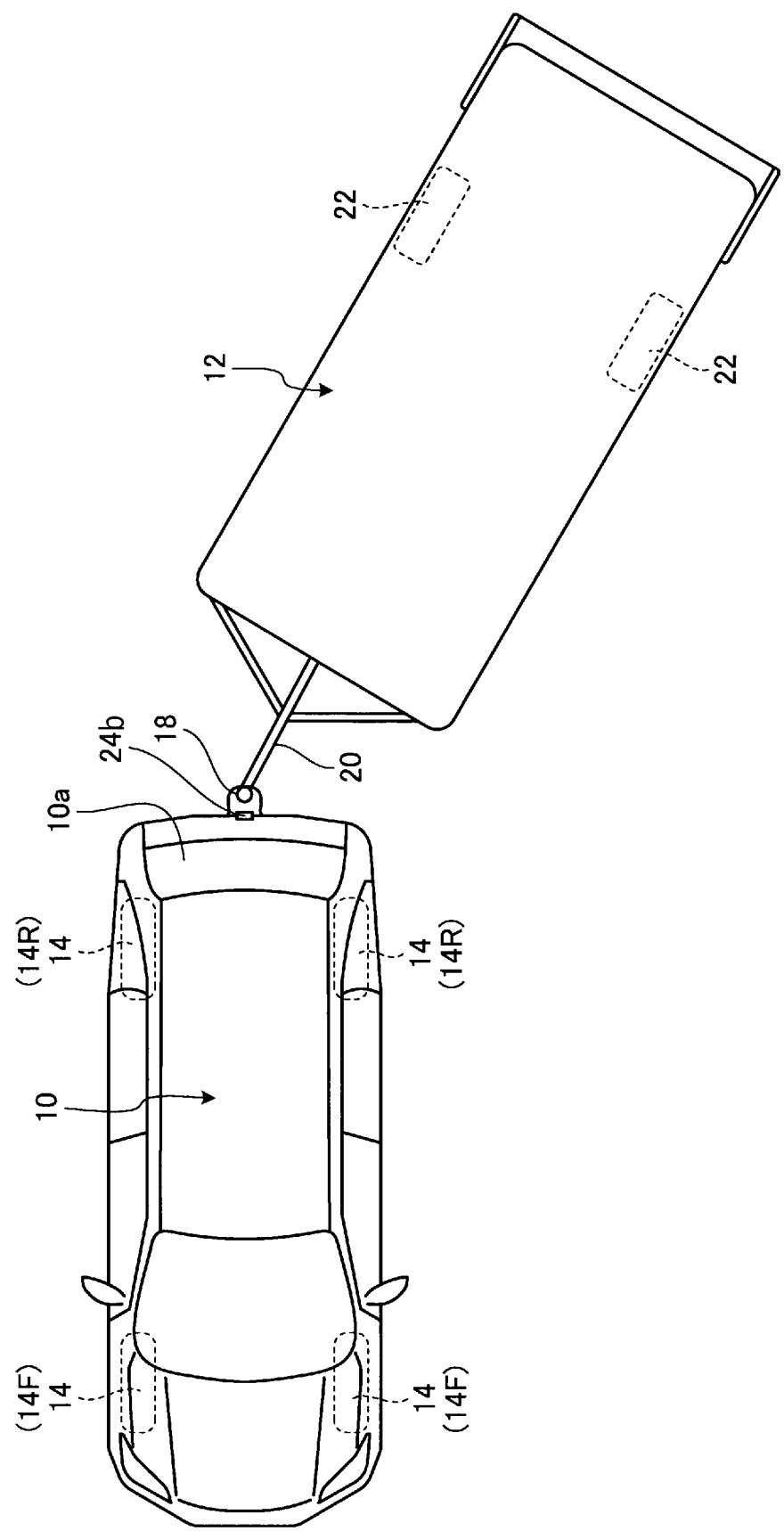
FIG. 2 is a top view of the towing vehicle and the towed vehicle according to the first embodiment.
Figure 3:
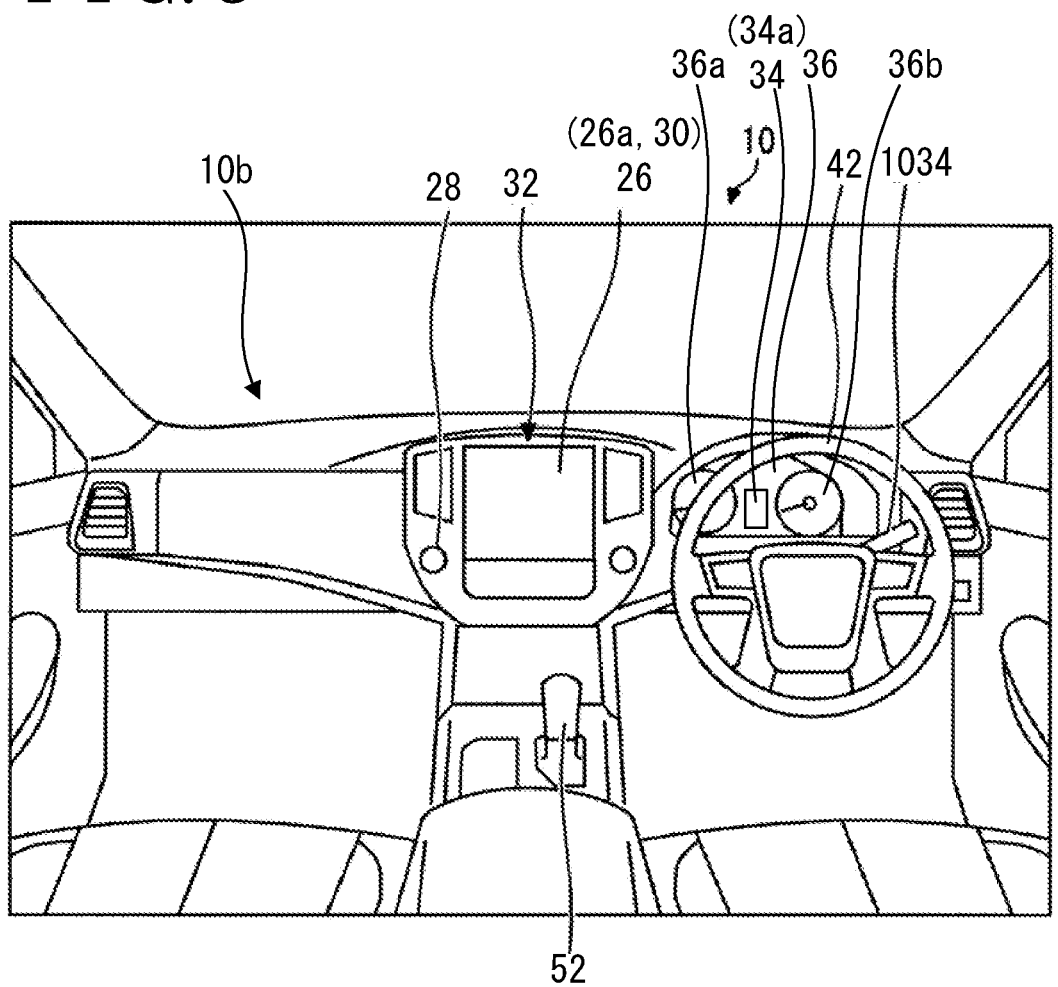
FIG. 3 is a view illustrating an example of an interior of a passenger compartment of the towing vehicle according to the first embodiment.
Figure 4:
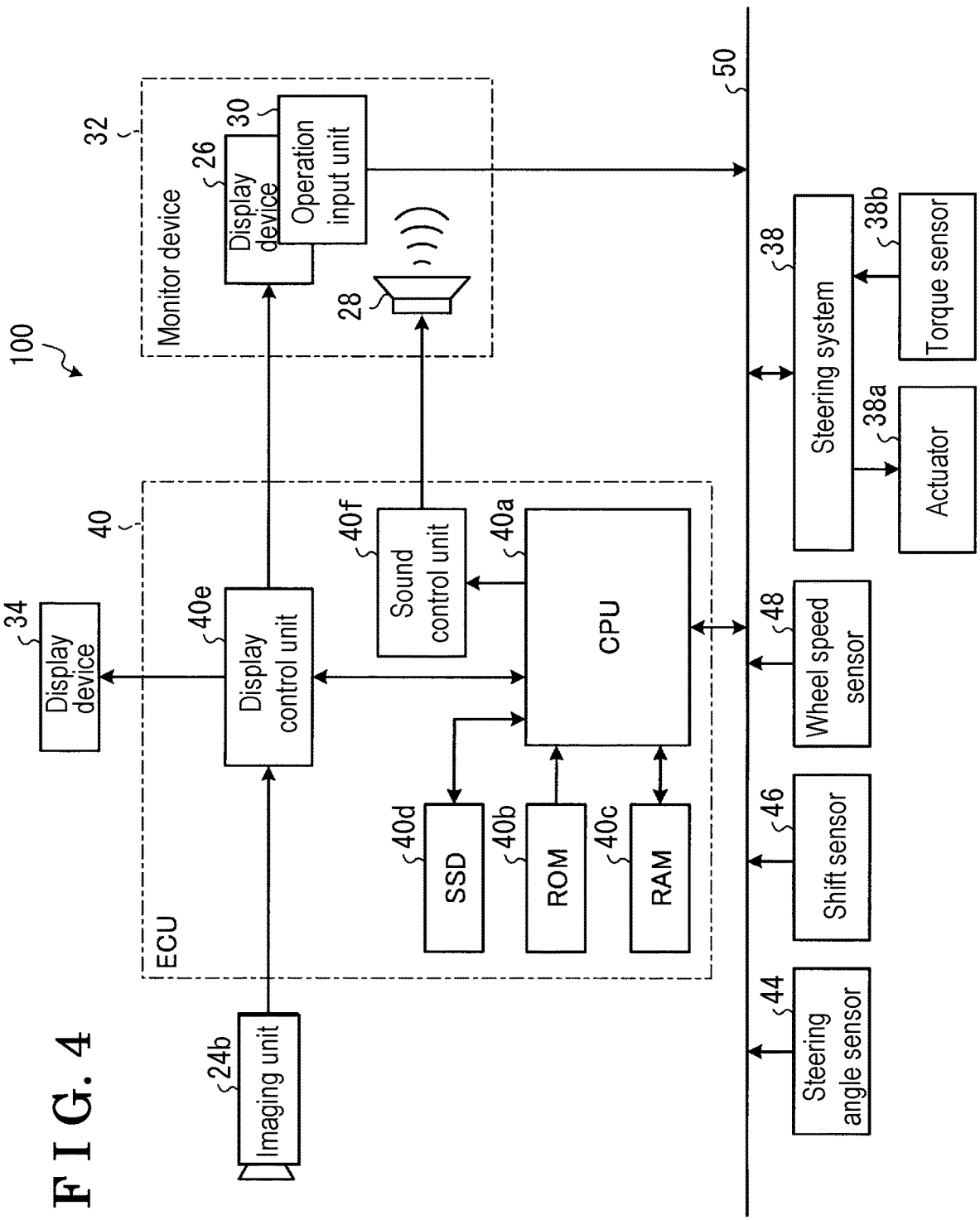
FIG. 4 is a block diagram illustrating an example of a functional configuration of the vehicle according to the first embodiment.

FIG. 1 is a side view illustrating the towing vehicle at which the surroundings monitoring apparatus of a first embodiment is mounted and a towed vehicle which is towed by the towing vehicle. In FIG. 1, a leftward direction of a page is set to a front (forward driving direction) with reference to a towing vehicle 10 and a rightward direction of the page is set to a rear (backward driving direction) with reference to the towing vehicle 10. FIG. 2 is a top view of the towing vehicle and the towed vehicle according to the first embodiment. FIG. 3 is a view illustrating an example of an interior of a passenger compartment of the towing vehicle according to the first embodiment. FIG. 4 is a block diagram illustrating an example of a functional configuration of the vehicle according to the first embodiment.

A towing device 18 (hitch) for towing a towed vehicle 12 protrudes from a lower portion of a center portion of a rear bumper 16 of the towing vehicle 10 in a vehicle width direction. The towing device 18 is fixed to a frame of the towing vehicle 10. For example, in the towing device 18, a distal end portion thereof erected in a vertical direction (upward and downward direction of the towing vehicle 10) includes a spherical hitch ball. A coupler provided at a distal end portion of a connecting member 20 which is fixed to the towed vehicle 12 covers the hitch ball. As a result, the towing vehicle 10 and the towed vehicle 12 are connected, and the towed vehicle 12 may swing (turn) in the vehicle width direction with respect to the towing vehicle 10. That is, the hitch ball transmits forward, backward, leftward, and rightward movements to the towed vehicle 12 (connecting member 20), and receives power of acceleration or deceleration.

As illustrated in FIG. 1, the towed vehicle 12 may be a box type including at least one of a boarding space, a living area and a storage space, for example, or a loading platform type for mounting a package (for example, a container or a boat). In addition, for example, the towed vehicle 12 includes a pair of trailer wheels 22. The towed vehicle 12 is a driven vehicle including driven wheels without including a driving wheel or a steered wheel.

An imaging unit 24b is provided at a wall portion below a rear hatch 10a on a rear side of the towing vehicle 10. For example, the imaging unit 24b is a digital camera incorporating imaging elements such as a Charge Coupled Device (CCD) and a CMOS Image Sensor (CIS), and is provided so as to be able to image a periphery of the towing vehicle 10. The imaging unit 24b outputs moving image data (captured image) at a predetermined frame rate. The imaging unit 24b has a wide-angle lens or a fisheye lens and may photograph a range of, for example, 140° to 220° in a horizontal direction. An optical axis of the imaging unit 24b is set obliquely downward. Therefore, the imaging unit 24b sequentially images a region (for example, see a range indicated by a two-dotted chain line in FIG. 1) including a rear end portion of the towing vehicle 10, the connecting member 20, and at least a front end portion of the towed vehicle 12. The captured image obtained by being imaged by the imaging unit 24b is used, for example, for detection of a connection posture of the towing vehicle 10 and the towed vehicle 12 and for display of an overhead view image of the towing vehicle 10 and the towed vehicle 12 viewed from above, for example. In order to recognize a surrounding environment of the towing vehicle 10, the towing vehicle 10 may include plural imaging units for imaging a side and a front of the towing vehicle 10. In addition, the imaging unit may be provided on the side or the rear of the towed vehicle 12. An arithmetic process or an imaging process is executed on a basis of the captured images obtained by the plural imaging units, so that the overhead view image with a wider viewing angle may be generated.

As illustrated in FIG. 3, a display device 26 and a sound output device 28, for example, are provided in a passenger compartment 10b of the towing vehicle 10. The display device 26 is, for example, a Liquid Crystal Display (LCD) or Organic Electroluminescent Display (OELD). The sound output device 28 is, for example, a speaker. In the present embodiment, for example, the display device 26 is covered with a transparent operation input unit 30 (for example, a touch panel). A driver (user) may visually recognize a picture (image) displayed on a screen 26a of the display device 26 via the operation input unit 30. In addition, the driver touches, pushes, or moves the operation input unit 30 with a finger, for example, at a position corresponding to the picture (image) displayed on the screen 26a of the display device 26, and thereby an operation input (instruction input) may be executed. In the present embodiment, for example, the display device 26, the sound output device 28, the operation input unit 30, and the like are provided in a monitor device 32 positioned at a center portion of a dashboard in the vehicle width direction (rightward and leftward direction). The monitor device 32 may include an operation input unit (not shown) such as a switch, a dial, a joystick, and a push button, for example. In addition, a sound output device (not illustrated) may be provided at a position different from that of the monitor device 32 in the passenger compartment 10b and sound may be output from the sound output device 28 of the monitor device 32 and the other sound output device. Further, in the present embodiment, for example, the monitor device 32 is shared with a navigation system and an audio system. Instead, a monitor device for a towing support apparatus may be provided separately from the aforementioned systems.

As illustrated in FIG. 3, the towing vehicle 10 further includes a steering portion 42, a shift operating portion 52, and a direction indicator switch 1034.

The steering portion 42 is a device operated by the driver to change a driving direction of the towing vehicle 10 by steering front-side wheels 14. The steering portion 42 is a steering wheel or a steering handle provided in front of the driver and protruding from a dashboard, for example.

The shift operating portion 52 is a device including a shift lever, for example, protruding from a center console to change a gear ratio of the towing vehicle 10 or the driving direction between front and rear (drive, parking and reverse, for example). The direction indicator switch 1034 is a member operated by the driver for a display related to an indication of left and right direction.

A display device 34 which is different from the display device 26 may be provided in the passenger compartment 10b. As illustrated in FIG. 3, the display device 34 is provided, for example, at an instrument panel portion 36 of the dashboard and is positioned between a speed display portion 36a and a rotation speed display portion 36b substantially at a center of the instrument panel portion 36. A size of a screen 34a of the display device 34 is smaller than a size of the screen 26a of the display device 26. The display device 34 may easily indicate, for example, a turning direction of the towed vehicle 12 with respect to the towing vehicle 10 or a message in association with the turning. For example, an image indicating an indicator or a mark, text information, or the like which supplementarily indicates the turning direction of the towed vehicle 12 in the future, for example, may be displayed on the display device 34. An amount of information displayed on the display device 34 may be smaller than an amount of information displayed on the display device 26. The display device 34 is, for example, an LCD, an OELD, or the like. Information displayed by the display device 34 may be displayed on the display device 26.

As illustrated in FIGS. 1 and 2, the towing vehicle 10 which is, for example, a four-wheeled vehicle, includes two right and left front wheels 14F and two right and left rear wheels 14R. These four wheels 14 may be configured to be steerable. As illustrated in FIG. 4, the towing vehicle 10 includes a steering system 38 for steering at least two of the wheels 14. The steering system 38 includes an actuator 38a and a torque sensor 38b. The steering system 38 is electrically controlled by an Electronic Control Unit (ECU) 40, for example, to operate the actuator 38a. The steering system 38 is, for example, an electric power steering system, a Steer By Wire (SBW) system or the like. The steering system 38 supplements a steering force by adding a torque, that is, an assist torque, to the steering portion 42 (see the steering wheel in FIG. 3) by the actuator 38a, and steers the wheels 14 by the actuator 38a, for example. In this case, the actuator 38a may steer the single wheel 14 or the plural wheels 14. The torque sensor 38b detects a torque that is given to the steering portion 42 by the driver, for example.

As illustrated in FIG. 4, according to a surroundings monitoring system 100 (surroundings monitoring apparatus), a steering angle sensor 44, a shift sensor 46 and a wheel speed sensor 48, for example, in addition to the ECU 40, the monitor device 32 and the steering system 38, are electrically connected via an in-vehicle network 50 serving as an electric communication line. The in-vehicle network 50 is configured as, for example, a Controller Area Network (CAN). The ECU 40 may control the steering system 38 or the like by sending a control signal through the in-vehicle network 50. The ECU 40 may receive a detection result of the torque sensor 38b, the steering angle sensor 44, the shift sensor 46, the wheel speed sensor 48 or the like via the in-vehicle network 50, and an operation signal of the operation input unit 30, for example.

The ECU 40 includes, for example, a Central Processing Unit (CPU) 40a, a Read Only Memory (ROM) 40b, a Random Access Memory (RAM) 40c, a Solid State Drive (SSD, a flash memory) 40d, a display control unit 40e, a sound control unit 40f and the like. The CPU 40a executes, for example, various arithmetic processes such as an imaging process related to images displayed on the display devices 26 and 34, and a detection process of a connection posture between the towing vehicle 10 and the towed vehicle 12. The CPU 40a may read out a program installed and stored in a nonvolatile storage device such as the ROM 40b, for example, and execute an arithmetic process according to the program. The RAM 40*c* temporarily stores various data used in an arithmetic operation in the CPU 40*a*. The display control unit 40*e* mainly executes combining of image data displayed on the display devices 26 and 34, for example, among arithmetic processes in the ECU 40. The sound control unit 40*f* mainly executes a process of sound data output from the sound output device 28 among the arithmetic processes in the ECU 40. The SSD 40*d* that is a rewritable nonvolatile storage unit may store data even in a case where a power supply of the ECU 40 is turned off. The CPU 40*a*, the ROM 40*b* and the RAM 40*c*, for example, may be integrated in the same package. The ECU 40 may be configured to use another logical arithmetic processor such as a Digital Signal Processor (DSP) and a logic circuit, for example, instead of the CPU 40*a*. In addition, a Hard Disk Drive (HDD) may be provided instead of the SSD 40*d*, and the SSD 40*d* and the HDD may be provided separately from the ECU 40.

The steering angle sensor 44 is a sensor for detecting a steering amount of the steering portion 42 (steering angle of the towing vehicle 10) such as a steering wheel, for example. The steering angle sensor 44 is configured using, for example, a Hall element or the like. The ECU 40 acquires the steering amount of the steering portion 42 by the driver and the steering amount of the respective wheels 14 at the time of automatic steering, for example, from the steering angle sensor 44 and executes various controls. The steering angle sensor 44 detects a rotation angle of a rotating portion included in the steering portion 42.

The shift sensor 46 is, for example, a sensor for detecting a position of a movable portion of the shift operating portion 52 (see the shift lever in FIG. 3). The shift sensor 46 may detect a position of a lever, an arm or a button, for example, serving as the movable portion. The shift sensor 46 may include a displacement sensor or may be configured as a switch.

The wheel speed sensor 48 is a sensor for detecting a rotation amount and a rotation speed per unit time of the wheel 14. The wheel speed sensor 48 is disposed at each of the wheels 14 and outputs a wheel speed pulse number indicating the rotation speed detected at each of the wheels 14 as a sensor value. The wheel speed sensor 48 may be configured using, for example, a Hall element or the like. The ECU 40 calculates an amount of movement of the towing vehicle 10, for example, based on the sensor value acquired from the wheel speed sensor 48 and executes the various controls. In a case where the vehicle speed of the towing vehicle 10 is calculated on a basis of the sensor value of each wheel speed sensor 48, the CPU 40*a* determines the vehicle speed of the towing vehicle 10 based on the speed of the wheel 14 having the smallest sensor value among the four wheels and executes various controls. Further, in a case where one of the wheels 14 among the four wheels 14 includes a greater sensor value than the other wheels 14, i.e., in a case where one of the wheels 14 among the four wheels 14 includes the rotation speed of a unit time period (unit time or unit distance) which is greater by a predetermined number or more as compared to the other wheels 14, it is assumed that the wheel 14 is in a slipping state (idling state) so that the CPU 40*a* executes the various controls. The wheel speed sensor 48 may be provided in a brake system which is not illustrated. In that case, the CPU 40*a* may acquire a detection result of the wheel speed sensor 48 via the brake system. The configuration, arrangement, electrical connection form, and the like of the above-described various sensors and actuators are merely the examples and may be set (changed) in various ways.

Figure 5:
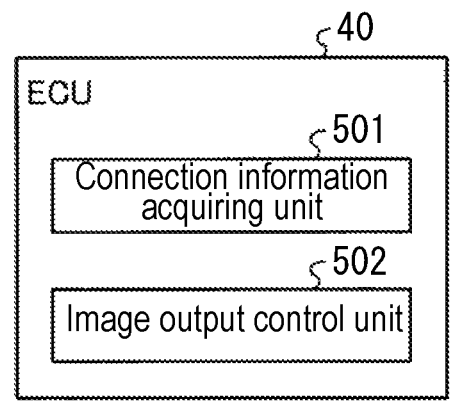
FIG. 5 is a block diagram illustrating an example of a functional configuration of an ECU included in the vehicle according to the first embodiment.

FIG. 5 is a block diagram illustrating an example of a functional configuration of the ECU included in the vehicle according to the first embodiment. As illustrated in FIG. 5, the ECU 40 includes a connection information acquiring unit 501 and an image output control unit 502. For example, a processor such as the CPU 40*a*, for example, mounted at a circuit board executes a surroundings monitoring program stored in a storage medium such as the ROM 40*b* or the SSD 40*d*, for example, so that the ECU 40 realizes the connection information acquiring unit 501 and the image output control unit 502. A part or all of the connection information acquiring unit 501 and the image output control unit 502 may be configured by hardware such as a circuit, for example.

The connection information acquiring unit 501 acquires a connection angle indicating a current connection posture of the towed vehicle 12 with respect to the towing vehicle 10. In the present embodiment, the connection information acquiring unit 501 image-analyzes the captured image obtained by being imaged by the imaging unit 24*b* and acquires the connection angle of the towed vehicle 12.

The image output control unit 502 outputs a display image to the display device 26 and displays the display image on the display device 26 based on the captured image obtained by imaging the rear of the towing vehicle 10 by the imaging unit 24*b*. Here, the display image is an image in which an indicator indicating the towed vehicle 12 (hereinafter, referred to as a trailer icon) is superimposed on a vehicle surrounding image that is an image including the towing vehicle 10 and the surroundings of the towing vehicle 10. In addition, the display image may be an image in which the connection posture between the towing vehicle 10 and the towed vehicle 12 is visually recognizable.

In the present embodiment, the image output control unit 502 generates the vehicle surrounding image including a towing vehicle image and a surrounding image based on the captured image. Here, the towing vehicle image is an image of the towing vehicle 10. In the present embodiment, the towing vehicle image is an image of the towing vehicle 10 viewed from above. Instead, an image of a three-dimensional model image imitating the towing vehicle 10 viewed from above (so-called an icon) may be the towing vehicle image. The vehicle surrounding image is an image of the towing vehicle 10 and the surroundings of the towing vehicle 10. In the present embodiment, the vehicle surrounding image is an image of the surroundings of the towing vehicle 10 viewed from above the towing vehicle 10. Next, the image output control unit 502 causes the display device 26 to display the display image in which the trailer icon is superimposed on the vehicle surrounding image. The trailer icon is an indicator of the towed vehicle 12. In the present embodiment, the trailer icon is an image of a three-dimensional model image imitating the towed vehicle 12 viewed from above. In the present embodiment, the trailer icon is the image of the three-dimensional model image imitating the towed vehicle 12 viewed from above. Instead, in a case where the image of the towed vehicle 12 is obtainable, such image may be the trailer icon. In addition, in the present embodiment, when the trailer icon is superimposed on the vehicle surrounding image, the image output control unit 502 connects the trailer icon to the towing vehicle image at the connection angle acquired by the connection information acquiring unit 501. In addition, for example, the trailer icon includes a portion indicating a vehicle body of the towed vehicle 12, a portion indicating the wheel of the towed vehicle 12, and a portion indicating a connecting portion for connecting the towing vehicle 10 and the towed vehicle 12. In the present embodiment, the image output control unit 502 causes the display device 26 to display, as the display image, the image in which the trailer icon is superimposed on the vehicle surrounding image serving as the overhead view image of the towing vehicle 10 and the surroundings of the towing vehicle 10 viewed from above the towing vehicle 10. At this time, it is not limited thereto as long as the image in which the trailer icon is superimposed on the vehicle surrounding image including the towing vehicle 10 and the surroundings of the towing vehicle 10 is displayed on the display device 26 as the display image. For example, the image output control unit 502 may cause the display device 26 to display, as the display image, the image where the trailer icon is superimposed on the vehicle surrounding image serving as a side view of the towing vehicle 10 and the surroundings of the towing vehicle 10 viewed from the side of the towing vehicle 10. In addition, the image output control unit 502 may cause the display device 26 to display, as the display image, an image of a virtual space of a three-dimensional model which includes the towing vehicle 10 and the surroundings of the towing vehicle 10 (an example of the vehicle surrounding image) and on which the trailer icon displayed in a three-dimension is superimposed, the image being viewed from a virtual viewpoint. The three-dimensional model referred to here is, for example, obtained by projecting the captured image obtained by being imaged by the imaging unit 24b onto a three-dimensional virtual projection surface (for example, a bowl-shaped projection surface).

The image output control unit 502 acquires towed vehicle information related to the towed vehicle 12. The towed vehicle information is information which enables a vehicle length of the towed vehicle 12 to be identified. In the present embodiment, the image output control unit 502 acquires information which is used for a process other than the display process of the display image (for example, a process for controlling turning of the towing vehicle 10 and the towed vehicle 12) and which enables estimation of the vehicle length of the towed vehicle 12 as the towed vehicle information. Accordingly, the display image may be displayed without causing the driver, for example, to input the information used for the display of the display image when the display image is displayed, so that a burden on the driver of the towing vehicle 10, for example, caused by such operation of inputting the information may be reduced. The image output control unit 502 changes a display mode of the trailer icon based on the acquired towed vehicle information. Specifically, the image output control unit 502 changes the display mode of the trailer icon by changing a shape of the trailer icon based on the towed vehicle information. In the present embodiment, the image output control unit 502 changes a length of the towed vehicle 12 in the vehicle length direction in the trailer icon based on the towed vehicle information. Therefore, even in a case where the vehicle length of the towed vehicle 12 is not obtainable on a basis of the captured image obtained by being imaged by the imaging unit 24b, the vehicle length of the trailer icon can be a length which reflects the actual vehicle length of the towed vehicle 12. As a result, the towed vehicle 12 may be easily imagined from the display image. In addition, a positional relationship with an obstacle which exists in surroundings of the towing vehicle 10 and the towed vehicle 12 may be easily understood from the display image.

Figure 6:
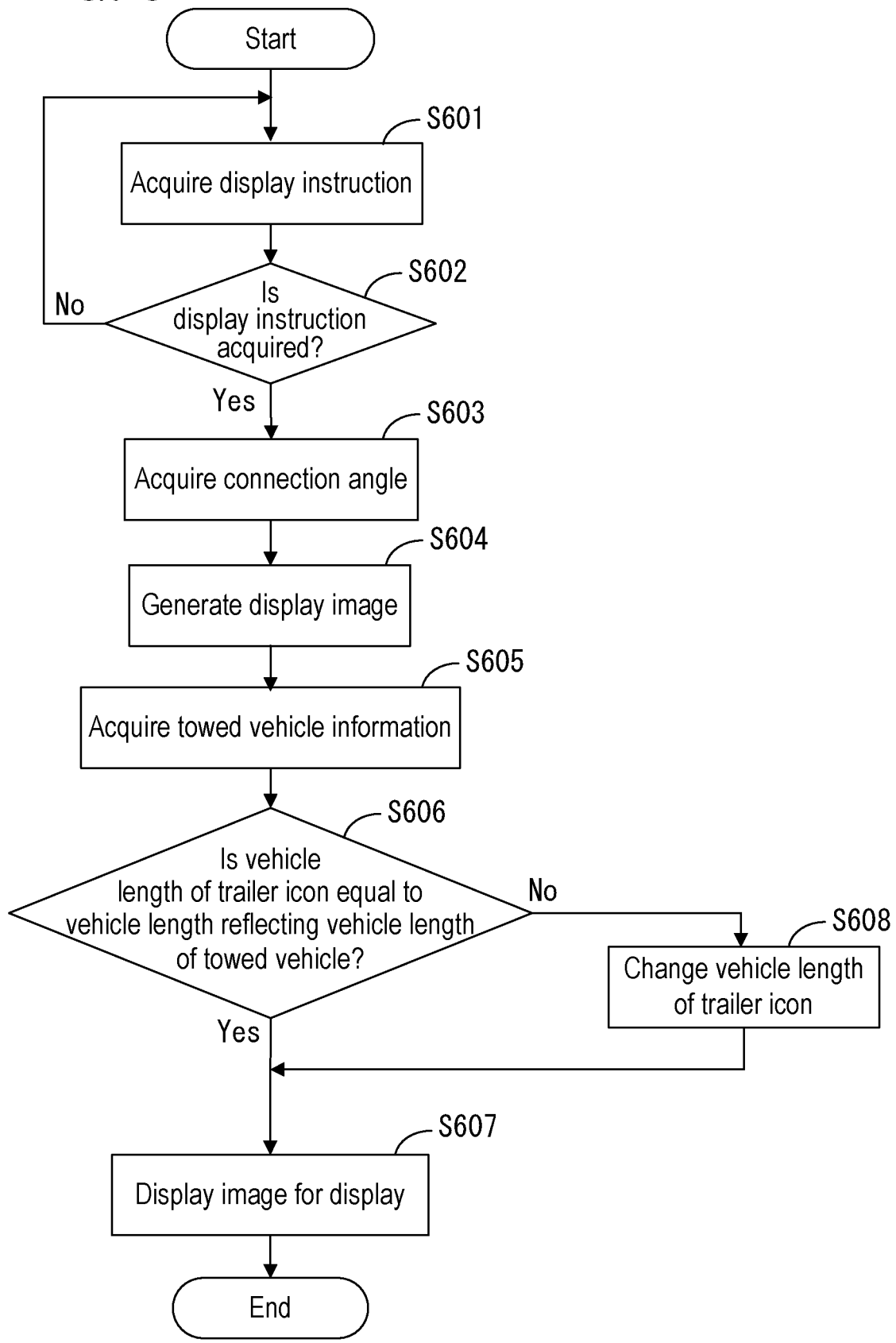
FIG. 6 is a flowchart illustrating an example of a flow of a display process of a display image by a surroundings monitoring system according to the first embodiment.

Next, an example of a flow of the display process of the display image performed by the surroundings monitoring system 100 according to the present embodiment is described with reference to FIG. 6. FIG. 6 is a flowchart illustrating an example of the flow of the display process of the display image performed by the surroundings monitoring system according to the first embodiment.

In the present embodiment, the connection information acquiring unit 501 acquires a display instruction for instructing the display of the display image from the operation input unit 30, for example (step S601). In a case where the display instruction of the display image is acquired (step S602: Yes), the connection information acquiring unit 501 acquires the captured image obtained by imaging the rear of the towing vehicle 10 from the imaging unit 24b. In addition, the connection information acquiring unit 501 acquires the connection angle indicating the current connection posture of the towed vehicle 12 with respect to the towing vehicle 10 based on the acquired captured image (step S603).

Next, the image output control unit 502 generates the display image where the trailer icon is superimposed on the vehicle surrounding image based on the captured image acquired from the imaging unit 24b (step S604). In the present embodiment, the image output control unit 502 reads out the trailer icon from the ROM 40b. The image output control unit 502 generates the display image in which the trailer icon is disposed at a position which is behind the towing vehicle image and which is obtained by being swung (turned) by the acquired connection angle around a center of the towing vehicle image in the vehicle width direction (in other words, a center axis in a vehicle forward and backward direction, i.e., the hitch ball in the embodiment). In the present embodiment, the image output control unit 502 generates the display image in which the towing vehicle 10 and the towed vehicle 12 are viewed from above, but it is not limited thereto as long as the image is displayed so that the connection posture between the towing vehicle 10 and the towed vehicle 12 is visually recognizable. For example, the image output control unit 502 may generate a side view of the towing vehicle 10 and the towed vehicle 12.

The image output control unit 502 acquires the towed vehicle information (step S605). The image output control unit 502 determines whether or not the vehicle length of the trailer icon included in the display image is equal to a length reflecting the vehicle length of the towed vehicle 12 specified by the acquired towed vehicle information (step S606). Specifically, the image output control unit 502 obtains a length by reducing the vehicle length of the towed vehicle 12 which is specified by the towed vehicle information with the same scale as a scale of the towing vehicle image. In a case where the vehicle length of the trailer icon is equal to the obtained length, the image output control unit 502 determines that the vehicle length of the trailer icon is the length reflecting the vehicle length of the towed vehicle 12. On the other hand, in a case where the vehicle length of the trailer icon is not equal to the obtained length, the image output control unit 502 determines that the vehicle length of the trailer icon is not the length reflecting the vehicle length of the towed vehicle 12.

In a case where the vehicle length of the trailer icon is the length reflecting the vehicle length of the towed vehicle 12 (step S606: Yes), the image output control unit 502 outputs the display image to the display device 26 without changing the vehicle length of the trailer icon included in the generated display image and causes the display device 26 to display the display image (step S607). On the other hand, in a case where the vehicle length of the trailer icon is not the length reflecting the vehicle length of the towed vehicle 12 (step S606: No), the image output control unit 502 changes the vehicle length of the trailer icon included in the display image based on the towed vehicle information (step S608). Specifically, the image output control unit 502 obtains a length by reducing the vehicle length of the towed vehicle 12 which is specified by the towed vehicle information with the scale of the towing vehicle image and changes the vehicle length of the trailer icon to the obtained length.

Thereafter, the image output control unit 502 outputs the display image with the changed vehicle length of the trailer icon to the display device 26 and causes the display device 26 to display the display image (step S607). Accordingly, even in a case where the vehicle length of the towed vehicle 12 is not obtainable on a basis of the captured image obtained by being imaged by the imaging unit 24b, the vehicle length of the trailer icon included in the display image can be the length reflecting the actual vehicle length of the towed vehicle 12. Therefore, the towed vehicle 12 may be easily imagined from the display image. The positional relationship with an obstacle existing in the surroundings of the towing vehicle 10 and the towed vehicle 12 may be easily understood from the display image.

Figure 7:
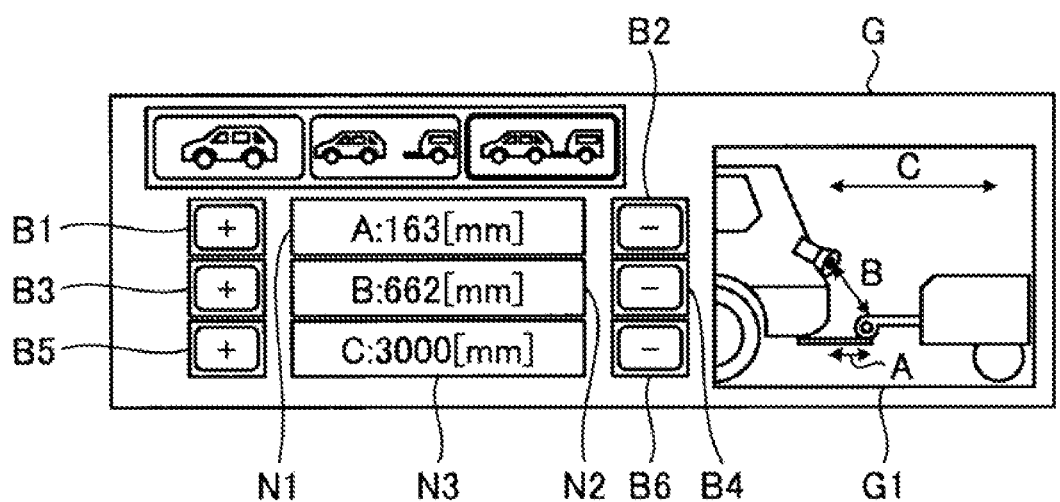
FIG. 7 is a view illustrating an example of a screen which is displayed on a display device in the vehicle according to the first embodiment.
Figure 8:
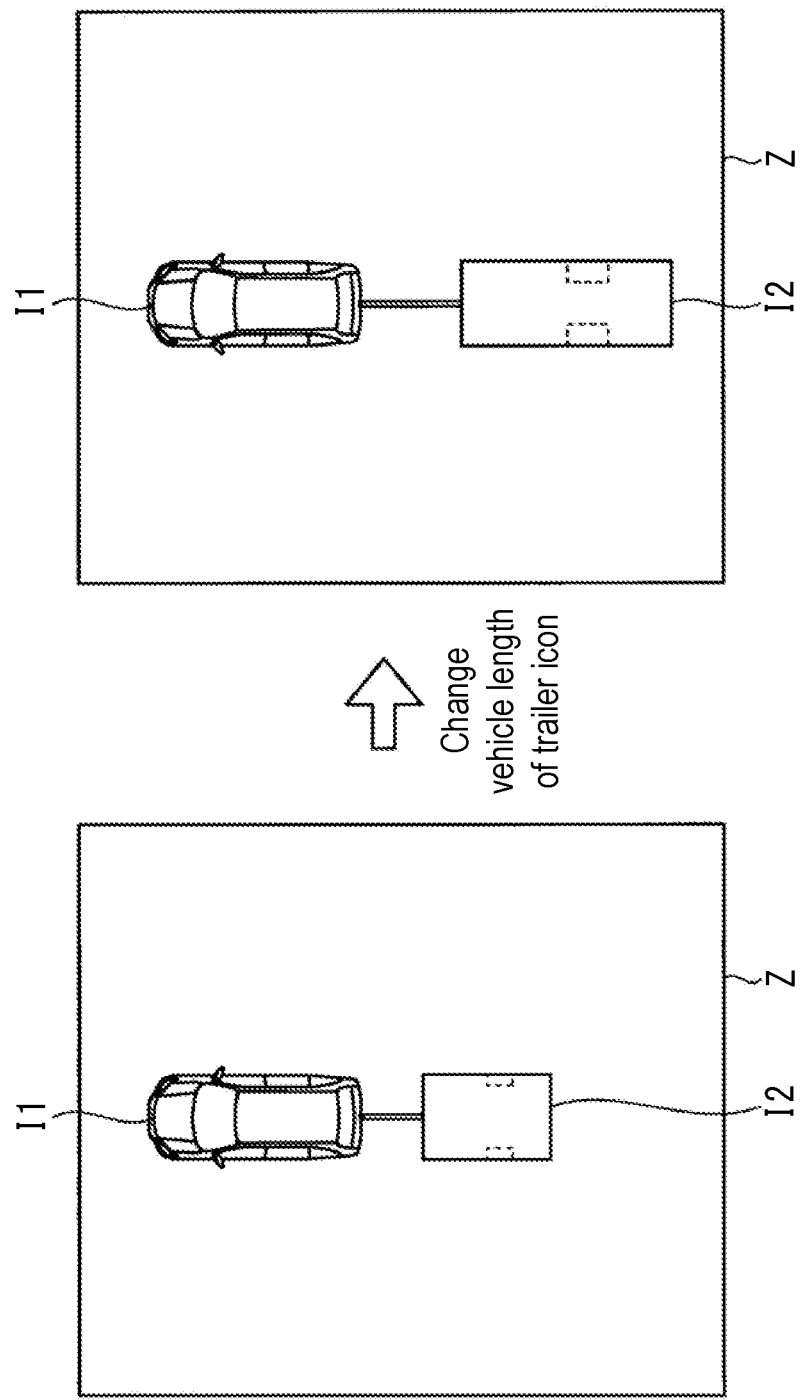
FIG. 8 is a view illustrating an example of the display image displayed in the vehicle according to the first embodiment.

Next, an example of a process for displaying the display image at the towing vehicle 10 according to the present embodiment is described with reference to FIGS. 7 and 8. FIG. 7 is a view illustrating an example of a screen which is displayed on the display device in the vehicle according to the first embodiment. FIG. 8 is a view illustrating an example of the display image displayed in the vehicle according to the first embodiment.

For example, information which enables the vehicle length of the towed vehicle 12 to be identified and which is input via a trailer information setting screen displayed at the display device 26 is acquired as the towed vehicle information. Specifically, in a case of controlling the turning of the towing vehicle 10 and the towed vehicle 12, as illustrated in FIG. 7, the ECU 40 causes the display device 26 to display a trailer information setting screen G on which the driver, for example, can input dimensions necessary for the control of the turning of the towed vehicle 12 based on specifications of the towed vehicle 12 or the like. As illustrated in FIG. 7, the trailer information setting screen G includes a first input column N1 on which an input result of a length A (for example, 163 mm) defined from the rear end of the towing vehicle 10 to the towing device 18 (connecting position between the towing vehicle 10 and the towed vehicle 12) is displayed, a plus button B1 which enables to instruct increase of the length A, and a minus button B2 which enables to instruct decrease of the length A.

In addition, as illustrated in FIG. 7, the trailer information setting screen G includes a second input column N2 on which an input result of a length B (for example, 662 mm) defined from the imaging unit 24b to the towing device 18 is displayed, a plus button B3 which enables to instruct increase of the length B, and a minus button B4 which enables to instruct decrease of the length B. Further, as illustrated in FIG. 7, the trailer information setting screen G includes a third input column N3 on which an input result of a length C (for example, 3,000 mm) defined from the rear end of the towing vehicle 10 to an axle of the trailer wheel 22 is displayed, a plus button B5 which enables to instruct increase of the length C, and a minus button B6 which enables to instruct decrease of the length C. Furthermore, as illustrated in FIG. 7, the trailer information setting screen G includes a model image G1 which is an image imitating the rear portion of the towing vehicle 10 and the towed vehicle 12 and which enables the positions of the lengths A to C to be visually recognized.

In the present embodiment, the image output control unit 502 acquires a length obtained by subtracting the length A from the length C as the towed vehicle information. Accordingly, a display mode of a trailer icon I2 is changed by using a length used for another process such as a process for controlling the turning of the towing vehicle 10 and the towed vehicle 12, for example, so that, when the display image is displayed, a burden on the driver of the towing vehicle 10, for example, caused by such operation related to the change of the display mode of the trailer icon I2 may be reduced. The image output control unit 502 changes the vehicle length of the trailer icon included in the display image based on the acquired towed vehicle information. Specifically, the image output control unit 502 obtains a length by multiplying a value obtained by subtracting the length A from the length C by a preset coefficient (for example, 1.4). Next, the image output control unit 502 reduces the obtained length at the same scale as the scale of the towing vehicle image and changes the vehicle length of the trailer icon included in the display image so as to be the reduced length.

For example, in a case where the length A is 163 mm and the length C is 3,000 mm, the image output control unit 502 obtains the vehicle length obtained by reducing a length: (C−A)×1.4=3,971.8 mm at a scale of a towing vehicle image I1, and changes the vehicle length of the trailer icon I2 included in a display image Z to the obtained length as illustrated in FIG. 8. In the present embodiment, the image output control unit 502 makes the vehicle length obtained by reducing the length which is obtained by multiplying the value obtained by subtracting the length A from the length C by the preset coefficient at the scale of the towing vehicle image I1 be the vehicle length of the trailer icon I2, but it is not limited thereto as long as the vehicle length of the trailer icon I2 included in the display image Z is changed on a basis of the towed vehicle information. For example, the image output control unit 502 may cause the vehicle length which reflects the length C (for example, the vehicle length obtained by reducing the length C at the scale of the towing vehicle image I1) to be the vehicle length of the trailer icon I2.

In the present embodiment, the image output control unit 502 acquires information which is input on the screen (for example, the trailer information setting screen G) used for a process other than the display process of the display image Z and which enables estimation of the vehicle length of the towed vehicle 12 as the towed vehicle information. Alternatively, the image output control unit 502 may acquire information which is input on the screen used for the display of the display image Z as the towed vehicle information. In this case, the image output control unit 502 may acquire information which is input on the screen used for the display of the display image Z and indicates the vehicle length of the towed vehicle 12 (that is, the length obtained by subtracting the length A from the length C) as the towed vehicle information. The image output control unit 502 changes the length of the trailer icon I2 to a length obtained by reducing the length indicated by the acquired towed vehicle information with the scale of the towing vehicle image I1.

In the present embodiment, the trailer icon I2 includes a connecting portion which connects the towing vehicle image I1 and the trailer icon I2. The image output control unit 502 changes a length of the connecting portion in the trailer icon I2 based on the towed vehicle information. Accordingly, even in a case where the length of the connecting portion is not obtainable on a basis of the captured image obtained by being imaged by the imaging unit 24b, the length of the connecting portion included in the trailer icon I2 can be the length reflecting an actual length of the connecting portion, so that the towed vehicle 12 can be easily imagined from the display image. Specifically, the image output control unit 502 can also change a length from a connecting position between the towing vehicle image I1 and the trailer icon I2 to a distal end of the trailer icon I2 in the trailer icon I2 based on the towed vehicle information. More specifically, the image output control unit 502 obtains a value which is obtained by multiplying the value obtained by subtracting the length A from the length C by the preset coefficient (for example, 0.4). The image output control unit 502 then makes the length from the connecting position between the towing vehicle image I1 and the trailer icon I2 to the distal end of the trailer icon I2 be a length reflecting the obtained length. For example, in a case where the length A is 163 mm and the length C is 3,000 mm, the image output control unit 502 changes the length from the connecting position between the towing vehicle image I1 and the trailer icon I2 to the distal end of the trailer icon I2 to a length obtained by reducing a length: (C−A)×0.4=1,134.8 mm at the same scale as the towing vehicle image I1 as illustrated in FIG. 8.

In the present embodiment, the image output control unit 502 changes at least one of a size of the wheel of the trailer icon I2 and the display position of the wheel included in the display image Z in response to the towed vehicle information. Accordingly, in addition to the trailer icon I2, the wheel of the trailer icon I2 and the display position of the wheel may reflect the actual size and display position of the trailer wheel 22 of the trailer icon I2, so that the towed vehicle 12 may be easily imagined from the display image Z.

Specifically, the image output control unit 502 obtains a length by multiplying the value which is obtained by subtracting the length A from the length C by the preset coefficient (for example, 0.9). The image output control unit 502 then changes the front end of the wheel of the trailer icon I2 to a position separated from the connecting position included in the display image Z by a length obtained by reducing the aforementioned obtained length at the same scale as the towing vehicle image I1. The image output control unit 502 also obtains a length obtained by multiplying the value obtained by subtracting the length A from the length C by the preset coefficient (for example, 1.1). The image output control unit 502 changes the rear end of the wheel of the trailer icon I2 to a position separated from the connecting position included in the display image Z by a length obtained by reducing the aforementioned obtained length at the same scale as the towing vehicle image I1.

For example, in a case where the length A is 163 mm and the length C is 3,000 mm, the image output control unit 502 changes the length from the connecting position included in the display image Z to the distal end of the wheel of the trailer icon I2 to a length obtained by reducing a length: (C−A)×0.9=2,553.3 mm at the same scale as the towing vehicle image I1 as illustrated in FIG. 8. In addition, in a case where the length A is 163 mm and the length C is 3,000 mm, the image output control unit 502 changes the length from the connecting position in the display image Z to the rear end of the wheel of the trailer icon I2 to a length obtained by reducing a length: (C−A)×1.1=3,120.7 mm at the same scale as the towing vehicle image I1 as illustrated in FIG. 8.

Next, an example of the display image displayed at the towing vehicle 10 according to the present embodiment is described with reference to FIGS. 9 to 13. FIGS. 9 to 13 are views each of which illustrates an example of the display image displayed at the towing vehicle according to the first embodiment.

Figure 9:
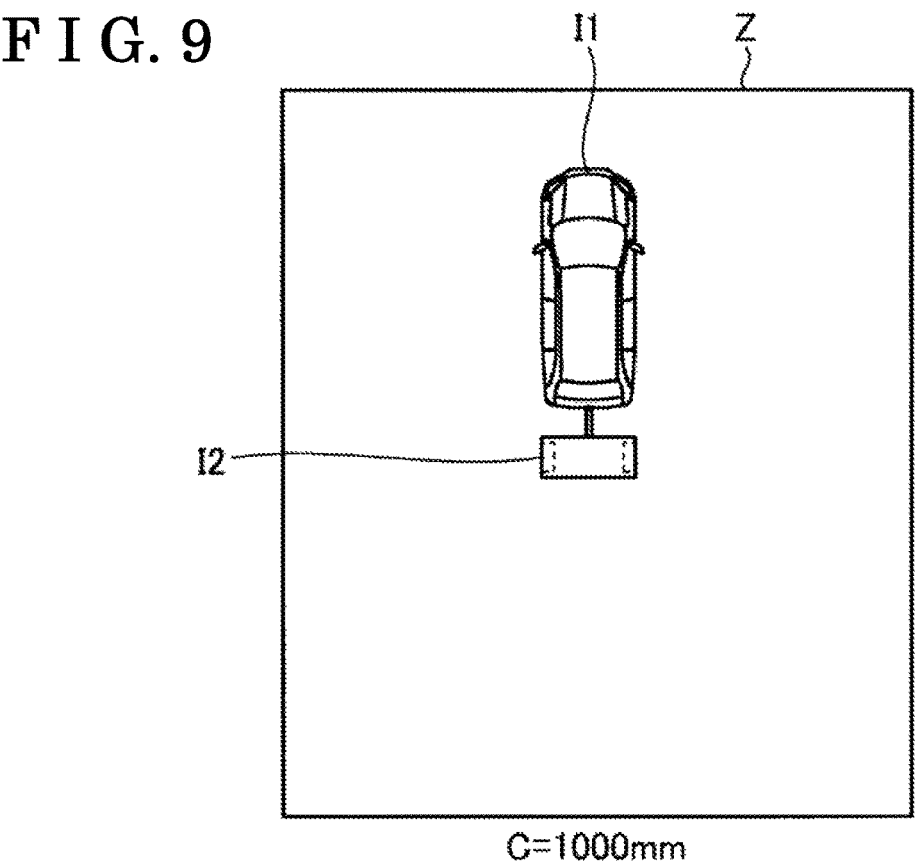
FIG. 9 is a view illustrating an example of the display image displayed in the towing vehicle according to the first embodiment.

For example, in a case where the length C from the rear end of the towing vehicle 10 to the axle of the trailer wheel 22 is 1,000 mm and the length A from the rear end of the towing vehicle 10 to the towing device 18 is 163 mm, the image output control unit 502 changes the vehicle length of the trailer icon I2 included in the display image Z to a vehicle length obtained by reducing a length: (C−A)×1.4=1,171.8 mm at the same scale as the towing vehicle image I1 as illustrated in FIG. 9.

Figure 10:
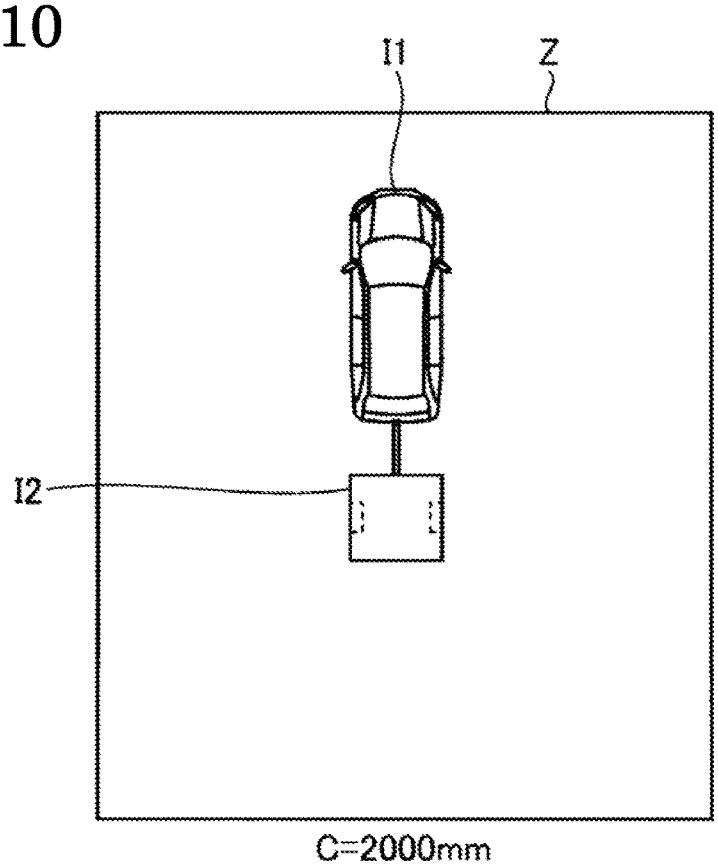
FIG. 10 is a view illustrating an example of the display image displayed in the towing vehicle according to the first embodiment.

In in a case where the length C from the rear end of the towing vehicle 10 to the axle of the trailer wheel 22 is 2,000 mm and the length A from the rear end of the towing vehicle 10 to the towing device 18 is 163 mm, the image output control unit 502 changes the vehicle length of the trailer icon I2 included in the display image Z to a vehicle length obtained by reducing a length: (C−A)×1.4=2,571.8 mm at the same scale as the towing vehicle image I1 as illustrated in FIG. 10.

Figure 11:
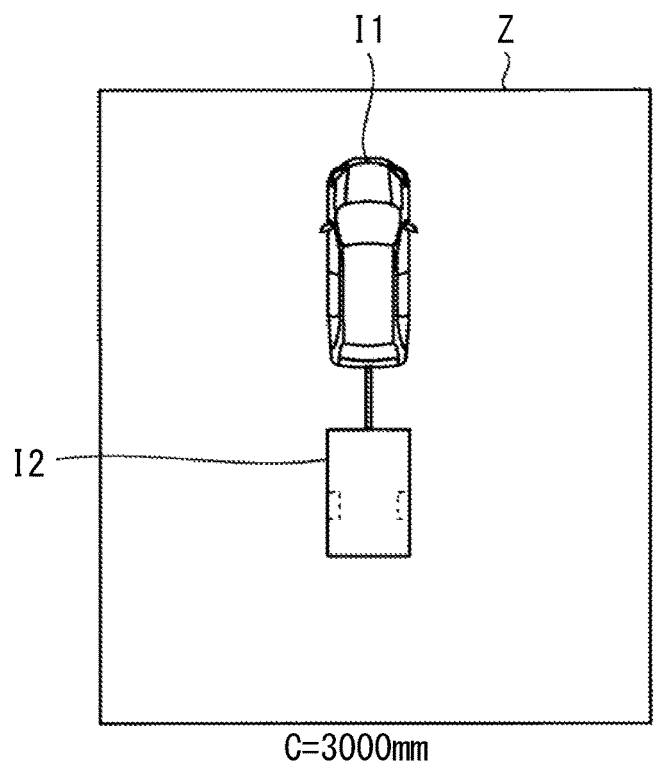
FIG. 11 is a view illustrating an example of the display image displayed in the towing vehicle according to the first embodiment.

In a case where the length C from the rear end of the towing vehicle 10 to the axle of the trailer wheel 22 is 3,000 mm and the length A from the rear end of the towing vehicle 10 to the towing device 18 is 163 mm, the image output control unit 502 changes the vehicle length of the trailer icon I2 included in the display image Z to a vehicle length obtained by reducing a length: (C−A)×1.4=3,971.8 mm at the same scale as the towing vehicle image I1 as illustrated in FIG. 11.

Figure 12:
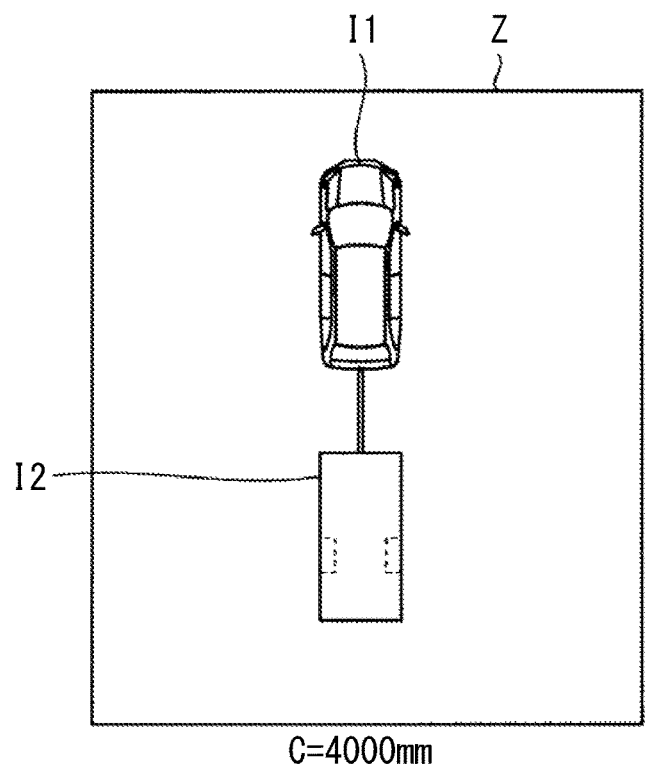
FIG. 12 is a view illustrating an example of the display image displayed in the towing vehicle according to the first embodiment.

In a case where the length C from the rear end of the towing vehicle 10 to the axle of the trailer wheel 22 is 4,000 mm and the length A from the rear end of the towing vehicle 10 to the towing device 18 is 163 mm, the image output control unit 502 changes the vehicle length of the trailer icon I2 included in the display image Z to a vehicle length obtained by reducing a length: (C−A)×1.4=5,371.8 mm at the same scale as the towing vehicle image I1 as illustrated in FIG. 12.

Figure 13:
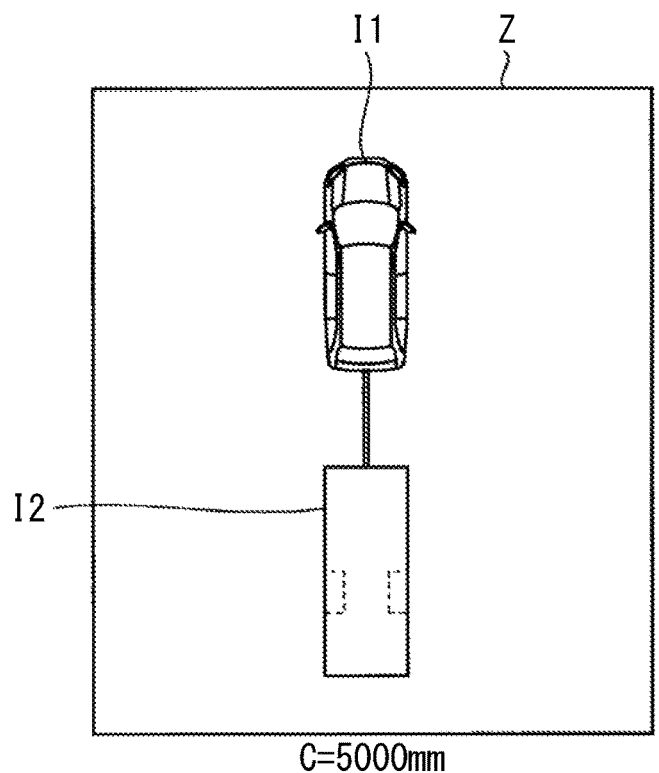
FIG. 13 is a view illustrating an example of the display image displayed in the towing vehicle according to the first embodiment.

In a case where the length C from the rear end of the towing vehicle 10 to the axle of the trailer wheel 22 is 5,000 mm and the length A from the rear end of the towing vehicle 10 to the towing device 18 is 163 mm, the image output control unit 502 changes the vehicle length of the trailer icon I2 included in the display image Z to a vehicle length obtained by reducing a length: (C−A)×1.4=6,771.8 mm at the same scale as the towing vehicle image I1 as illustrated in FIG. 13.

As described above, according to the surroundings monitoring system 100 of the first embodiment, even in a case where the vehicle length of the towed vehicle 12 is not obtainable on a basis of the captured image obtained by being imaged by the imaging unit 24b, the vehicle length of the trailer icon included in the display image can be a length which reflects the actual vehicle length of the towed vehicle 12, so that the towed vehicle 12 may be easily imagined from the display image.

Second Embodiment

The present embodiment is an example in which a display mode from an axle of a wheel of a trailer icon to a rear end of the trailer icon is different from a display mode from the axle of the wheel of the trailer icon to a front end of the trailer icon in a display image. In the following description, the description of the same portion as that in the first embodiment is omitted.

Figure 14:
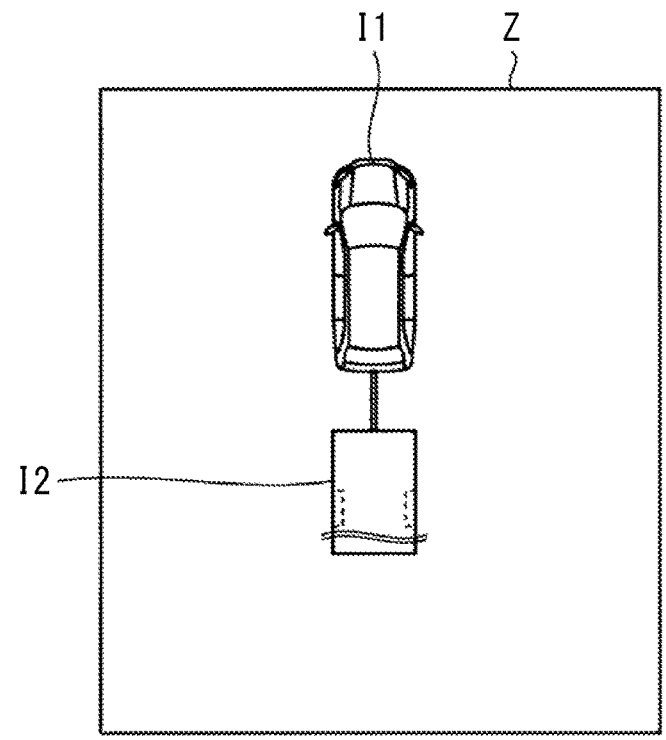
FIG. 14 is a view illustrating an example of a display image which is displayed in a towing vehicle according to a second embodiment.
Figure 15:
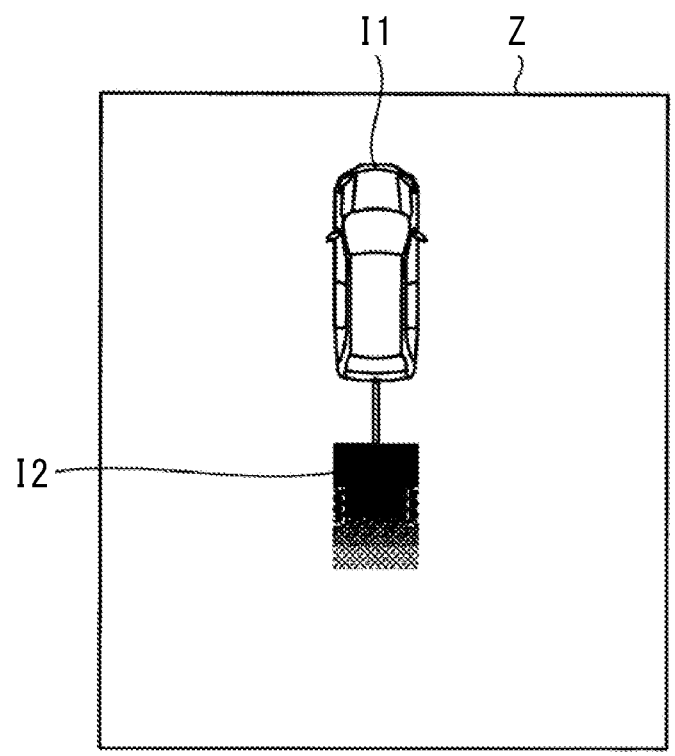
FIG. 15 is a view illustrating an example of the display image displayed in the towing vehicle according to the second embodiment.

FIGS. 14 and 15 are views each of which illustrates an example of a display image displayed at a towing vehicle according to a second embodiment. In the present embodiment, in a case where a vehicle length of a trailer icon I2 included in a display image Z is changed, as illustrated in FIGS. 14 and 15, an image output control unit 502 causes a display mode from an axle of a wheel of the trailer icon I2 to a rear end of the trailer icon I2 to be different from a display mode from the axle of the wheel of the trailer icon I2 to a front end of the trailer icon I2 in the display image Z. Accordingly, it is possible to inform a driver of a towing vehicle 10, for example, that a vehicle length of the trailer icon I2 included in the display image Z is not accurate, so that it is possible to inhibit a collision with an obstacle existing in surroundings of the towed vehicle 12 by the driver of the towing vehicle 10, for example, who drives the towing vehicle 10 by only seeing the display image Z.

For example, as illustrated in FIG. 14, the image output control unit 502 includes an omission line (for example, a wave line) extending in a vehicle width direction of the trailer icon I2 between the axle of the wheel of the trailer icon I2 and the rear end of the trailer icon I2 in the display image Z. Otherwise, as illustrated in FIG. 15, the image output control unit 502 sets a transmittance of the image from the axle of the wheel of the trailer icon I2 to the rear end of the trailer icon I2 included in the display image Z to be higher than a transmittance of the image from the axle of the wheel of the trailer icon I2 to the front end of the trailer icon I2 included in the display image Z. Furthermore, as illustrated in FIG. 15, the image output control unit 502 may increase the transmittance of the image from the axle of the wheel of the trailer icon I2 to the rear end of the trailer icon I2 included in the display image Z towards the rear end of the trailer icon I2. Accordingly, the driver of the towing vehicle 10, for example, may easily understand that the vehicle length of the trailer icon I2 included in the display image Z is not accurate, so that it may be possible to inhibit the driver of the towing vehicle 10, for example, from driving the towing vehicle 10 by seeing only the display image Z.

As described above, according to the surroundings monitoring system 100 of the second embodiment, it is possible to inform the driver of the towing vehicle 10, for example, that the vehicle length of the trailer icon included in the display image is not accurate. Thus, it is possible to inhibit a collision with an obstacle existing in the surroundings of the towed vehicle 12 by the driver of the towing vehicle 10, for example, who drives the towing vehicle 10 by seeing only the display image.

Similar components in the following embodiment, for example, bear the same reference numerals and duplicated explanation is appropriately omitted. In the embodiment described below, an example where a surroundings monitoring apparatus is applied to a parking assist apparatus is explained.

Third Embodiment

According to a known surroundings monitoring apparatus which is mounted at a towing vehicle towing a towed vehicle to display a surrounding image where a viewpoint of a captured image is not converted, there is an issue that a region which can be seen through the surrounding image at a time of backward driving decreases because a rear side is blocked by the towed vehicle depending on circumstances of the towed vehicle.

Therefore, in a third embodiment, a region blocked by the towed vehicle is reduced to increase a region that can be seen through the surrounding image.

Figure 16:
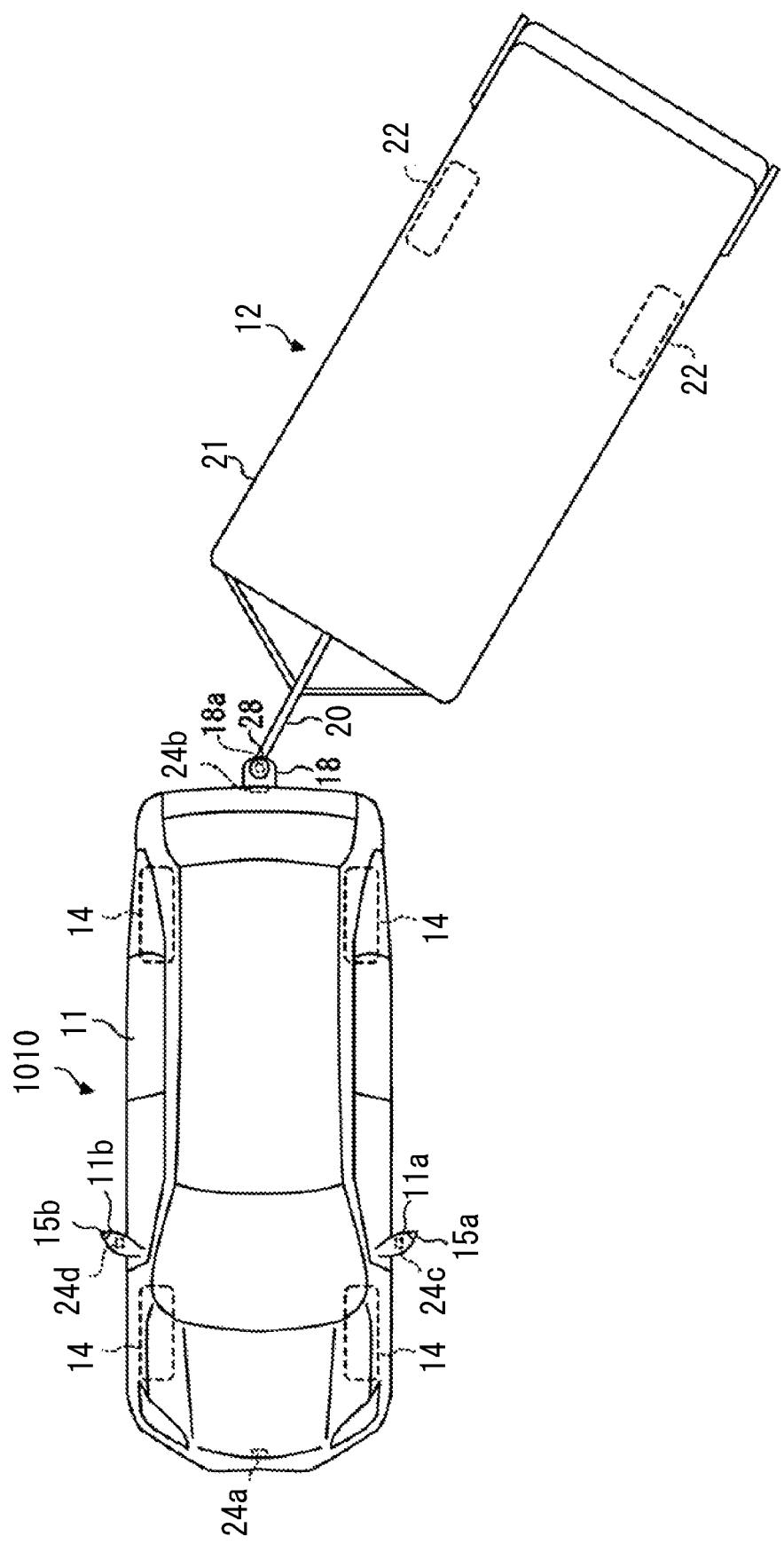
FIG. 16 is a plan view illustrating a towing vehicle at which a parking assist apparatus of a third embodiment is mounted and a towed vehicle.

FIG. 16 is a plan view of a towing vehicle 1010 at which a parking assist apparatus according to the third embodiment is mounted and a towed vehicle 12. The towing vehicle 1010 is also called a tractor and is configured to be drivable while towing the towed vehicle 12.

As illustrated in FIG. 16, the towing vehicle 1010 includes a vehicle body 11, four wheels 14, one or plural (four, according to the present embodiment) imaging units 24a, 24b, 24c, 24d, direction indicators 15a, 15b, and a towing device 18. The imaging units 24a, 24b, 24c and 24d are hereinafter referred to as the imaging units 24 when it is not necessary to distinguish the imaging units 24a, 24b, 24c and 24d from one another. The direction indicators 15a, 15b are hereinafter referred to as the direction indicators 15 when it is not necessary to distinguish the direction indicators 15a and 15b from each other.

The vehicle body 11 constitutes a passenger compartment where a passenger including a driver boards. The vehicle body 11 houses or holds the wheels 14 and the imaging units 24, for example, in addition to a parking assist apparatus which is explained later.

The imaging units 24 output data of moving image including plural frame images generated at a predetermined frame rate or data of still image as captured image data. An optical axis of each of the imaging units 24 is set obliquely downward. Thus, the imaging units 24 output the captured image data of surroundings of the towing vehicle 1010 including a road surface.

The imaging units 24 are provided around the vehicle body 11. For example, the imaging unit 24a is provided at a center portion in a left and right direction of a front end portion of the vehicle body 11 (for example, at a front bumper). The imaging unit 24a images surroundings in front of the towing vehicle 1010 and generates a front-side captured image. The imaging unit 24b is provided at a center portion in the left and right direction of a rear end portion of the vehicle body 11 (for example, at a rear bumper). The imaging unit 24b images surroundings behind the towing vehicle 1010 and generates a rear-side captured image. The imaging unit 24c is provided at a center portion in a front and rear direction of a left end portion of the vehicle body 11 (for example, at a left side mirror 11a). The imaging unit 24c images surroundings at a left side of the towing vehicle 1010 and generates a left-side captured image. The imaging unit 24d is provided at a center portion in the front and rear direction of a right end portion of the vehicle body 11 (for example, at a right side mirror 11b). The imaging unit 24d images surroundings at a right side of the towing vehicle 1010 and generates a right-side captured image.

The direction indicators 15a and 15b are so-called blinkers and are provided at a left side (for example, at the left side mirror 11a) and a right side (for example, at the right side mirror 11b) of the vehicle body 11 respectively, for example. The direction indicator 15 includes a luminescent device such as a Light Emitting Diode (LED), for example. The direction indicator 15 is lighted to indicate a driving direction of the towing vehicle 1010 to a vehicle in the surroundings.

The towing device 18 includes a spherical hitch ball 18a provided at an upper end portion of a column member which is arranged in a vertical direction.

The towed vehicle 12, which is also called a trailer, is driven while being towed by the towing vehicle 1010. The towed vehicle 12 includes a body 21, plural (two in the present embodiment) trailer wheels 22, a connecting member 20 and a coupler 28.

The body 21 is formed as a rectangular parallelepiped box type, for example. The body 21 is configured to be hollow so that luggage, for example, can be loaded inside the body 21. The body 21 may be a flat type in a plate form.

The connecting member 20 is provided at a center portion of the body 21 in the left and right direction. The connecting member 20 extends forward from a front end portion of the body 21.

The coupler 28 is provided at a front end portion of the connecting member 20. A spherical recessed portion is formed at the coupler 28 so as to cover the hitch ball 18a. The coupler 28 covers the hitch ball 18a so that the towed vehicle 12 is coupled to the towing vehicle 1010 in a turnable manner.

In the present embodiment, the direction indicator switch 1034 as illustrated in FIG. 3 is a member operated by the driver so as to operate the left and right direction indicators 15. The direction indicator switch 1034 is a lever-formed member provided at an outer circumferential portion of a steering portion 42, for example.

In the present embodiment, a display portion 26 as illustrated in FIG. 3 displays a display image including an image for guiding of a navigation system, for example, and an overhead view at a time of parking assist.

In the present embodiment, a sound output device 28 as illustrated in FIG. 3 outputs sound for guiding the driver in navigation, for example.

Figure 17:
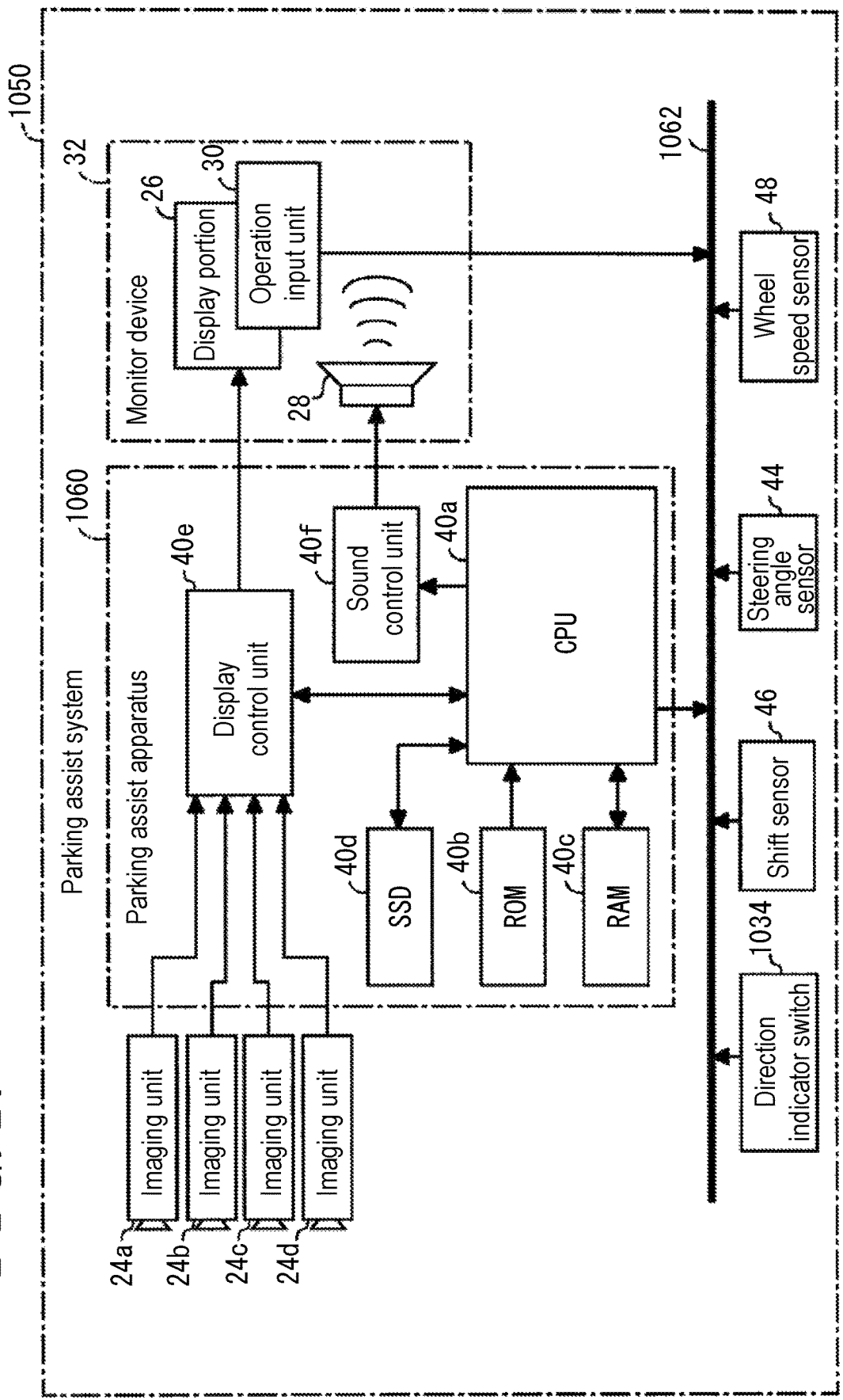
FIG. 17 is a block diagram illustrating an entire configuration of a parking assist system including the parking assist apparatus of the third embodiment.

FIG. 17 is a block diagram illustrating an entire configuration of a parking assist system 1050 including a parking assist apparatus 1060 according to the third embodiment. The parking assist system 1050 which is mounted at the towing vehicle 1010 specifies a position at which the towing vehicle 1010 can be parked as a target parking position on a basis of an object in the surroundings of the towing vehicle 1010 and generates the display image including the surrounding image which indicates surroundings in at least one of front, rear, left and right directions of the towing vehicle 1010 to cause the display portion 26 to display the aforementioned display image.

As illustrated in FIG. 17, the parking assist system 1050 includes the plural imaging units 24a, 24b, 24c, 24d, the direction indicator switch 1034, a shift sensor 46, a steering angle sensor 44, a wheel speed sensor 48, a monitor device 32, the parking assist apparatus 1060 and an in-vehicle network 1062.

The plural imaging units 24 output the captured image of the surroundings of the towing vehicle 1010 to the parking assist apparatus 1060.

The direction indicator switch 1034 outputs a direction indication operated by the driver to the in-vehicle network 1062.

The steering angle sensor 44 outputs information of a detected steering angle of the steering portion 42 to the in-vehicle network 1062.

The shift sensor 46 outputs a detected position of a shift operating portion 52 to the in-vehicle network 1062.

The wheel speed sensor 48 outputs wheel speed information as a value for calculating a vehicle speed, for example, to the in-vehicle network 1062.

The parking assist apparatus 1060 is a computer including a microcomputer such as an Electronic Control Unit (ECU), for example. The parking assist apparatus 1060 acquires data of the captured image from the imaging units 24. The parking assist apparatus 1060 transmits data related to the image or sound generated on a basis of the captured image, for example, to the monitor device 32. The parking assist apparatus 1060 transmits, to the monitor device 32, data related to the image or sound for instruction to the passenger or notification to the passenger, for example. The parking assist apparatus 1060 receives the instruction from the passenger via the in-vehicle network 1062 from the monitor device 32. The parking assist apparatus 1060 specifies the target parking position and causes the display portion 26 to display the display image including the surrounding image and the overhead view image in response to plural modes, the driving direction of the towing vehicle 1010 and the selected target parking position, for example, so as to assist the parking by the driver. The parking assist apparatus 1060 includes a Central Processing Unit (CPU) 40a, a Read Only Memory (ROM) 40b, a Random Access Memory (RAM) 40c, a display control unit 40e, a sound control unit 40f, and a Solid State Drive (SSD, a flash memory) 40d. The CPU 40a, the ROM 40b and the RAM 40c may be integrated in the same package.

The CPU 40a performs a parking assist process of the towing vehicle 1010, for example.

The in-vehicle network 1062 includes a Controller Area Network (CAN) and a Local Interconnect Network (LIN), for example. The in-vehicle network 1062 connects between the direction indicator switch 1034, the shift sensor 46, the steering angle sensor 44, the wheel speed sensor 48, an operation input unit 30 of the monitor device 32, and the parking assist apparatus 1060 so that information can be transmitted and received therebetween.

Figure 18:
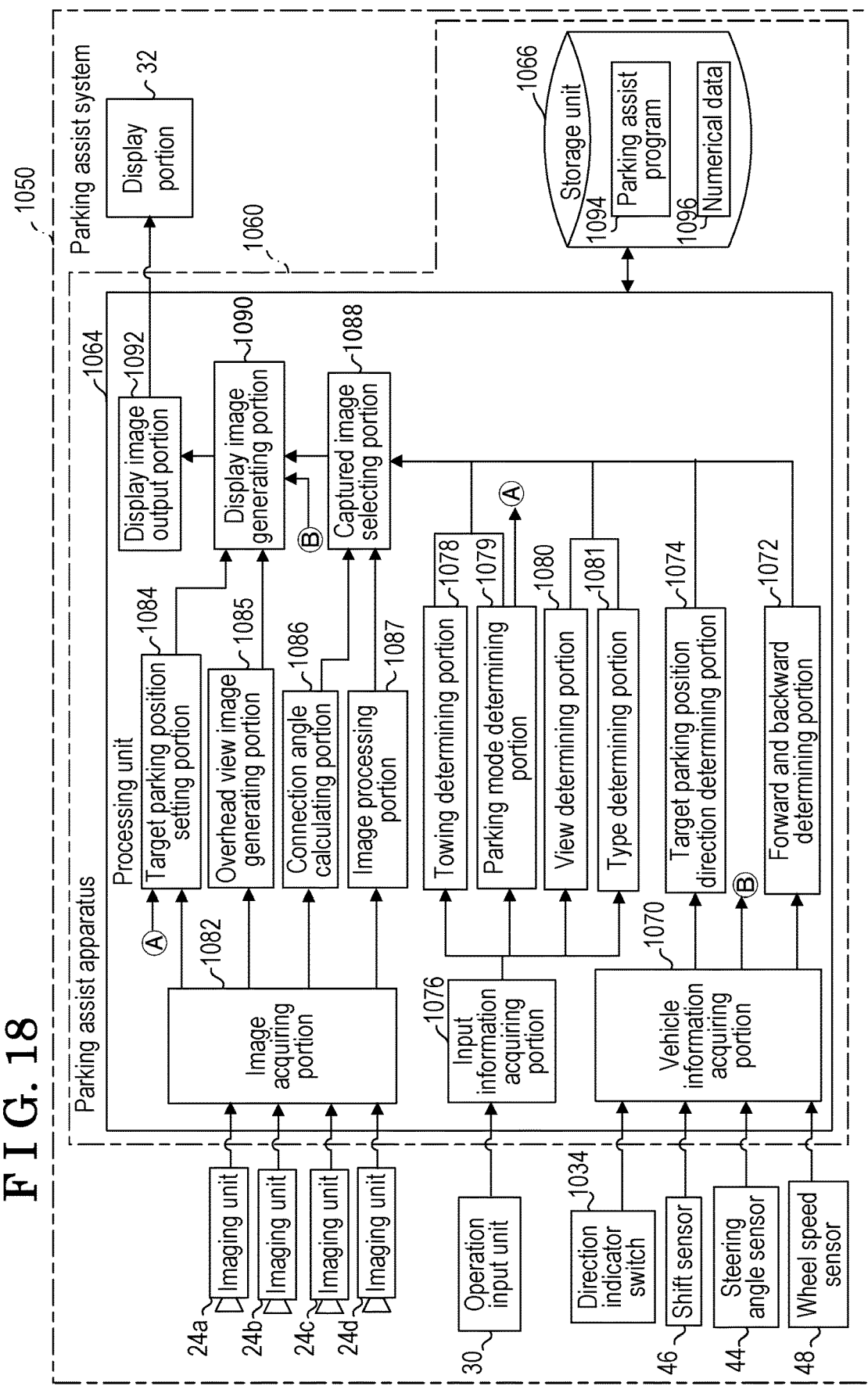
FIG. 18 is a block diagram explaining a function of the parking assist apparatus according to the third embodiment.

FIG. 18 is a block diagram explaining a function of the parking assist apparatus 1060. As illustrated in FIG. 18, the parking assist apparatus 1060 includes a processing unit 1064 and a storage unit 1066.

The processing unit 1064 is realized as a function of the CPU 40a or the display control unit 40e. The processing unit 1064 includes a vehicle information acquiring portion 1070, a forward and backward determining portion 1072, a target parking position direction determining portion 1074, an input information acquiring portion 1076, a towing determining portion 1078, a parking mode determining portion 1079, a view determining portion 1080, a type determining portion 1081, an image acquiring portion 1082, a target parking position setting portion 1084, an overhead view image generating portion 1085, a connection angle calculating portion 1086, an image processing portion 1087, a captured image selecting portion 1088, a display image generating portion 1090, and a display image output portion 1092. The processing unit 1064 may realize function of the vehicle information acquiring portion 1070, the forward and backward determining portion 1072, the target parking position direction determining portion 1074, the input information acquiring portion 1076, the towing determining portion 1078, the parking mode determining portion 1079, the view determining portion 1080, the type determining portion 1081, the image acquiring portion 1082, the target parking position setting portion 1084, the overhead view image generating portion 1085, the connection angle calculating portion 1086, the image processing portion 1087, the captured image selecting portion 1088, the display image generating portion 1090, and the display image output portion 1092 by reading a parking assist program 1094 serving as software stored at the storage unit 1066. Part of or all of the vehicle information acquiring portion 1070, the forward and backward determining portion 1072, the target parking position direction determining portion 1074, the input information acquiring portion 1076, the towing determining portion 1078, the parking mode determining portion 1079, the view determining portion 1080, the type determining portion 1081, the image acquiring portion 1082, the target parking position setting portion 1084, the overhead view image generating portion 1085, the connection angle calculating portion 1086, the image processing portion 1087, the captured image selecting portion 1088, the display image generating portion 1090, and the display image output portion 1092 may be realized by hardware such as an Application Specific Integrated Circuit (ASIC) or a Field Programmable Gate Array (FPGA), for example.

The vehicle information acquiring portion 1070 acquires information related to the towing vehicle 1010. Specifically, the vehicle information acquiring portion 1070 acquires information of direction in which the direction indicator 15 is lit up by the operation of the direction indicator switch 1034 by the driver. The vehicle information acquiring portion 1070 outputs the direction information of the direction indicator 15 to the target parking position direction determining portion 1074. The vehicle information acquiring portion 1070 acquires position information for determining drive and reverse, for example, of the shift operating portion 52. The vehicle information acquiring portion 1070 outputs the position information of the shift operating portion 52 to the forward and backward determining portion 1072. The vehicle information acquiring portion 1070 acquires steering angle information of the steering portion 42 from the steering angle sensor 44 and acquires wheel speed information indicating a rotation speed of the wheel 14, for example, from the wheel speed sensor 48. The vehicle information acquiring portion 1070 outputs the steering angle information of the steering portion 42 and the wheel speed information of the wheel 14 to the display image generating portion 1090.

The forward and backward determining portion 1072 determines the driving direction of the towing vehicle 1010 in a forward and backward direction based on the position information of the shift operating portion 52 acquired from the vehicle information acquiring portion 1070. Specifically, the forward and backward determining portion 1072 determines that the driving direction of the towing vehicle 1010 is backward in a case where the position of the shift operating portion 52 is the reverse and determines that the driving direction of the towing vehicle 1010 is forward in a case where the position of the shift operating portion 52 is other than the reverse, such as the drive, for example. The forward and backward determining portion 1072 outputs the determination result of the driving direction of the towing vehicle 1010 to the captured image selecting portion 1088.

The target parking position direction determining portion 1074 determines a direction of the target parking position in the left and right direction selected by the passenger based on the direction information of the direction indicator 15 acquired from the vehicle information acquiring portion 1070. For example, the target parking position direction determining portion 1074 may determine the direction indicated by the direction indicator 15 as the direction of the target parking position in the left and right direction. The target parking position direction determining portion 1074 outputs the determination result of the left and right direction of the target parking position selected by the passenger to the captured image selecting portion 1088.

The input information acquiring portion 1076 acquires an instruction which is input to the operation input unit 30 by the passenger from the operation input unit 30. The input information acquiring portion 1076 acquires a setting instruction related to a normal mode or a towing mode, a setting instruction of a parking mode, and a selection instruction of the target parking position, for example, from the operation input unit 30. The input information acquiring portion 1076 outputs the setting instruction related to the normal mode or the towing mode to the towing determining portion 1078. The input information acquiring portion 1076 outputs the setting instruction of the parking mode to the parking mode determining portion 1079. The input information acquiring portion 1076 outputs the selection instruction of the target parking position to the parking mode determining portion 1079.

The towing determining portion 1078 determines whether or not the towing vehicle 1010 tows the towed vehicle 12. For example, the towing determining portion 1078 determines whether the mode set by the passenger is the normal mode or the towing mode based on the setting instruction related to the normal mode or the towing mode acquired from the input information acquiring portion 1076. The normal mode is a mode set in a case where the towing vehicle 1010 does not tow the towed vehicle 12. Thus, in a case where the normal mode is set, the towing determining portion 1078 determines that the towing vehicle 1010 does not tow the towed vehicle 12. The towing mode is a mode set in a case where the towing vehicle 1010 tows the towed vehicle 12. The towing determining portion 1078 determines that the towing vehicle 1010 tows the towed vehicle 12 in a case where the towing mode is set. The towing determining portion 1078 outputs information on the determined mode or information whether or not the towing vehicle 1010 tows the towed vehicle 12 to the captured image selecting portion 1088.

The parking mode determining portion 1079 determines whether or not the setting instruction of the parking mode acquired by the input information acquiring portion 1076 is received therefrom. The parking mode is a mode for assisting the parking upon setting the target parking position. In the present embodiment, the parking mode can be set when the towing vehicle 1010 is driven forward. When it is determined that the setting instruction of the parking mode is received, the parking mode determining portion 1079 outputs the determination result that the parking mode is set to the captured image selecting portion 1088 and the target parking position setting portion 1084. The parking mode determining portion 1079 also determines whether or not the passenger selects the target parking position set by the target parking position setting portion 1084. In a case where the passenger selects the target parking position, the parking mode determining portion 1079 outputs the determination result that the passenger selects the target parking position to the captured image selecting portion 1088.

The view determining portion 1080 determines and changes a view style of the surrounding image selected by the passenger. The view style of the surrounding image includes a rearview style and a side-view style. In the rearview style, a rear-side surrounding image generated from the rear-side captured image imaged by the imaging unit 24b is displayed. In the side-view style, the surrounding image generated from at least one of the left and right captured images imaged by the imaging units 24c and 24d is displayed. The view determining portion 1080 may acquire a view switch instruction input by the passenger via the input information acquiring portion 1076 to determine switching of the view style of the surrounding image. When the view style is determined, the view determining portion 1080 outputs the determination result to the captured image selecting portion 1088.

The type determining portion 1081 determines the type of the towed vehicle 12. The type of the towed vehicle 12 includes, for example, a box type and a frame type. The box type, which is formed in a hollow rectangular parallelepiped form, constitutes the towed vehicle 12 including a configuration where a side wall is substantially equal to or higher than the towing vehicle 1010 and a field of vision in the backward direction of the towing vehicle 1010 is interrupted by the towed vehicle 12. The frame type constitutes the towed vehicle 12 where a top plate and side walls, for example, are mostly omitted and the trailer wheels 22 are provided at a bottom plate in a plate form. The type determining portion 1081 may acquire information of the type which is input by the passenger via the input information acquiring portion 1076 and determine the type of the towed vehicle 12 based on the aforementioned type information. The type determining portion 1081 outputs the determination result of the type of the towed vehicle 12 to the captured image selecting portion 1088.

The image acquiring portion 1082 acquires the captured images of the surroundings of the towing vehicle 1010 from the imaging units 24. Specifically, the image acquiring portion 1082 acquires the front-side captured image of the front side of the towing vehicle 1010 from the imaging unit 24a, the rear-side captured image of the rear-side of the towing vehicle 1010 imaged by the imaging unit 24b, the left-side captured image of the left side of the towing vehicle 1010 imaged by the imaging unit 24c, and the right-side captured image of the right side of the towing vehicle 1010 imaged by the imaging unit 24d. The image acquiring portion 1082 outputs the captured images which are acquired from the imaging units 24 to the target parking position setting portion 1084 and the overhead view image generating portion 1085.

The target parking position setting portion 1084, which acquires the determination result that the parking mode is set from the parking mode determining portion 1079, then sets the target parking position for selection by the passenger based on the plural captured images of the surroundings of the towing vehicle 1010 acquired from the image acquiring portion 1082. Specifically, the target parking position setting portion 1084 detects an object such as an obstacle, for example, in the surroundings of the towing vehicle 1010 and the towed vehicle 12 from the captured images. The target parking position setting portion 1084 then detects the position where the towing vehicle 1010 and the towed vehicle 12 can be parked on a basis of the position of the object and sets the target parking position. The target parking position setting portion 1084 outputs the target parking position to the display image generating portion 1090.

The overhead view image generating portion 1085 acquires the plural captured images of the surroundings of the towing vehicle 1010 imaged by each of the imaging units 24 and generates the overhead view image from the aforementioned captured images. Specifically, the overhead view image generating portion 1085 converts the plural captured images to images viewed from virtual viewpoints by converting viewpoints of the plural captured images to an upper side of the towing vehicle 1010 and connects the aforementioned converted images to one another. Accordingly, the overhead view image generating portion 1085 generates the overhead view image which is obtained by looking down the surroundings of the towing vehicle 1010 from the virtual viewpoint that is converted to the upper side of the towing vehicle 1010. The overhead view image generating portion 1085 may generate the overhead view image including a region of an actual world wider than the overhead view image included in the display image generated by the display image generating portion 1090 which is explained later. The overhead view image generating portion 1085 outputs the generated overhead view image to the display image generating portion 1090.

The connection angle calculating portion 1086 calculates a connection angle $\theta t$ serving as an angle of the towed vehicle 12 relative to the towing vehicle 1010. The connection angle $\theta t$ is a crossing angle between a straight line along a vehicle longitudinal direction of the towing vehicle 1010 and a straight line along a vehicle longitudinal direction of the towed vehicle 12, for example. In a case where the towing vehicle 1010 and the towed vehicle 12 are arranged in alignment with each other, the connection angle $\theta t$ is defined to be 0°. In a case where the towing vehicle 1010 turns rightward and the towed vehicle 12 turns in a counterclockwise direction around the hitch ball 18a to be positioned at a right side of the towing vehicle 1010, the sign of the connection angle $\theta t$ is defined to be positive. On the other hand, in a case where the towing vehicle 1010 turns leftward and the towed vehicle 12 turns in a clockwise direction around the hitch ball 18a to be positioned at a left side of the towing vehicle 1010, the sign of the connection angle $\theta t$ is defined to be negative. The connection angle calculating portion 1086 acquires the rear, left and right captured images of the towing vehicle 1010 imaged by the imaging units 24b, 24c and 24d via the image acquiring portion 1082, for example. The connection angle calculating portion 1086 calculates the connection angle $\theta t$ based on the image of the towed vehicle 12 included in the acquired captured images. For example, the connection angle calculating portion 1086 may calculate the connection angle $\theta t$ based on a boundary line between the image of the towed vehicle 12 and an image of a background in the captured image.

The image processing portion 1087 conducts image processing of the plural captured images acquired from the image acquiring portion 1082. For example, the image processing portion 1087 may execute the image processing such as distortion removal, for example, on the captured images. The image processing portion 1087 outputs the captured images on which the image processing is conducted to the captured image selecting portion 1088.

The captured image selecting portion 1088 selects the captured image used for the surrounding image for display based on predetermined conditions. Specifically, the captured image selecting portion 1088 selects the front-side captured image in a case where the towing vehicle 1010 is driven forward. The captured image selecting portion 1088 selects the rear-side captured image when the forward driving of the towing vehicle 1010 is changed to the backward driving.

The captured image selecting portion 1088 may select any image from the plural captured images including the rear-side captured image, the left-side captured image and the right-side captured image based on the connection angle $\theta t$ during the backward driving of the towing vehicle 1010. Specifically, in a case where the passenger selects the side-view style during the backward driving of the towing vehicle 1010, the captured image selecting portion 1088 may select one or two captured images used for the surrounding image from the plural captured images based on whether or not the parking mode is set and a comparison between the connection angle $\theta t$ and a threshold angle $Th\theta$. The threshold angle $Th\theta$ is an angle which is set beforehand and may be set within a range from 10° to 20°, for example.

In a case where the side-view style is selected during the backward driving of the towing vehicle and the magnitude of the connection angle $\theta t$ is smaller than the threshold angle $Th\theta$ (i.e., $-Th\theta < \theta t < +Th\theta$ [formula 1]), for example, the captured image selecting portion 1088 selects both the left-side captured image and the right-side captured image.

The captured image selecting portion 1088 selects the captured image at a side at which the towed vehicle 12 exists from between the left-side captured image and the right-side captured image in a case where the magnitude of the connection angle θt is greater than the threshold angle Thθ. For example, the captured image selecting portion 1088 selects the right-side captured image in a case where the side-view style is selected during the backward driving of the towing vehicle 1010, the connection angle θt is positive, and the magnitude of the connection angle θt is equal to or greater than the threshold angle Thθ (i.e., θt≥ Thθ [formula 2]), i.e., the towed vehicle 12 is positioned at the right side. The captured image selecting portion 1088 selects the left-side captured image in a case where the side-view style is selected during the backward driving of the towing vehicle 1010, the connection angle θt is negative, and the magnitude of the connection angle θt is equal to or greater than the threshold angle Thθ (i.e., θt≥−Thθ [formula 3]), i.e., the towed vehicle 12 is positioned at the left side.

For example, in a case where the target parking position set in the parking mode is selected by the passenger during the backward driving of the towing vehicle 1010 and the side-view style is selected, the captured image selecting portion 1088 selects the captured image at the side where the target parking position selected by the passenger is positioned from between the left-side captured image and the right-side captured image. For example, in a case where the passenger selects the target parking position at the right side, the captured image selecting portion 1088 selects the right-side captured image. In a case where the passenger selects the target parking position at the left side, the captured image selecting portion 1088 selects the left-side captured image.

In a case where the target parking position is selected by the passenger and the rear-view style is selected during the backward driving of the towing vehicle 1010, the captured image selecting portion 1088 selects the rear-side captured image.

The captured image selecting portion 1088 may select any of the plural captured images including the rear-side captured image, the left-side captured image and the right-side capture image based on the type of the towed vehicle 12 during the backward driving of the towing vehicle 1010. Specifically, the captured image selecting portion 1088 may select one or two captured images used for the surrounding image from among the plural captured images based on the type of the towed vehicle 12 and the connection angle θt during the backward driving of the towing vehicle 1010.

For example, the captured image selecting portion 1088 selects both the left-side captured image and the right-side captured image in a case where the magnitude of the connection angle θt is smaller than the threshold angle Thθ (i.e., [formula 1] is satisfied) in a state where the side-view style is selected and the type determining portion 1081 determines that the towed vehicle 12 is of the box type during the backward driving of the towing vehicle 1010. The captured image selecting portion 1088 selects the rear-side captured image in a case where the magnitude of the connection angle θt is smaller than the threshold angle Thθ (i.e., [formula 1] is satisfied) in a state where the side-view style is selected and the type determining portion 1081 determines that the towed vehicle 12 is of the frame type during the backward driving of the towing vehicle 1010. In a case where the connection angle θt is inhibited from satisfying [formula 1], the captured image selecting portion 1088 may select either the left captured image or the right captured image in the same manner as the above, i.e., by using [formula 2] and [formula 3], or based on the target parking position at the left or right side, regardless of the type of the towed vehicle 12.

The captured image selecting portion 1088 outputs, together with the selected captured image, mode information and the determination results acquired from the towing determining portion 1078, the parking mode determining portion 1079, the view determining portion 1080 and the type determining portion 1081 to the display image generating portion 1090.

The display image generating portion 1090 generates the surrounding image from one or two captured images selected by the captured image selecting portion 1088. The surrounding image may be the captured image itself on which the image processing has been conducted by the image processing portion 1087 or an image obtained by conducting the image processing such as trimming, for example, on the aforementioned captured image on which the image processing has been conducted. For example, in a case where the towing vehicle 1010 is driven forward, the display image generating portion 1090 generates the front-side surrounding image from the front-side captured image acquired from the captured image selecting portion 1088. In a case where the towing vehicle 1010 is driven backward, the display image generating portion 1090 generates the surrounding image from one or two captured images selected by the captured image selecting portion 1088 from among the rear-side captured image, the left-side captured image and the right-side captured image imaged by the imaging units 24b, 24c and 24d. In a case where the towing vehicle 1010 is driven backward and the display image generating portion 1090 acquires the rear-side captured image from the captured image selecting portion 1088, the display image generating portion 1090 generates the rear-side surrounding image based on the aforementioned rear-side captured image. In a case where the towing vehicle 1010 is driven backward and the display image generating portion 1090 acquires the left-side captured image from the captured image selecting portion 1088, the display image generating portion 1090 generates the left-side surrounding image based on the aforementioned left-side captured image. In a case where the towing vehicle 1010 is driven backward and the display image generating portion 1090 acquires the right-side captured image from the captured image selecting portion 1088, the display image generating portion 1090 generates the right-side surrounding image based on the aforementioned right-side captured image. In a case where the towing vehicle 1010 is driven backward and the display image generating portion 1090 acquires both the right-side captured image and the left-side captured image from the captured image selecting portion 1088, the display image generating portion 1090 generates the both-side surrounding image where a portion of the left-side surrounding image (for example, a left end portion) and a portion of the right-side surrounding image (for example, a right end portion) are connected, the left-side surrounding image and the right-side surrounding image being generated on a basis of the left-side captured image and the right-side captured image. The display image generating portion 1090 may generate the surrounding image for display by superimposing an assist line such as a driving line for assisting the parking on the surrounding image.

The display image generating portion 1090 generates the overhead view image for display based on the overhead view image acquired from the overhead view image generating portion 1085. For example, the display image generating portion 1090 may generate the overhead view image for display where the overhead view image in which a trimming region is trimmed and on which the image of the towing vehicle 1010 is superimposed, for example. At this time, the display image generating portion 1090 calculates a route of the towing vehicle 1010 based on information of the steering angle of the steering portion 42 and wheel speed information of the wheels 14 acquired from the vehicle information acquiring portion 1070, without moving the image of the towing vehicle 1010 within the overhead view image, and changes the overhead view image based on the aforementioned route. Further, the display image generating portion 1090 may superimpose the image of the towed vehicle 12 on the overhead view image in the case of the towing mode.

The display image generating portion 1090 generates the display image including the overhead view image for display and the surrounding image. For example, the display image generating portion 1090 may generate the display image where the overhead view image is arranged at a left side and the surrounding image is arranged at a right side. The display image generating portion 1090 outputs the display image to the display image output portion 1092.

The display image output portion 1092 outputs the display image acquired from the display image generating portion 1090 to the display portion 26 so that the display image is displayed thereat.

The storage unit 1066 is realized as functions of the ROM 40b, the RAM 40c and the SSD 40d, for example. The storage unit 1066 stores program executed by the processing unit 1064, data necessary for executing the program and data generated by the execution of the program. The storage unit 1066 may be realized as a function of a storage device that is externally provided. For example, the storage unit 1066 stores the parking assist program 1094 executed by the processing unit 1064. The storage unit 1066 stores numerical data 1096 necessary for the execution of the parking assist program 1094. The numerical data 1096 includes the threshold angle Thθ, for example. The storage unit 1066 temporarily stores the surrounding image, the overhead view image, the display image, the connection angle θt, and information related to setting of the mode, for example, generated or calculated by the execution of the parking assist program 1094.

Figure 19:
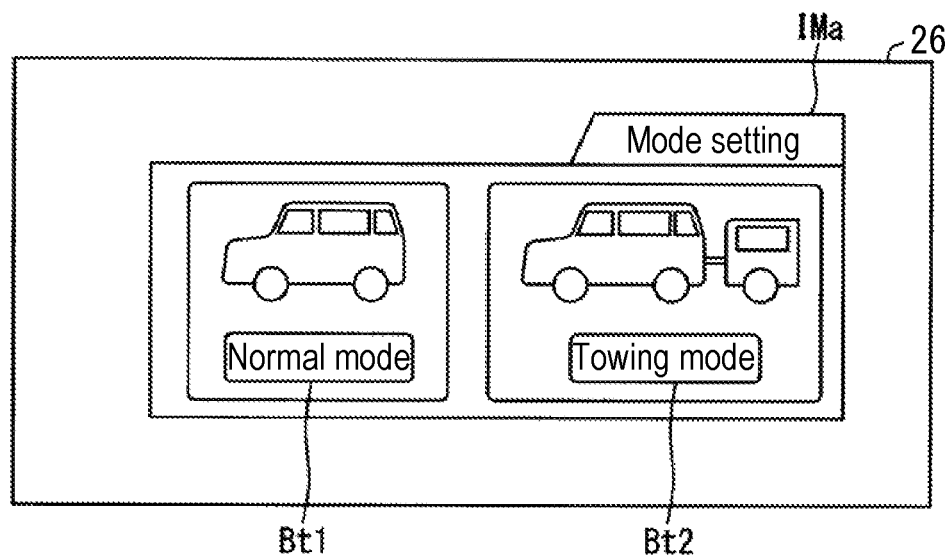
FIG. 19 is a view illustrating an example of a mode setting image for selecting one of a normal mode and a towing mode according to the third embodiment.

FIG. 19 is a view illustrating an example of a mode setting image IMa for selecting any one of the normal mode and the towing mode. As illustrated in FIG. 19, the towing determining portion 1078 accepts a mode selection by the passenger in a state where the mode setting image IMa including a normal mode button Bt1 and a towing mode button Bt2 is displayed at the display portion 26. Specifically, the towing determining portion 1078 determines that the normal mode is selected when acquiring from the input information acquiring portion 1076 that the passenger touches the normal mode button Bt1 and determines that the towing mode is selected when acquiring from the input information acquiring portion 1076 that the passenger touches the towing mode button Bt2.

Figure 20:
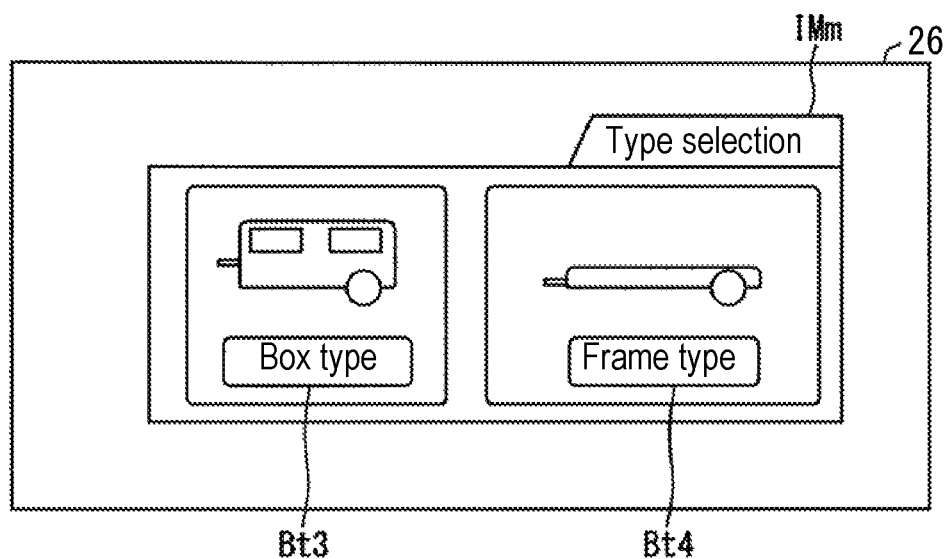
FIG. 20 is a view illustrating an example of a type selecting image for selecting F52 and a frame type according to the third embodiment.

FIG. 20 is a view illustrating an example of a type selecting image IMm for selecting any one of the box type and the frame type. As illustrated in FIG. 20, the type determining portion 1081 accepts a type selection of the towed vehicle 12 by the passenger in a state where the type selecting image IMm including a box type selection button Bt3 and a frame type selection button Bt4 is displayed. Specifically, the type determining portion 1081 determines that the box type is selected when acquiring from the input information acquiring portion 1076 that the passenger touches the box type selection button Bt3 and determines that the frame type is selected when acquiring from the input information acquiring portion 1076 that the passenger touches the frame type selection button Bt4.

Next, the display image generated by the display image generating portion 1090 is explained.

Figure 21:
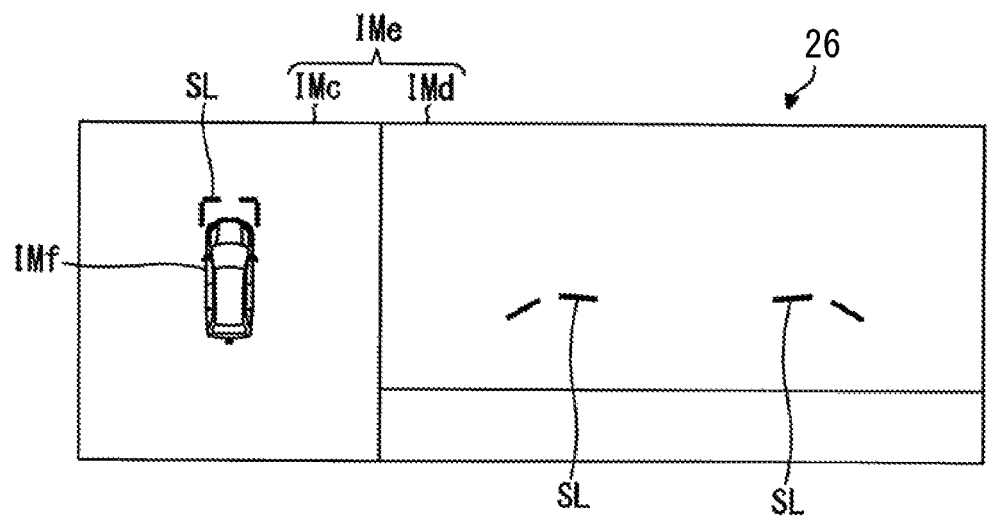
FIG. 21 is a view illustrating an example of a display image displayed in the normal mode and a forward driving according to the third embodiment.

FIG. 21 is a view illustrating an example of a display image IMe displayed in a case of the normal mode and the forward driving. In the case of the normal mode and the forward driving, the captured image selecting portion 1088 selects the front-side captured image which is output to the display image generating portion 1090. The display image generating portion 1090 generates a front-side surrounding image IMd based on the front-side captured image. The display image generating portion 1090 generates the display image IMe as illustrated in FIG. 21 including an overhead view image IMc where the image of the towing vehicle 1010 (which is hereinafter referred to as an own vehicle image IMf) is superimposed at a center and the front-side surrounding image IMd.

Figure 22:
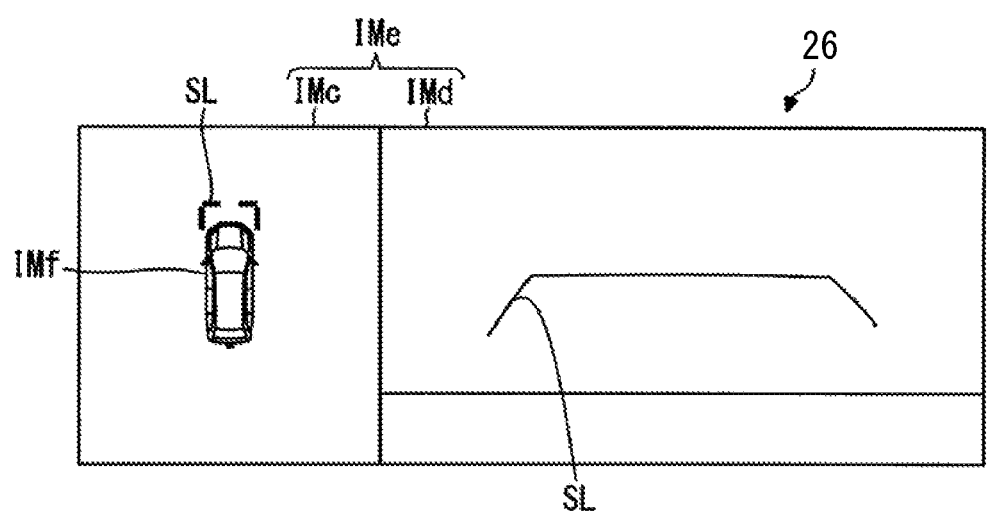
FIG. 22 is a view illustrating an example of the display image displayed in the normal mode and a backward driving according to the third embodiment.

FIG. 22 is a view illustrating an example of the display image IMe displayed in a case of the normal mode and the backward driving. In the case of the normal mode and the backward driving, the captured image selecting portion 1088 selects the rear-side captured image which is output to the display image generating portion 1090. The display image generating portion 1090 generates the rear-side surrounding image IMd based on the rear-side captured image. The display image generating portion 1090 generates the display image IMe as illustrated in FIG. 22 including the overhead view image IMc where the own vehicle image IMf is superimposed and the rear-side surrounding image IMd.

Figure 23:
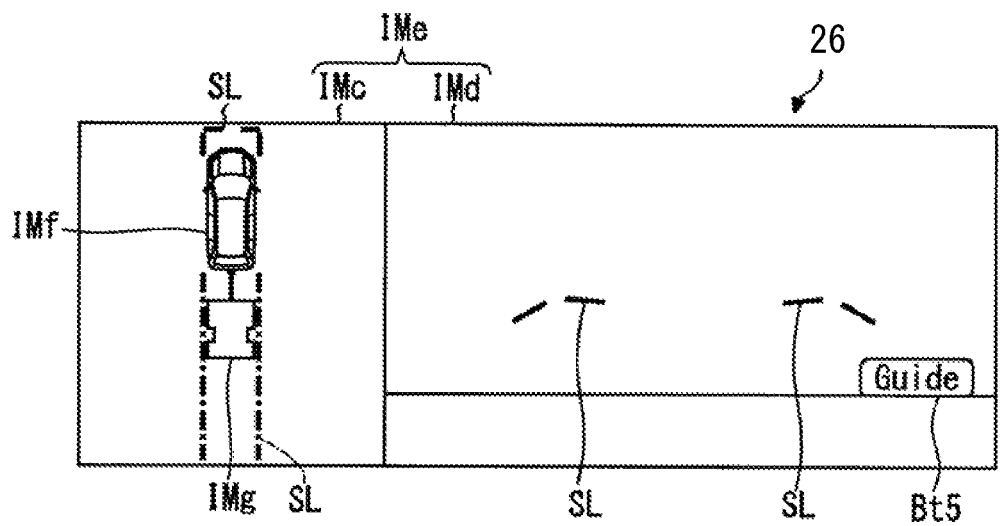
FIG. 23 is a view illustrating an example of the display image displayed in the towing mode and the forward driving according to the third embodiment.

FIG. 23 is a view illustrating an example of the display image IMe displayed in a case of the towing mode and the forward driving. In the case of the towing mode and the forward driving, the captured image selecting portion 1088 selects the front-side captured image which is output to the display image generating portion 1090. The display image generating portion 1090 generates the front-side surrounding image IMd based on the front-side captured image. The display image generating portion 1090 generates the display image IMe as illustrated in FIG. 23 including the overhead view image IMc where the own vehicle image IMf and the image of the towed vehicle 12 (which is hereinafter referred to as a towed image IMg) are superimposed and the front-side surrounding image IMd. In a case where the towed vehicle 12 is towed, the display image generating portion 1090 may bring the own vehicle image IMf and the towed vehicle 12 to be arranged forward within the overhead view image IMc. Further, the display image generating portion 1090 may superimpose assist lines SL indicating a driving route of the towing vehicle 1010 and a distance from the towing vehicle 1010 on the display image IMe.

Figure 24:
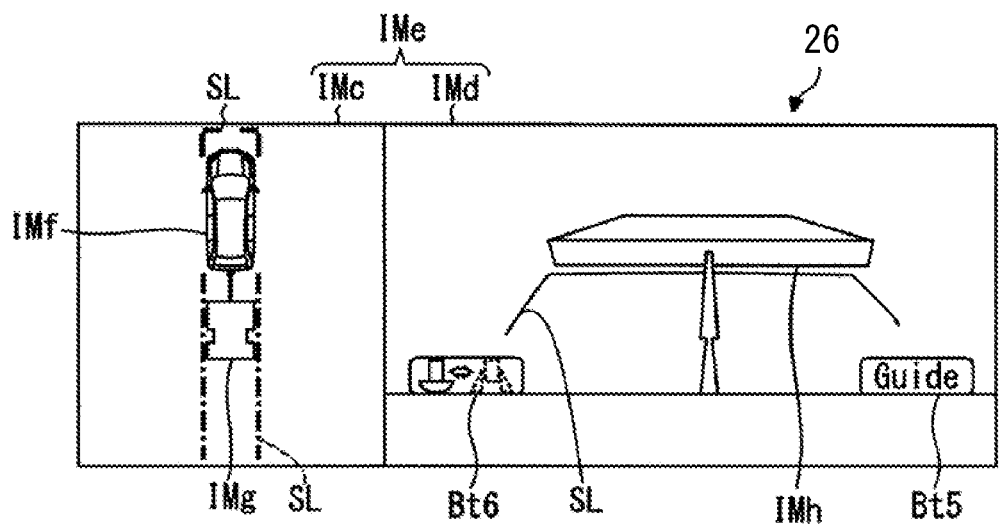
FIG. 24 is a view illustrating an example of the display image displayed in the towing mode and the backward driving according to the third embodiment.
Figure 25:
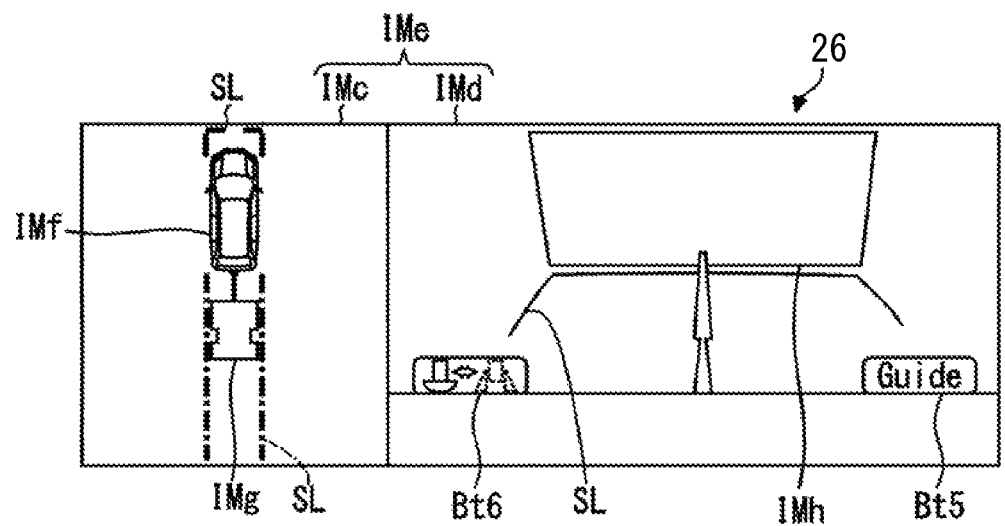
FIG. 25 is a view illustrating an example of the display image displayed in the towing mode and the backward driving according to the third embodiment.

FIGS. 24 and 25 are views each of which illustrates an example of the display image IMe in a case of the towing mode and the backward driving. In a case before the parking mode is set and where the rear-view style is selected in the towing mode and the backward driving, the captured image selecting portion 1088 selects the rear-side captured image which is output to the display image generating portion 1090. The display image generating portion 1090 generates the rear-side surrounding image IMd based on the rear-side captured image. The display image generating portion 1090 generates the display image IMe as illustrated in FIGS. 24 and 25 including the overhead view image IMc where the own vehicle image IMf and the towed image IMG are superimposed and the rear-side surrounding image IMd. The display image generating portion 1090 may superimpose a guide button Bt5 for supporting parking assist and a view selection button Bt6 for changing the view style, for example, on the rear-side surrounding image IMd. FIG. 24 illustrates a case where the frame type towed vehicle 12 is towed. FIG. 25 illustrates a case where the box type towed vehicle 12 is towed. Thus, an image IMh of the towed vehicle 12 included in the rear-side surrounding image IMd is not the same between FIGS. 24 and 25.

Figure 26:
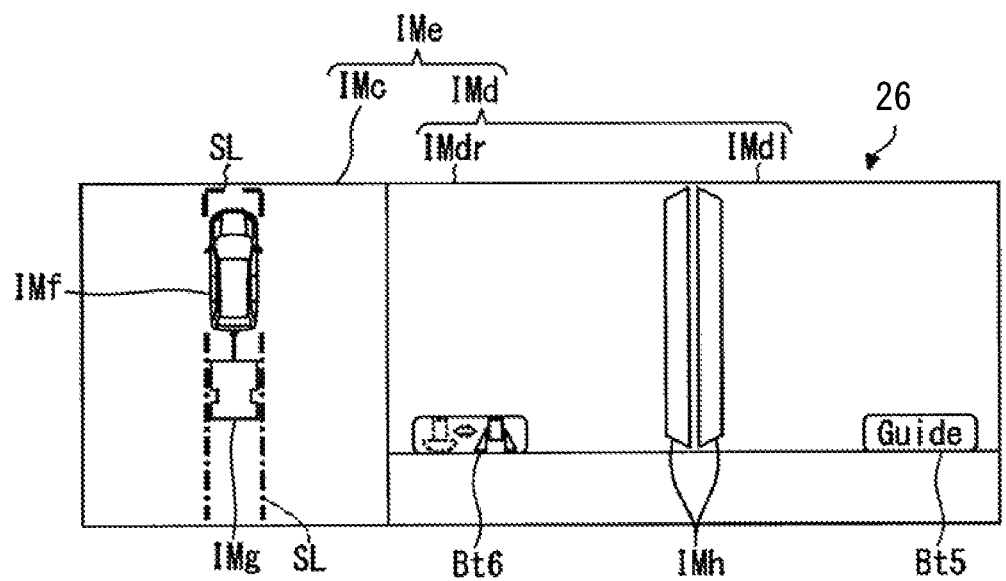
FIG. 26 is a view illustrating an example of the display image displayed in the towing mode and the backward driving before setting of a parking mode according to the third embodiment.

FIG. 26 is a view illustrating an example of the display image IMe displayed in a case of the towing mode and the backward driving before the parking mode is set. In a case before the parking mode is set and where the side-view style is selected, [formula 1] is satisfied, in the towing mode and the backward driving, the captured image selecting portion 1088 selects the left-side captured image and the right-side captured image which are output to the display image generating portion 1090. The display image generating portion 1090 generates the both-side surrounding image IMd where a right end portion IMdr of the right-side surrounding image and a left end portion IMdl of the left-side surrounding image are connected, the right-side surrounding image and the left-side surrounding image being generated on a basis of the left-side captured image and the right-side captured image. In this case, the image IMh of the right end portion of the towed vehicle 12 within the right-side surrounding image and the image IMh of the left end portion of the towed vehicle 12 within the left-side surrounding image are included at a center portion of the both-side surrounding image IMd. The display image generating portion 1090 generates the display image IMe as illustrated in FIG. 26 including the overhead view image IMc where the own vehicle image IMf and the towed image IMg are superimposed and the both-side surrounding image IMd where the guide button Bt5 and the view selection button Bt6 are superimposed.

Figure 27:
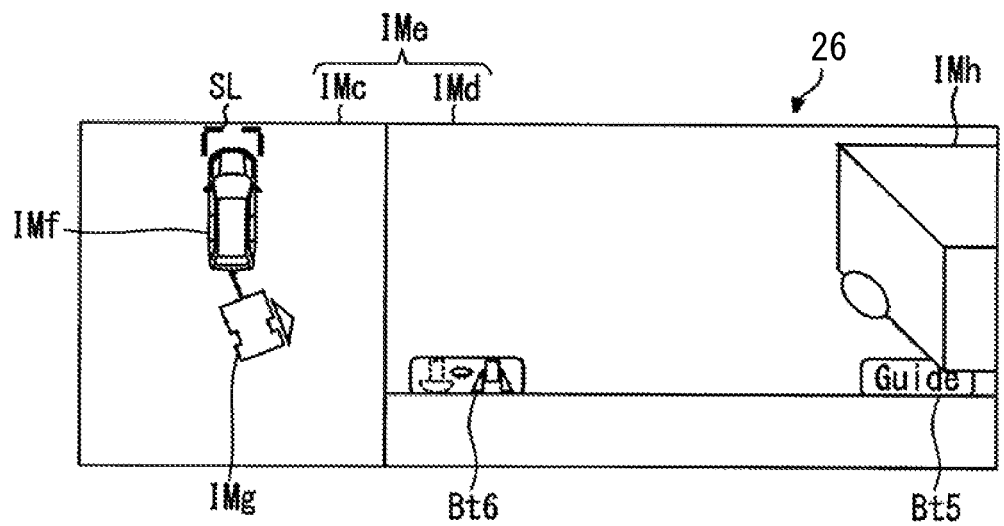
FIG. 27 is a view illustrating an example of the display image displayed in the towing mode, the backward driving and a rightward turning according to the third embodiment.

FIG. 27 is a view illustrating an example of the display image IMe displayed in a case of the towing mode, the backward driving and the rightward turning. In a case before the parking mode is set and where the frame-type towed vehicle 12 is towed, [formula 2] is satisfied with the backward driving and the rightward turning, the side view style is selected, in the towing mode, the captured image selecting portion 1088 selects the right-side captured image which is output to the display image generating portion 1090. The display image generating portion 1090 generates the right-side surrounding image IMd based on the right-side captured image. The display image generating portion 1090 generates the display image IMe as illustrated in FIG. 27 including the overhead view image IMc where the own vehicle image IMf and the towed image IMg are superimposed and the right-side surrounding image IMd. The display image generating portion 1090 may superimpose the guide button Bt5 for supporting the parking assist and the view selection button Bt6 for changing the view style, for example, on the right-side surrounding image IMd.

Figure 28:
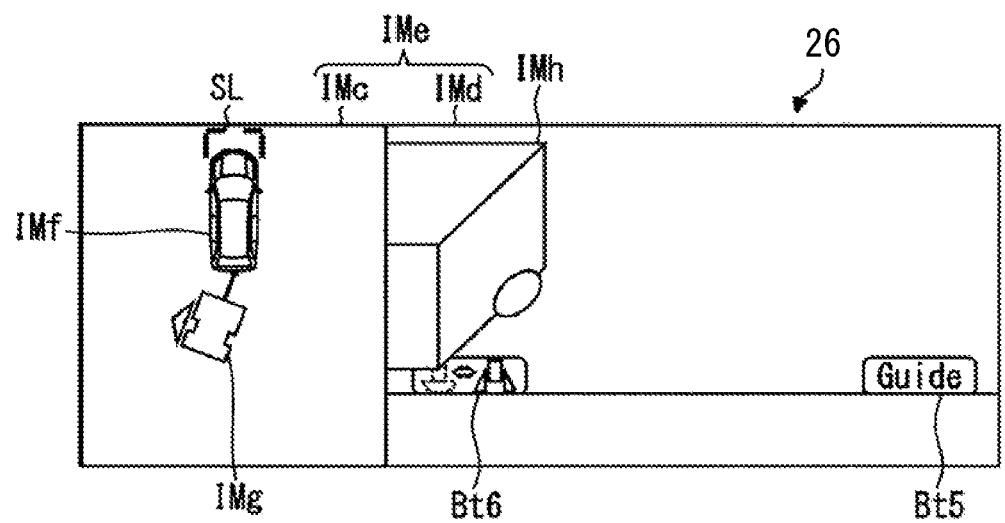
FIG. 28 is a view illustrating an example of the display image displayed in the towing mode, the backward driving and a leftward turning according to the third embodiment.

FIG. 28 is a view illustrating an example of the display image IMe displayed in a case of the towing mode, the backward driving and the leftward turning. In a case before the parking mode is set and where the frame type towed vehicle 12 is towed, [formula 3] is satisfied with the backward driving and the leftward turning, the side-view style is selected, in the towing mode, the captured image selecting portion 1088 selects the left-side captured image which is output to the display image generating portion 1090. The display image generating portion 1090 generates the left-side surrounding image IMd based on the left-side captured image. The display image generating portion 1090 generates the display image IMe as illustrated in FIG. 28 including the overhead view image IMc where the own vehicle image IMf and the towed image IMg are superimposed and the left-side surrounding image IMd. The display image generating portion 1090 may superimpose the guide button Bt5 for supporting the parking assist and the view selection button Bt6 for changing the view style, for example, on the left-side surrounding image IMd.

Figure 29:
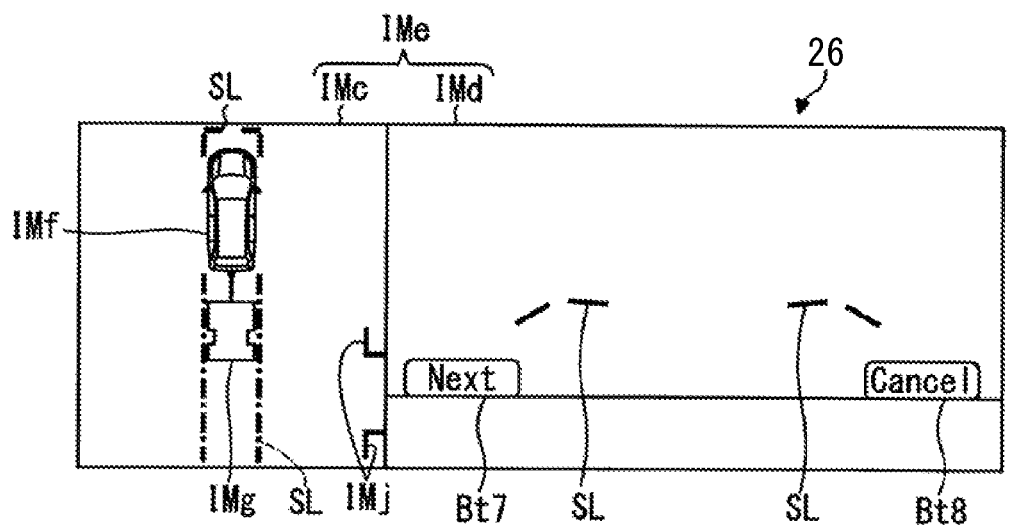
FIG. 29 is a view illustrating an example of the display image displayed in the towing mode and the forward driving with setting of the parking mode according to the third embodiment.

FIG. 29 is a view illustrating an example of the display image IMe displayed in a case where the parking mode is set, in the towing mode and the forward driving. In a case where the parking mode is set, in the towing mode and the forward driving, the captured image selecting portion 1088 selects the front-side captured image which is output to the display image generating portion 1090. The display image generating portion 1090 generates the front-side surrounding image IMd based on the front-side captured image. The display image generating portion 1090 generates the display image IMe as illustrated in FIG. 29 including the overhead view image IMc where the own vehicle image IMf and the towed image IMg are superimposed and the front-side surrounding image IMd. Further, the display image generating portion 1090 superimpose an image indicating the target parking position (which is hereinafter referred to as a parking position image IMj) at a position corresponding to the target parking position acquired from the target parking position setting portion 1084 on the overhead view image IMc. The display image generating portion 1090 may superimpose a next button Bt7 for selecting the target parking position which is being displayed and a cancel button Bt8 for cancelling the target parking position, for example, on the front-side surrounding image IMd. When the next button Bt7 is operated and the target parking position being displayed is selected, the display image generating portion 1090 displays the guide button Bt5 in place of the next button Bt7 and the cancel button Bt8.

Figure 30:
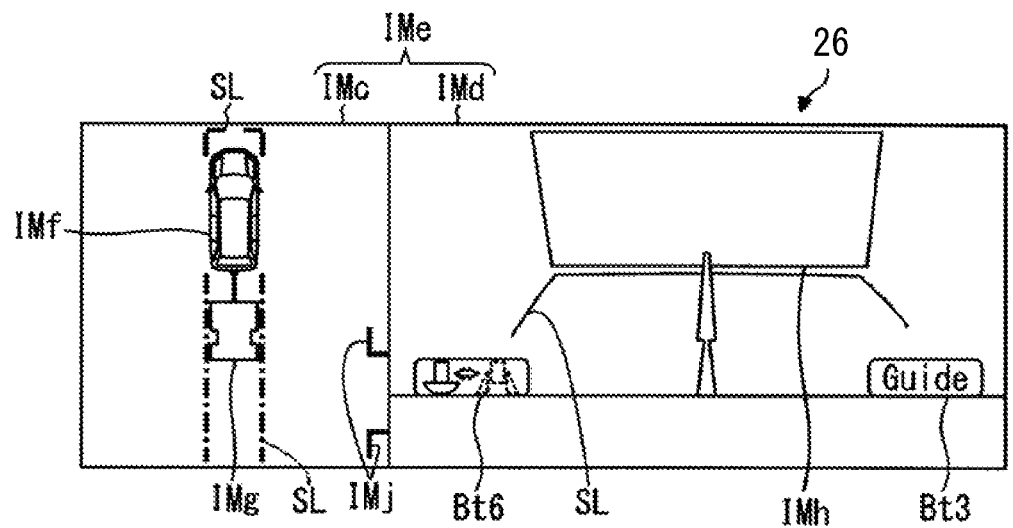
FIG. 30 is a view illustrating an example of the display image displayed in the towing mode and the backward driving with a target parking position being selected according to the third embodiment.

FIG. 30 is a view illustrating an example of the display image IMe displayed in a case where the target parking position is selected, in the towing mode and the backward driving. In a case where the towed vehicle 12 is of the box type, the rear-view style and the target parking position are selected, in the towing mode and the backward driving, the captured image selecting portion 1088 selects the rear-side captured image which is output to the display image generating portion 1090. The display image generating portion 1090 generates the rear-side surrounding image IMd based on the rear-side captured image. The display image generating portion 1090 generates the display image IMe as illustrated in FIG. 30 including the overhead view image IMc where the selected parking position image IMj, the own vehicle image IMf and the towed image IMg are superimposed and the rear-side surrounding image IMd. The display image generating portion 1090 may superimpose the guide button Bt5 and the view selection button Bt6, for example, on the rear-side surrounding image IMd.

Figure 31:
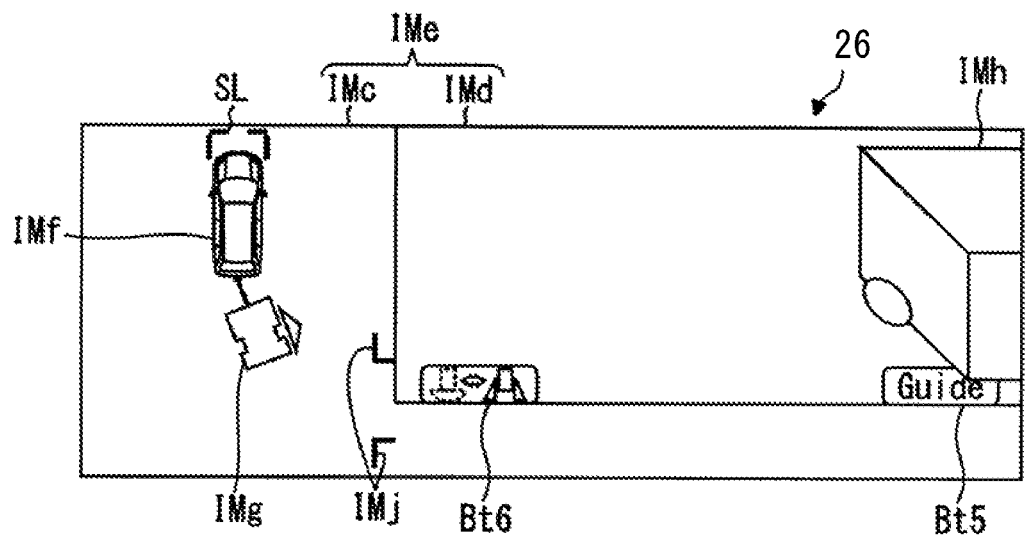
FIG. 31 is a view illustrating an example of the display image displayed in the towing mode, the backward driving and the rightward turning with the target parking position at a right side being selected according to the third embodiment.

FIG. 31 is a view illustrating an example of the display image IMe displayed in a case where the target parking position at the right side is selected, in the towing mode, the backward driving and the rightward turning. In a case where the target parking position at the right side and the side-view style are selected, in the towing mode, the backward driving and the rightward turning, the captured image selecting portion 1088 selects the right-side captured image which is output to the display image generating portion 1090. The display image generating portion 1090 generates the right-side surrounding image IMd based on the right-side captured image. The display image generating portion 1090 generates the display image IMe as illustrated in FIG. 31 including the overhead view image IMc where the selected parking position image IMj, the own vehicle image IMf and the towed image IMg are superimposed and the right-side surrounding image IMd. The display image generating portion 1090 may superimpose the guide button Bt5 and the view selection button Bt6, for example, on the right-side surrounding image IMd.

Figure 32:
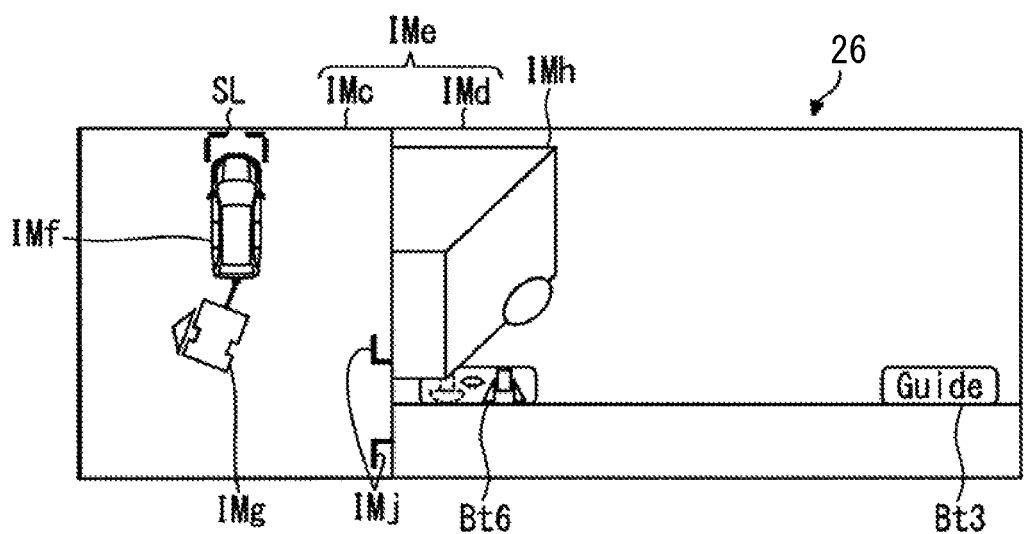
FIG. 32 is a view illustrating an example of the display image displayed in the towing mode, the backward driving and the leftward turning with the target parking position at a left side being selected according to the third embodiment.

FIG. 32 is a view illustrating an example of the display image IMe displayed in a case where the target parking position at the left side is selected, in the towing mode, the backward driving and the leftward turning. In a case where the target parking position at the left side and the side-view style are selected, in the towing mode, the backward driving and the leftward turning, the captured image selecting portion 1088 selects the left-side captured image which is output to the display image generating portion 1090. The display image generating portion 1090 generates the left-side surrounding image IMd based on the left-side captured image. The display image generating portion 1090 generates the display image IMe as illustrated in FIG. 32 including the overhead view image IMc where the selected parking position image IMj, the own vehicle image IMf and the towed image IMg are superimposed and the left-side surrounding image IMd. The display image generating portion 1090 may superimpose the guide button Bt5 and the view selection button Bt6, for example, on the left-side surrounding image IMd.

Figure 33:
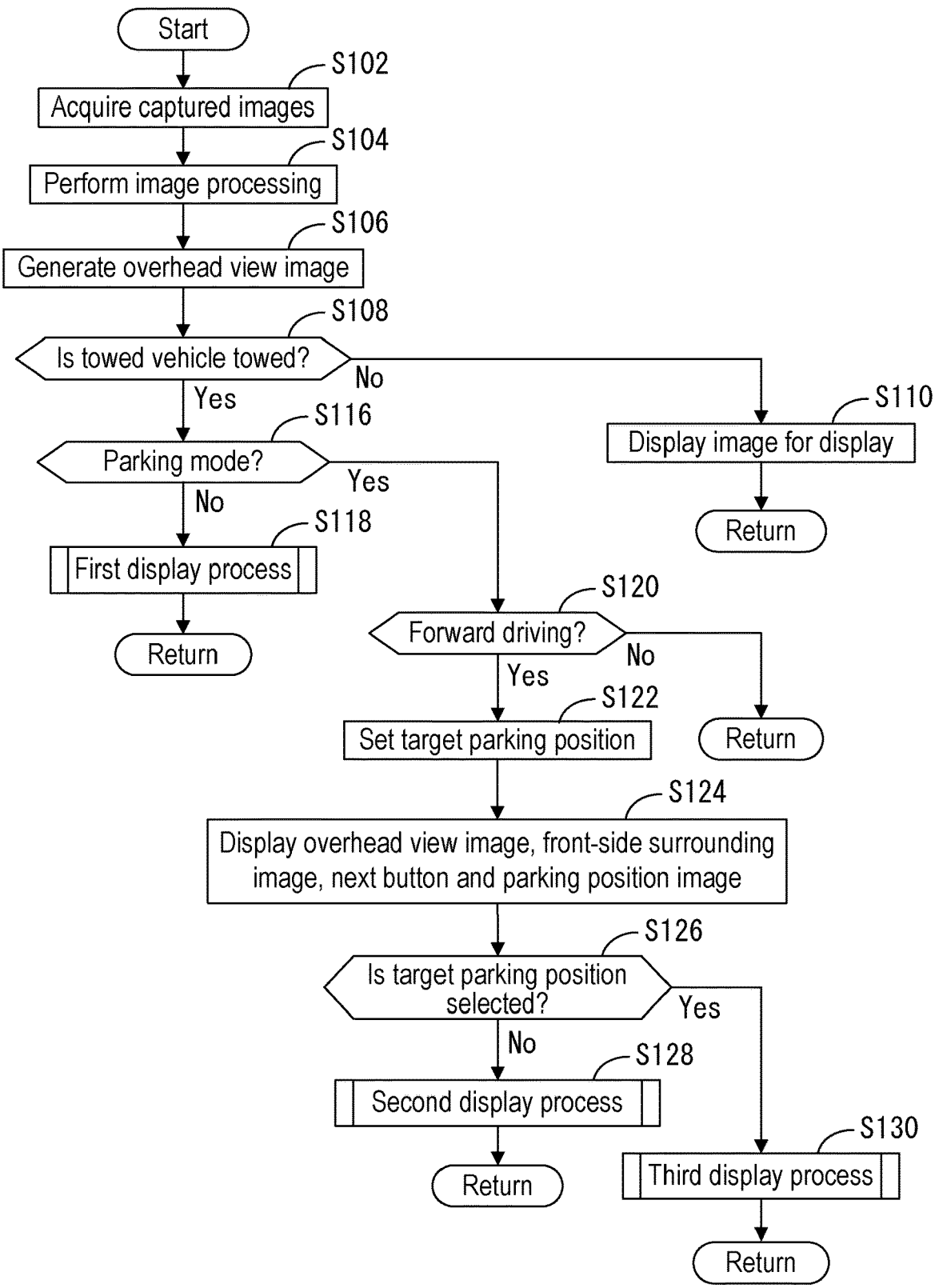
FIG. 33 is a flowchart of a first parking assist process executed by a processing unit of the third embodiment.

FIG. 33 is a flowchart of a first parking assist process executed by the processing unit 1064.

As illustrated in FIG. 33, in the first parking assist process, the image acquiring portion 1082 acquires the captured images from the respective imaging units 24 and outputs the captured images to the target parking position setting portion 1084, the connection angle calculating portion 1086 and the overhead view image generating portion 1085 (S102).

The image processing portion 1087 performs the image processing such as distortion removal, for example, on each of the captured images and outputs the generated captured images to the captured image selecting portion 1088 (S104). The overhead view image generating portion 1085 generates the overhead view image IMc based on the plural captured images and outputs the generated overhead view image IMc to the display image generating portion 1090 (S106).

The towing determining portion 1078 determines whether or not the towed vehicle 12 is towed (S108). The towing determining portion 1078 may determine whether or not the towed vehicle 12 is towed on a basis of the mode which is received through display of the mode setting image IMa as illustrated in FIG. 19. The towing determining portion 1078 determines that the towed vehicle 12 is not towed when acquiring information that the normal mode button Bt1 is operated by the passenger via the input information acquiring portion 1076 and outputs the determination result to the captured image selecting portion 1088 (S108: No). When acquiring the determination result that the towed vehicle 12 is not towed, the captured image selecting portion 1088 selects the front-side captured image or the rear-side captured image depending on the driving direction of the towing vehicle 1010 and outputs the selected image to the display image generating portion 1090. The display image generating portion 1090 generates the surrounding image IMd for display based on the captured image acquired from the image acquiring portion 1082. The display image generating portion 1090 generates the display image IMe as illustrated in FIGS. 21 and 22 including the overhead view image IMc and the surrounding image IMd for display and outputs the generated display image IMe to the display image output portion 1092. The display image output portion 1092 outputs the display image IMe to the display portion 26 so that the display image IMe is displayed at the display portion 26 (S110). Afterwards, the processing unit 1064 repeats operations from the step S102.

When acquiring information that the towing mode button Bt2 is operated by the passenger via the input information acquiring portion 1076, the towing determining portion 1078 determines that the towed vehicle 12 is towed and outputs the determination result to the captured image selecting portion 1088 (S108: Yes).

The parking mode determining portion 1079 determines whether or not the parking mode is set (S116). The parking mode determining portion 1079 may determine whether or not the parking mode is set on a basis of whether or not the guide button Bt5 is operated via the input information acquiring portion 1076 in a state where the display image IMe such as FIG. 23, for example, is displayed. The parking mode determining portion 1079 determines that the parking mode is not set in a case where the guide button Bt5 is not operated by the passenger (S116: No) and performs a first display process (S118).

Figure 34:
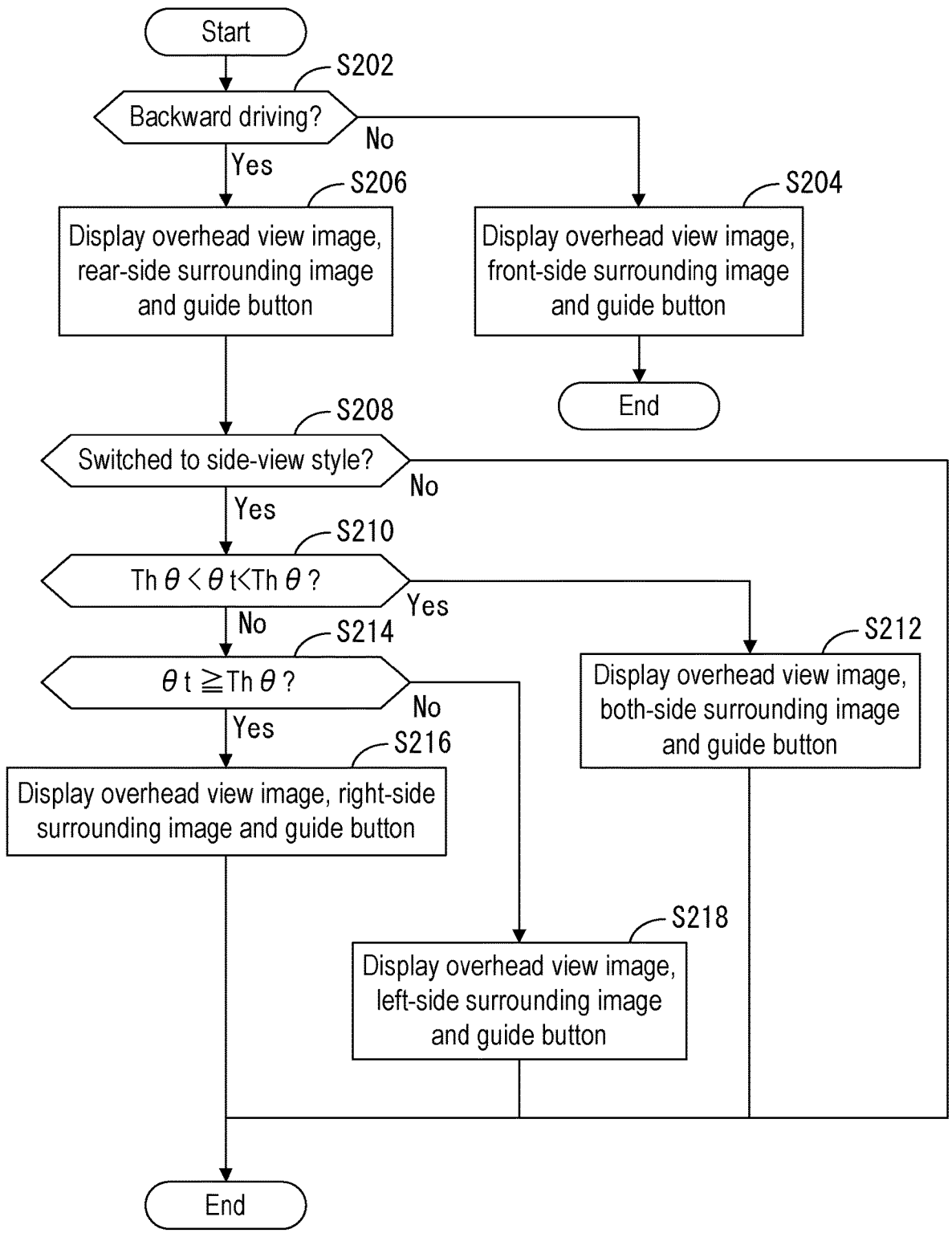
FIG. 34 is a flowchart of a first display process executed by the processing unit of the third embodiment.

FIG. 34 is a flowchart of the first display process executed by the processing unit 1064.

As illustrated in FIG. 34, in the first display process, the forward and backward determining portion 1072 determines whether or not the towing vehicle 1010 is driven backward (S202). For example, the forward and backward determining portion 1072 may determine whether or not the towing vehicle 1010 is driven backward on a basis of position information of the shift operating portion 52 detected by the shift sensor 46 which is acquired via the vehicle information acquiring portion 1070. In a case where the shift operating portion 52 is set at the drive, for example, based on the position information of the shift operating portion 52, the forward and backward determining portion 1072 determines that the towing vehicle 1010 is driven forward (S202: No) and outputs the determination result to the captured image selecting portion 1088.

When acquiring the determination result of towing and forward driving in a state where the parking mode is not set, the captured image selecting portion 1088 selects the front-side captured image which is output to the display image generating portion 1090. The display image generating portion 1090 generates the front-side surrounding image IMd based on the front-side captured image. The display image generating portion 1090 generates the display image IMe as illustrated in FIG. 23 including the front-side surrounding image IMd where the guide button Bt5 is superimposed and the overhead view image IMc and outputs the generated display image IMe to the display image output portion 1092. The display image output portion 1092 outputs the display image IMe to the display portion 26 so that the display image IMe is displayed at the display portion 26 (S204). Afterwards, the processing unit 1064 terminates the first display process and returns to the first parking assist process to repeat operations from the step S102.

The forward and backward determining portion 1072 determines the backward driving in a case where the shift operating portion 52 is set at the reverse based on the position information of the shift operating portion 52 (S202: Yes) and outputs the determination result of the backward driving to the captured image selecting portion 1088.

When acquiring the determination result of towing and backward driving in a state where the parking mode is not set, the captured image selecting portion 1088 selects the rear-side captured image which is output to the display image generating portion 1090. The display image generating portion 1090 generates the rear-side surrounding image IMd based on the rear-side captured image. The display image generating portion 1090 generates the display image IMe as illustrated in FIGS. 24 and 25 including the rear-side surrounding image IMd on which the guide button Bt5, for example, is superimposed and the overhead view image IMc and outputs the generated display image IMe to the display image output portion 1092. The display image generating portion 1090 outputs the display image IMe to the display portion 26 so that the display image IMe is displayed at the display portion 26 (S206).

Next, the view determining portion 1080 determines whether or not switching to the side-view style is obtained (S208). For example, the view determining portion 1080 may determine whether or not switching to the side-view style is obtained on a basis of whether or not the view selection button Bt6 is operated, which is acquired via the input information acquiring portion 1076. In a case where the view determining portion 1080 determines that the rear-view style is kept and not switched to the side-view style (S208: No), the processing unit 1064 terminates the first display process and returns to the first parking assist process to repeat the operations from the step S102.

In a case where the view determining portion 1080 determines that the view selection button Bt6 is operated and switching to the side-view style is obtained (S208: Yes), the captured image selecting portion 1088 selects the captured image used for generation of the surrounding image IMd based on the connection angle θt and the threshold angle Thθ (S210, S214).

Specifically, when determining that the connection angle θt satisfies [formula 1] (S210: Yes), the captured image selecting portion 1088 selects the left-side captured image and the right-side captured image which are output to the display image generating portion 1090. The display image generating portion 1090 generates the both-side surrounding image IMd where the left end portion IMdl of the left-side surrounding image and the right end portion IMdr of the right-side surrounding image which are generated from the left-side captured image and the right-side captured image are connected. The display image generating portion 1090 generates the display image IMe as illustrated in FIG. 26 including the both-side surrounding image IMd on which the guide button Bt5 is superimposed and the overhead view image IMc and outputs the generated display image IMe to the display image output portion 1092. The display image output portion 1092 outputs the display image IMe to the display portion 26 so that the display image IMe is displayed at the display portion 26 (S212).

In a case where the connection angle θt satisfies [formula 2] (S210: No, S214: Yes), the captured image selecting portion 1088 selects the right-side captured image which is output to the display image generating portion 1090. The display image generating portion 1090 generates the right-side surrounding image IMd based on the right-side captured image. The display image generating portion 1090 generates the display image IMe as illustrated in FIG. 27 including the right-side surrounding image IMd on which the guide button Bt5 is superimposed and the overhead view image IMc and outputs the generated display image IMe to the display image output portion 1092. The display image output portion 1092 outputs the display image IMe to the display portion 26 so that the display image IMe is displayed at the display portion 26 (S216).

In a case where the connection angle θt satisfies [formula 3] (S210: No, S214: No), the captured image selecting portion 1088 selects the left-side captured image which is output to the display image generating portion 1090. The display image generating portion 1090 generates the left-side surrounding image IMd based on the left-side captured image. The display image generating portion 1090 generates the display image IMe as illustrated in FIG. 28 including the left-side surrounding image IMd on which the guide button Bt5 is superimposed and the overhead view image IMc and outputs the generated display image IMe to the display image output portion 1092. The display image output portion 1092 outputs the display image IMe to the display portion 26 so that the display image IMe is displayed at the display portion 26 (S218).

After performing any of the steps S212, S216 and S218, the processing unit 1064 terminates the first display process and returns to the first parking assist process to repeat the operations from the step S102.

Back to FIG. 33, in a case where the guide button Bt5 is operated by the passenger, the parking mode determining portion 1079 determines that the parking mode is set (S116: Yes) and outputs the determination result that the parking mode is set to the target parking position setting portion 1084 and the captured image selecting portion 1088. The forward and backward determining portion 1072 determines whether or not the towing vehicle 1010 is driven forward (S120). When the forward and backward determining portion 1072 determines that the towing vehicle 1010 is driven backward (S120: No), the processing unit 1064 repeats the operations from the step S102.

When determining that the towing vehicle 1010 is driven forward (S120: Yes), the forward and backward determining portion 1072 outputs the determination result that the towing vehicle 1010 is driven forward to the captured image selecting portion 1088 and the target parking position setting portion 1084. When acquiring the determination result that the towing vehicle 1010 is driven forward and the parking mode is set, the target parking position setting portion 1084 sets the target parking position which is output to the display image generating portion 1090 (S122).

When acquiring the determination result that the towing vehicle 1010 is driven forward, the captured image selecting portion 1088 selects the front-side captured image which is output to the display image generating portion 1090. The display image generating portion 1090 generates the front-side surrounding image IMd based on the front-side captured image. The display image generating portion 1090 generates the display image IMe as illustrated in FIG. 29 including the overhead view image IMc where the parking position image IMj is superimposed at a position corresponding to the target parking position and the front-side surrounding image IMd on which the next button Bt7 is superimposed. The display image generating portion 1090 outputs the generated display image IMe to the display image output portion 1092. The display image generating portion 1090 outputs the display image IMe to the display portion 26 so that the display image IMe is displayed at the display portion 26 (S124).

The parking mode determining portion 1079 determines whether or not the target parking position is selected by the passenger (S126). The parking mode determining portion 1079 may determine whether or not the target parking position is selected by the passenger based on whether or not the next button Bt7 is operated via the input information acquiring portion 1076. In a case where the parking mode determining portion 1079 determines that the target parking position is not selected (S126: No), the processing unit 1064 performs a second display process (S128).

Figure 35:
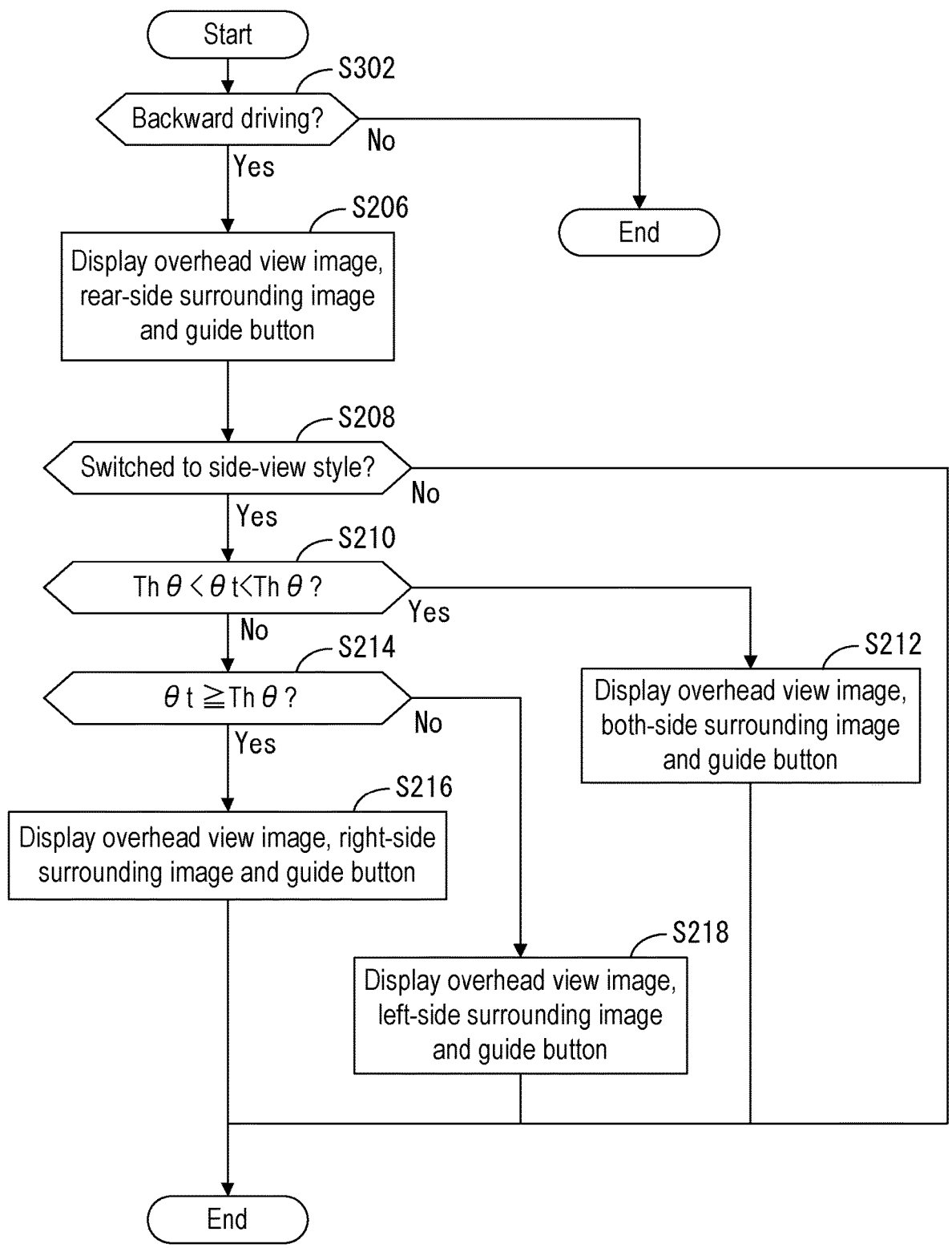
FIG. 35 is a flowchart of a second display process executed by the processing unit of the third embodiment.

FIG. 35 is a flowchart of the second display process executed by the processing unit 1064. The same steps as those of the first display process bear the same step numbers and explanation is simplified.

As illustrated in FIG. 35, in the second display process, the forward and backward determining portion 1072 determines whether or not the towing vehicle 1010 is driven backward (S302). In a case where the forward and backward determining portion 1072 determines that the towing vehicle 1010 is driven forward (S302: No), the display image output portion 1092 continues the display of the display image IMe including the next button Bt7 and terminates the second display process. Afterwards, the processing unit 1064 returns to the first parking assist process to repeat the operations from the step S102.

When determining the backward driving based on the position information of the shift operating portion 52 (S302: Yes), the forward and backward determining portion 1072 performs the operations from the step S206 in the same manner as in the first display process. In a case where the towing vehicle 1010 is driven backward, the processing unit 1064 cancels the parking mode which is set and deletes the parking position image IMj, the next button Bt7 and the cancel button Bt8 so as to perform any of the steps S212, S216 and S218 to cause a new display image IMe to be displayed. Afterwards, the processing unit 1064 returns to the first parking assist process to repeat the operations from the step S102.

Back to FIG. 33, in a case where the parking mode determining portion 1079 determines that the target parking position is selected (S126, Yes), the processing unit 1064 performs a third display process (S130).

Figure 36:
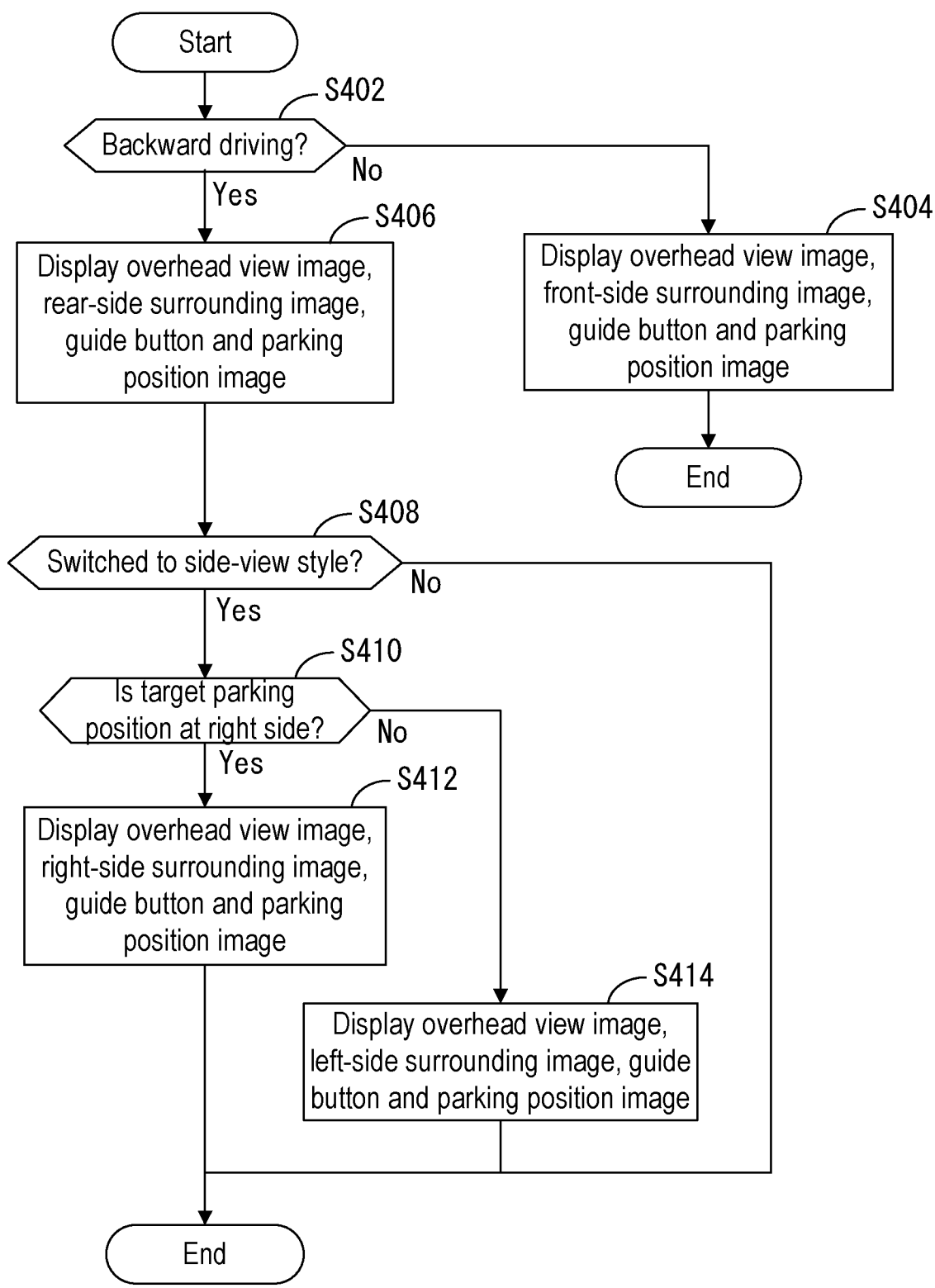
FIG. 36 is a flowchart of a third display process executed by the processing unit of the third embodiment.

FIG. 36 is a flowchart of the third display process executed by the processing unit 1064. An explanation of the similar steps to the first display process is simplified.

As illustrated in FIG. 36, in the third display process, the forward and backward determining portion 1072 determines whether or not the towing vehicle 1010 is driven backward (S402). When the forward and backward determining portion 1072 determines the forward driving (S402: No), the display image output portion 1092 displays the display image IMe as illustrated in FIG. 29 including the guide button Bt5 in place of the next button Bt7 and the cancel button Bt8 (S404) to terminate the third display process. Afterwards, the processing unit 1064 returns to the first parking assist process to repeat the operations from the step S102.

In a case where the forward and backward determining portion 1072 determines the backward driving based on the position information of the shift operating portion 52 (S402: Yes), the captured image selecting portion 1088 selects the rear-side captured image which is output to the display image generating portion 1090. The display image generating portion 1090 generates the rear-side surrounding image IMd based on the rear-side captured image. The display image generating portion 1090 generates the display image IMe as illustrated in FIG. 30 including the overhead view image IMc where the parking position image IMj is superimposed and the rear-side surrounding image IMd on which the guide button Bt5 is superimposed and outputs the generated display image IMe to the display image output portion 1092. The display image output portion 1092 causes the display image IMe to be displayed (S406).

Next, the view determining portion 1080 determines whether or not the view style is switched to the side-view style (S408). When the view determining portion 1080 determines that the view style is not changed to the side-view style (S408: No), the processing unit 1064 terminates the third display process and returns to the first parking assist process to repeat the operations from the step S102.

When determining that the view style is switched to the side-view style, the view determining portion 1080 outputs the determination result to the captured image selecting portion 1088 (S408: Yes). The parking mode determining portion 1079 determines whether or not the target parking position selected by the passenger is at the right side (S410). The parking mode determining portion 1079 may determine the left and right direction of the target parking position based on the direction of the direction indicator 15 which is indicated according to instructed direction information acquired from the direction indicator switch 1034, for example. When determining that the target parking position is at the right side based on the acquired instructed direction information acquired from the direction indicator switch 1034, the parking mode determining portion 1079 outputs the determination result to the captured image selecting portion 1088 (S410: Yes). The captured image selecting portion 1088, which acquires the determination result that the target parking position is at the right side, selects the right-side captured image which is output to the display image generating portion 1090. The display image generating portion 1090 generates the right-side surrounding image IMd based on the right-side captured image. The display image generating portion 1090 generates the display image IMe as illustrated in FIG. 31 including the overhead view image IMc and the right-side surrounding image IMd on which the guide button Bt5 is superimposed, for example, and outputs the generated display image IMe to the display image output portion 1092. The display image output portion 1092 causes the display image IMe to be displayed (S412).

When determining that the target parking position is at the left side based on the instructed direction information acquired from the direction indicator switch 1034, the parking mode determining portion 1079 outputs the determination result to the captured image selecting portion 1088 (S410: No). The captured image selecting portion 1088, which acquires the determination result that the target parking position is at the left side, selects the left-side captured image which is output to the display image generating portion 1090. The display image generating portion 1090 generates the left-side surrounding image IMd based on the left-side captured image. The display image generating portion 1090 generates the display image IMe as illustrated in FIG. 32 including the overhead view image IMc and the left-side surrounding image IMd on which the guide button Bt5 is superimposed, for example, and outputs the generated display image IMe to the display image output portion 1092. The display image output portion 1092 causes the display image IMe to be displayed (S414).

The processing unit 1064 performs the step S412 or S414 and then terminates the third display process. The processing unit 1064 returns to the first parking assist process to repeat the operations from the step S102.

As mentioned above, according to the parking assist apparatus 1060, during the backward driving, the captured image selecting portion 1088 selects any of the plural captured images based on the connection angle $\theta t$ of the towed vehicle 12 relative to the towing vehicle 1010 and the display image generating portion 1090 generates the display image IMe including the surrounding image IMd generated from the captured image which is selected. Accordingly, the parking assist apparatus 1060 may display the display image IMe including the surrounding image IMd with a less region which is interrupted by the towed vehicle 12 during the backward driving and the turning, for example. The display image IMe including a more visible region in the rear including an obliquely rear side may be provided to the passenger by the surrounding image IMd.

According to the parking assist apparatus 1060, the captured image selecting portion 1088 selects the left-side captured image and the right-side captured image in a case where the magnitude of the connection angle θt is smaller than the threshold angle Thθ and the display image generating portion 1090 generates and displays the surrounding image IMd obtained by connecting the left-side surrounding image and the right-side surrounding image generated from the aforementioned captured images. Thus, because the parking assist apparatus 1060 generates the surrounding image IMd based on the left-side captured image and the right-side captured image which are hardly interrupted by the towed vehicle 12 in a case where the towing vehicle 1010 and the towed vehicle 12 are arranged substantially in alignment with each other, the display image IMe including a more visible region in the rear including an obliquely rear side and an understandable positional relationship with an object such as an obstacle, for example, may be provided.

According to the parking assist apparatus 1060, the captured image selecting portion 1088 selects the captured image at the side where the towed vehicle 12 exists from between the left-side captured image and the right-side captured image in a case where the magnitude of the connection angle θt is equal to or greater than the threshold angle Thθ and the display image generating portion 1090 generates the surrounding image IMd based on the selected captured image and displays the surrounding image IMd. Thus, because the parking assist apparatus 1060 generates the surrounding image IMd based on the captured image which is obtained by imaging an inner side of a turning circle where the target parking position exists, for example, the display image IMe where a target direction is easily and intuitively confirmable and a positional relationship with an object such as an obstacle, for example, is easily understandable may be provided. Further, the parking assist apparatus 1060 generates the surrounding image IMd from any one of the left and right captured images to provide the display image IMe where a more region in the target direction can be seen.

According to the parking assist apparatus 1060, the captured image selecting portion 1088 selects the captured image at the side where the target parking position exists from between the left-side captured image and the right-side captured image in a case where the target parking position is selected by the passenger and the display image generating portion 1090 generates the surrounding image IMd from the selected captured image and displays the surrounding image IMd. As a result, the parking assist apparatus 1060 may provide the display image IMe where the target parking position side is easily confirmable.

Figure 37:
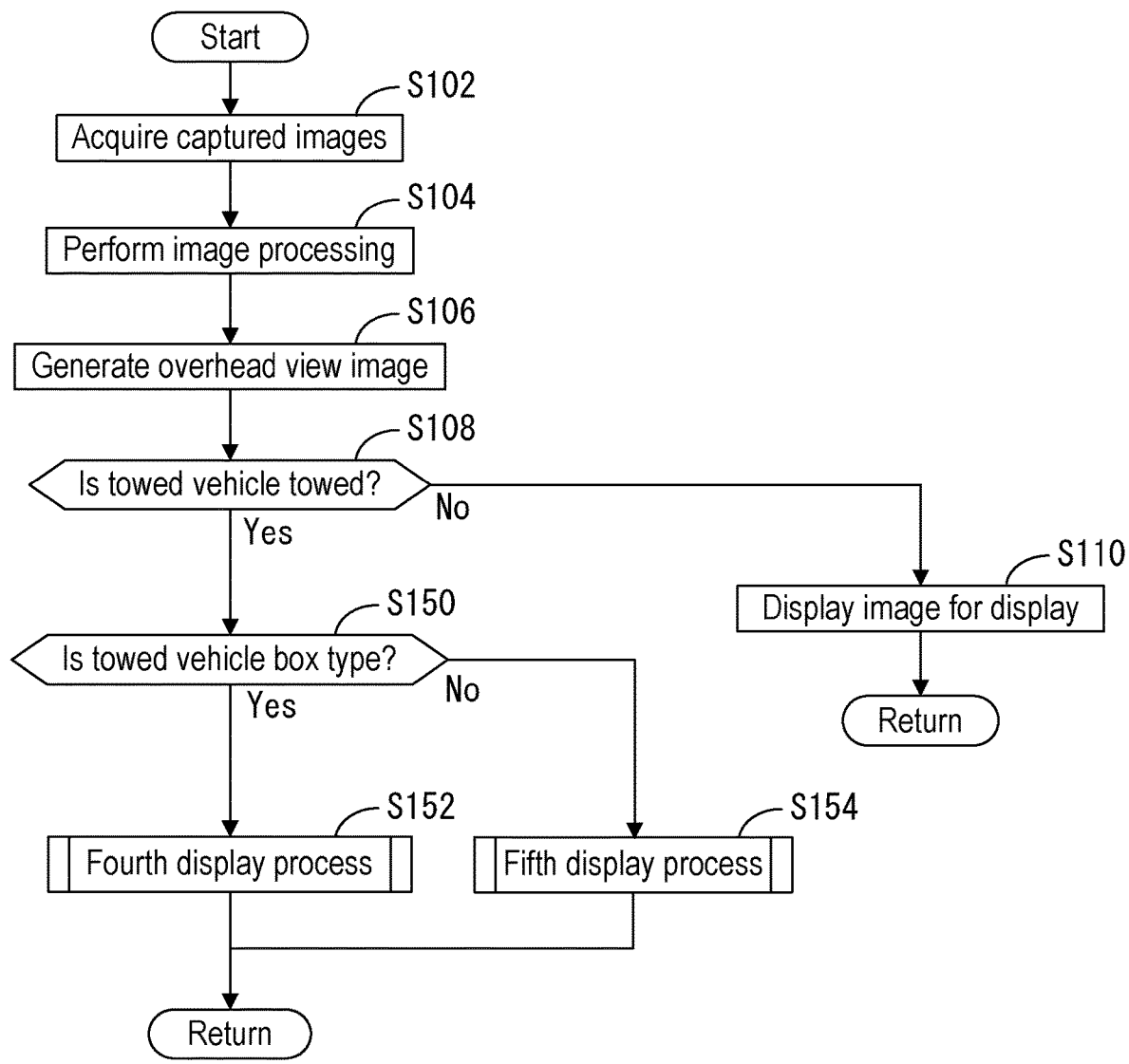
FIG. 37 is a flowchart of a second parking assist process executed by the processing unit of the third embodiment.

FIG. 37 is a flowchart of a second parking assist process executed by the processing unit 1064. An explanation of the similar steps to the first parking assist process is simplified. The processing unit 1064 may switch between the first parking assist process and the second parking assist process by the operation of the passenger or automatically.

As illustrated in FIG. 37, in the second parking assist process, the processing unit 1064 performs the steps S102 to S108. In a case where the towing determining portion 1078 determines that the towed vehicle 12 is towed (S108: Yes), the type determining portion 1081 determines whether or not the towed vehicle 12 is of the box type (S150). The type determining portion 1081 may determine whether or not the towed vehicle 12 is the box type based on any one of the operations of the box type selection button Bt3 and the frame type selection button Bt4 by the passenger acquired from the input information acquiring portion 1076 in a state where the type selecting image IMm illustrated in FIG. 20 is being displayed, for example.

In a case where the passenger operates the box type selection button Bt3, the type determining portion 1081 determines that the towed vehicle 12 is the box type and outputs the detection result to the captured image selecting portion 1088 (S150: Yes). Afterwards, the processing unit 1064 performs a fourth display process (S152).

Figure 38:
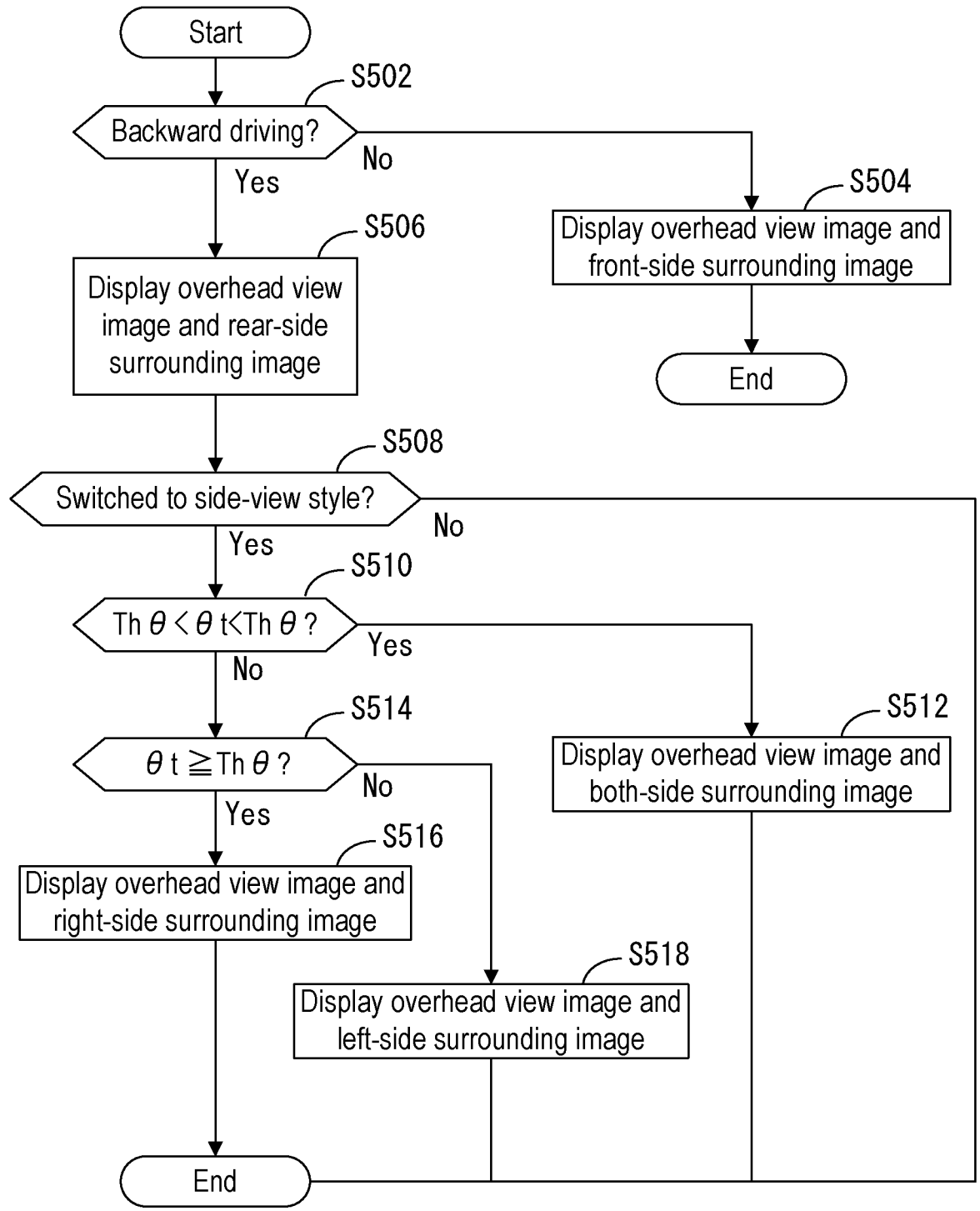
FIG. 38 is a flowchart of a fourth display process executed by the processing unit of the third embodiment.

FIG. 38 is a flowchart of the fourth display process executed by the processing unit 1064. An explanation of the similar steps to the aforementioned display process is omitted.

As illustrated in FIG. 38, in the fourth display process, in a case where the forward and backward determining portion 1072 determines that the shift operating portion 52 operates forward on a basis of the position information of the shift operating portion 52 (S502: No), the forward and backward determining portion 1072 outputs the detection result to the captured image selecting portion 1088.

When acquiring the detection result that the shift operating portion 52 operates forward, the captured image selecting portion 1088 selects the front-side captured image and outputs it to the display image generating portion 1090. At this time, the display image IMe generated by the display image generating portion 1090 is an image obtained by eliminating the guide button Bt5 from the display image IMe illustrated in FIG. 23, for example. The display image output portion 1092 outputs the display image IMe to the display portion 26 to cause the display portion 26 to display the display image IMe (S504). Afterwards, the processing unit 1064 terminates the fourth display process and returns to the second parking assist process to repeat the operations from the step S102.

When determining the backward driving (S502: Yes), the forward and backward determining portion 1072 outputs the determination result to the captured image selecting portion 1088. When acquiring the determination result of the backward driving, the captured image selecting portion 1088 selects the rear-side captured image and outputs it to the display image generating portion 1090. The display image generating portion 1090 generates the rear-side surrounding image IMd generated from the rear-side captured image. The display image generating portion 1090 generates the display image IMe including the rear-side surrounding image IMd and the overhead view image IMc and outputs the display image IMe to the display image output portion 1092. At this time, the display image IMe generated by the display image generating portion 1090 is an image obtained by eliminating the guide button Bt5 from the display image IMe illustrated in FIG. 25, for example. The display image output portion 1092 outputs the display image IMe to the display portion 26 to cause the display portion 26 to display the display image IMe (S506).

Next, in a case where the view determining portion 1080 determines that the rear-view style is continued and switching to the side-view style is not obtained (S508: No), the processing unit 1064 terminates the fourth display process and returns to the second parking assist process to repeat the operations from the step S102.

In a case where the view determining portion 1080 determines that the switching to the side-view style is obtained (S508: Yes), the captured image selecting portion 1088 selects the captured image used for generation of the surrounding image IMd based on the connection angle θt and the threshold angle Thθ (S510 and S514).

Specifically, when determining that the connection angle θt satisfies [formula 1] (S510: Yes), the captured image selecting portion 1088 selects the left-side captured image and the right-side captured image and outputs them to the display image generating portion 1090. The display image generating portion 1090 generates the both-side surrounding image IMd obtained by connecting the left end portion IMdl of the left-side surrounding image and the right end portion IMdr of the right-side surrounding image generated from the left-side captured image and the right-side captured image. The display image generating portion 1090 generates the display image IMe including the both-side surrounding image IMd and the overhead view image IMc to output the generated display image IMe to the display image output portion 1092. At this time, the display image IMe generated by the display image generating portion 1090 is an image obtained by eliminating the guide button Bt5 from the display image IMe illustrated in FIG. 26, for example. The display image output portion 1092 outputs the display image IMe to the display portion 26 to cause the display portion 26 to display the display image IMe (S512).

In a case where the connection angle θt satisfies [formula 2] (S510: No, S514: Yes), the captured image selecting portion 1088 selects the right-side captured image which is output to the display image generating portion 1090. The display image generating portion 1090 generates the right-side surrounding image IMd from the right-side captured image. The display image generating portion 1090 generates the display image IMe including the right-side surrounding image IMd and the overhead view image IMc and outputs the generated display image IMe to the display image output portion 1092. At this time, the display image IMe generated by the display image generating portion 1090 is an image obtained by eliminating the guide button Bt5 from the display image IMe illustrated in FIG. 27, for example. The display image output portion 1092 outputs the display image IMe to the display portion 26 to cause the display portion 26 to display the display image IMe (S516).

In a case where the connection angle θt satisfies [formula 3] (S510: No, S514: No), the captured image selecting portion 1088 selects the left-side captured image which is output to the display image generating portion 1090. The display image generating portion 1090 generates the left-side surrounding image IMd from the left-side captured image. The display image generating portion 1090 generates the display image IMe including the left-side surrounding image IMd and the overhead view image IMc and outputs the generated display image IMe to the display image output portion 1092. At this time, the display image IMe generated by the display image generating portion 1090 is an image obtained by eliminating the guide button Bt5 from the display image IMe illustrated in FIG. 28, for example. The display image output portion 1092 outputs the display image IMe to the display portion 26 to cause the display portion 26 to display the display image IMe (S518).

After performing any of the steps S512, S516 and S518, the processing unit 1064 terminates the fourth display process and returns to the second parking assist process to repeat the operations from the step S102.

In a case where the passenger operates the frame type selection button Bt4, the type determining portion 1081 determines that the towed vehicle 12 is of the frame type and outputs the determination result to the captured image selecting portion 1088 (S150: No). Afterwards, the processing unit 1064 executes a fifth display process (S154).

Figure 39:
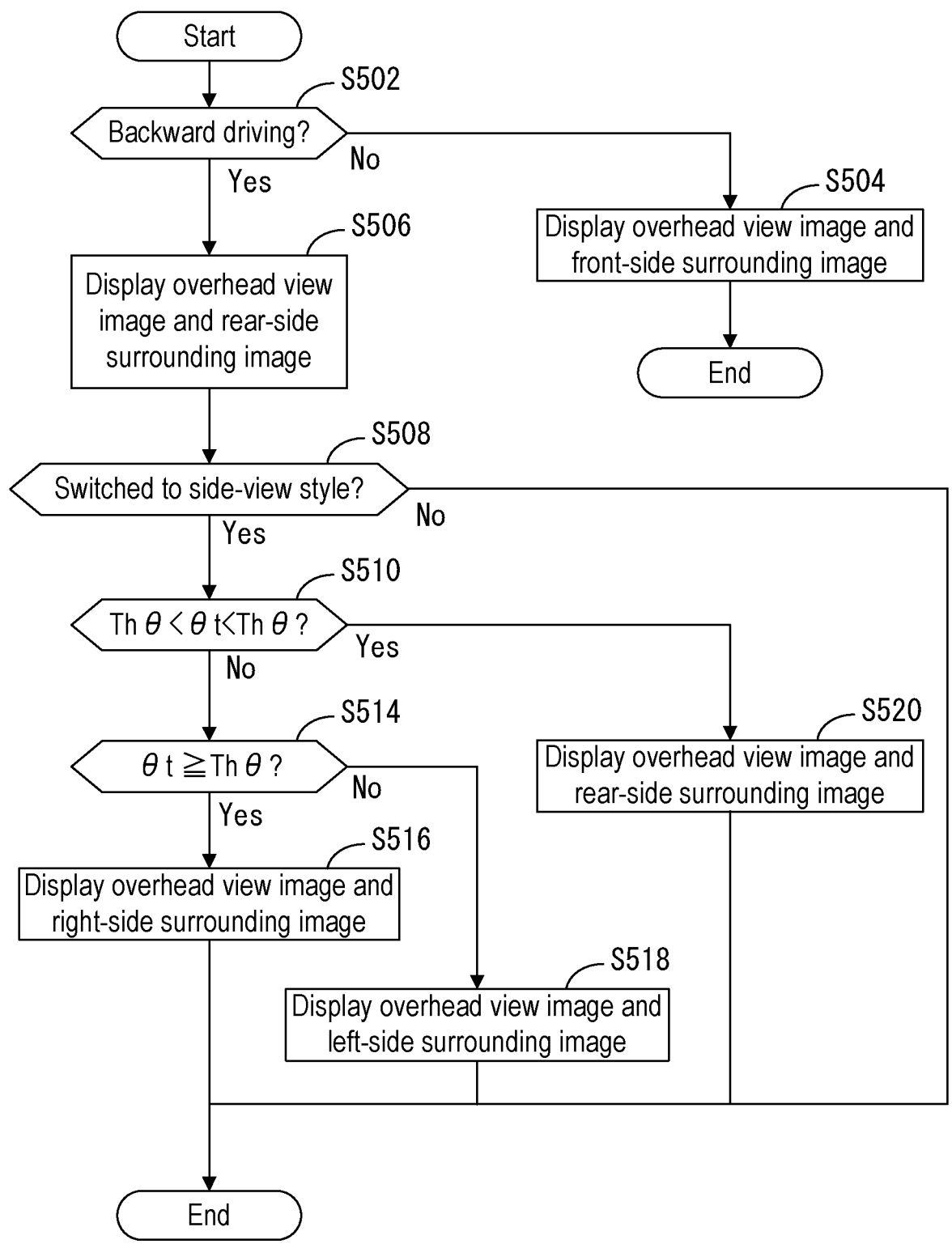
FIG. 39 is a flowchart of a fifth display process executed by the processing unit of the third embodiment.

FIG. 39 is a flowchart of the fifth display process executed by the processing unit 1064. An explanation of the similar steps to the aforementioned display process is omitted.

As illustrated in FIG. 39, when determining that the connection angle θt satisfies [formula 1] (S510: Yes) after the processing unit 1064 performs the operations up to the step S508, the captured image selecting portion 1088 selects the rear-side captured image which is output to the display image generating portion 1090. The display image generating portion 1090 generates the rear-side surrounding image IMd from the rear-side captured image. The display image generating portion 1090 generates the display image IMe including the rear-side surrounding image IMd and the overhead view image IMc and outputs the generated display image IMe to the display image output portion 1092. At this time, the display image IMe generated by the display image generating portion 1090 is an image obtained by eliminating the guide button Bt5 from the display image IMe illustrated in FIG. 24, for example. That is, the display image generating portion 1090 causes the rear-side surrounding image IMd to be displayed, without the both-side surrounding image IMd to be displayed, even when the passenger selects the side-view style, as long as the towed vehicle 12 is of the frame type. The display image output portion 1092 outputs the display image IMe to the display portion 26 to cause the display portion 26 to display the display image IMe (S520).

After performing any of the steps S518, S516 and S520, the processing unit 1064 terminates the fifth display process and returns to the second parking assist process to repeat the operations from the step S102.

As mentioned above, according to the parking assist apparatus 1060, in a case where the towed vehicle 12 is the box type and the magnitude of the connection angle θt is smaller than the threshold angle Thθ, the captured image selecting portion 1088 selects the left-side captured image and the right-side captured image and the display image generating portion 1090 generates the both-side surrounding image IMd obtained by connecting the left-side surrounding image and the right-side surrounding image generated from the both captured images. Accordingly, even when the towed vehicle 12 of the box type which interrupts most of the rear side and the towing vehicle 1010 are arranged in alignment with each other, the both-side surrounding image IMd is generated on a basis of the left-side captured image and the right-side captured image which are hardly interrupted by the towed vehicle 12. The display image IMe including a more visible region in the rear may be provided.

According to the parking assist apparatus 1060, even in a case where the towed vehicle 12 is the frame type and the side-view style is selected, the captured image selecting portion 1088 selects the rear-side captured image and the display image generating portion 1090 generates the rear-side surrounding image IMd from the rear-side captured image. Accordingly, in a case of the towed vehicle 12 of the frame type which hardly interrupts the rear side, the parking assist apparatus 1060 may provide the display image IMe where a rear immediately behind the towed vehicle 12 is easily confirmable.

Figure 40:
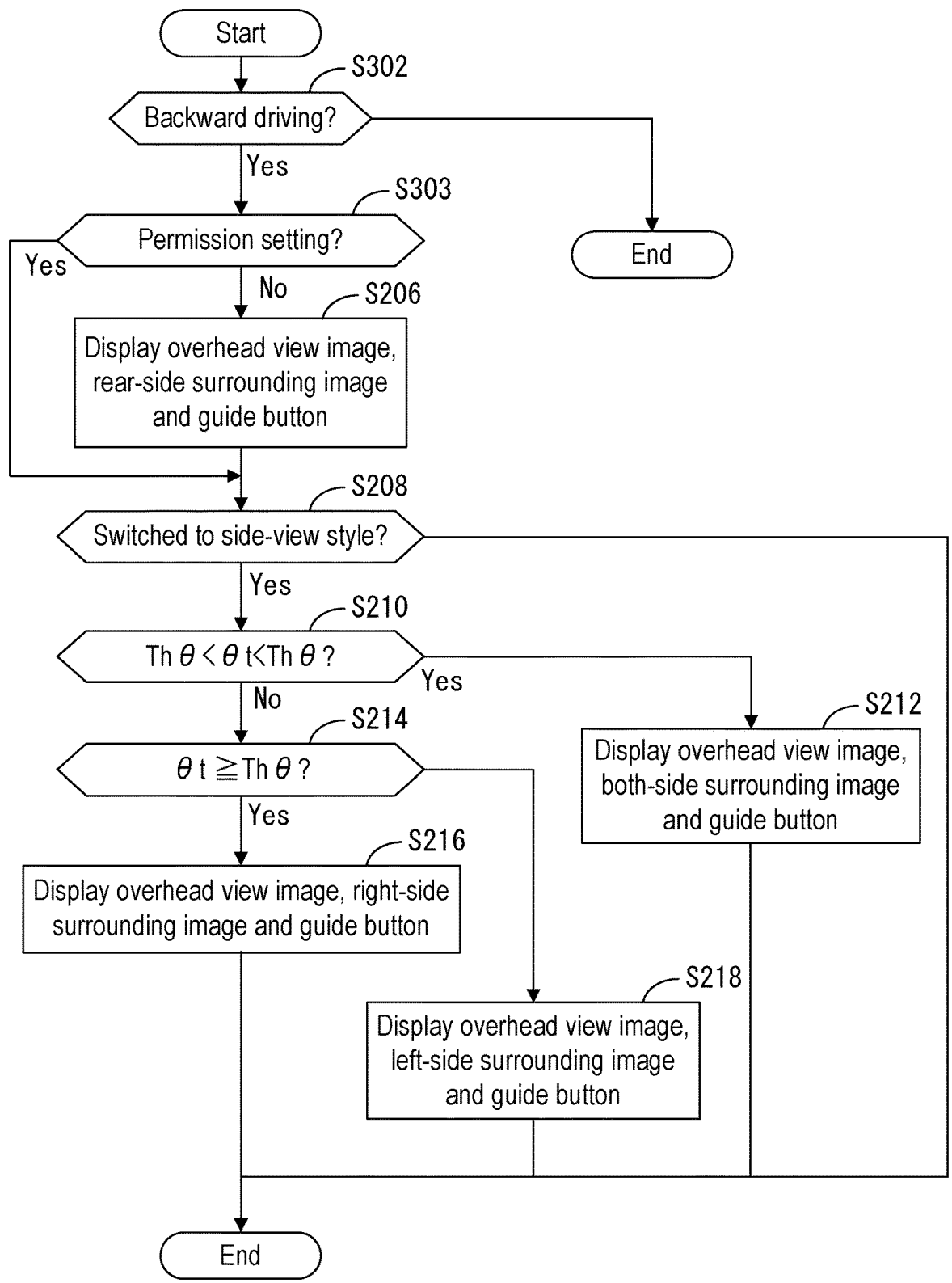
FIG. 40 is a flowchart of a second display process according to a modified embodiment.

Next, a modified embodiment obtained by partially changing the aforementioned second display process is explained. FIG. 40 is a flowchart of the second display process according to the modified embodiment.

The parking assist apparatus 1060 may be constructed so that a permission setting and a prohibition setting may be obtained. The permission setting is setting for permitting at least one of the right-side surrounding image and the left-side surrounding image to be displayed, without displaying the rear-side surrounding image IMd, in a case where the side-view style is selected. The prohibition setting is setting for displaying at least one of the right-side surrounding image and the left-side surrounding image to be displayed after the rear-side surrounding image IMd is once displayed even when the side-view style is selected. In the permission setting and the prohibition setting, the prohibition setting may be set at a time of shipment of the parking assist apparatus 1060 so as to confirm to regulations of a country where the parking assist apparatus 1060 is used, for example. In addition, the permission setting and the prohibition setting may be achieved by an operation of a permission button, for example, by a user of the parking assist apparatus 106 or may be set automatically.

As illustrated in FIG. 40, in the second display process, the display image generating portion 1090 may determine whether or not the permission setting is obtained (S303) after the backward driving is determined (S302: Yes). When determining that the permission setting is not obtained, i.e., the prohibition setting is obtained (S303: No), the display image generating portion 1090 generates the display image IMe including the overhead view image IMc and the rear-side surrounding image IMd. Meanwhile, when determining that it is the permission setting (S303: Yes), the display image generating portion 1090 repeats the operations from the step S208 without generating the display image IMe including the overhead view image IMc and the rear-side surrounding image IMd.

Functions, connection relations, numbers and arrangements, for example, of the constructions of each of the aforementioned embodiments may be appropriately changed and deleted, for example, within a scope of the invention and a scope of equivalence thereof. The embodiments may be appropriately combined with each other. The order of the steps in each of the embodiments may be appropriately changed.

In the aforementioned embodiments, the example is explained where the type determining portion 1081 receives the input by the passenger to determine the type of the towed vehicle 12. The determination of the type is not limited thereto. For example, the type determining portion 1081 may acquire the rear captured image captured by the imaging unit 24b via the image acquiring portion 1082 and determine the type based on the image of the towed vehicle 12 included in the aforementioned captured image.

In the aforementioned embodiments, the example is explained with each display process where the captured image selecting portion 1088 selects the captured image depending on the connection angle θt in a case where the side-view is selected. The selection of the captured image by the captured image selecting portion 1088 is not limited thereto. For example, the captured image selecting portion 1088 may select the captured image based on a comparison between the connection angle θt and the threshold angle Thθ using the aforementioned [formula 1], [formula 2], [formula 3], left-right position of the target parking position and the determination result of the type, regardless of the view style. Specifically, the captured image selecting portion 1088 may select the rear-side captured image regardless of the view style in a case where [formula 1] is satisfied and the type of the towed vehicle 12 is the frame type. The captured image selecting portion 1088 may select the captured image at the target parking position side from between the left-side captured image and the right-side captured image, regardless of the view style, in a case where the target parking position is selected by the passenger.

In the aforementioned embodiments, the example is provided where the captured image selecting portion 1088 selects either one of the left-side captured image and the right-side captured image in a case where the connection angle θt and the threshold angle Thθ are equal to each other. The selection of the captured image by the captured image selecting portion 1088 is not limited thereto. For example, the captured image selecting portion 1088 may select both the left-side captured image and the right-side captured image in a case where the connection angle θt and the threshold angle Thθ are equal to each other to generate the surrounding image where the selected two captured images are connected.

For example, in the aforementioned embodiments, the example is provided where it is determined that the towed vehicle 12 is towed in a case where the towing mode is selected by the passenger. Alternatively, the towing determining portion 1078 may determine whether or not the towed vehicle 12 is towed on a basis of a different determination method. For example, the towing determining portion 1078 may determine whether or not the towing vehicle 1010 tows the towed vehicle 12 based on the rear captured image of the towing vehicle 1010 imaged by the imaging unit 24b. The towing determining portion 1078 may also determine whether or not the towing vehicle 1010 tows the towed vehicle 12 based on distance measurement information in the rear of the towing vehicle 1010 by a distance measuring sensor, for example, instead of the captured image.

In the aforementioned embodiments, the method is provided where the target parking position direction determining portion 1074 determines the left-right position of the target parking position based on the direction indicated by the direction indicator 15. The determination method of the left-right position of the target parking position by the target parking position direction determining portion 1074 is not limited thereto. For example, the target parking position direction determining portion 1074 may determine the left-right position of the target parking position selected by the passenger based on the target parking position which is displayed in the display image at the time being selected by the passenger.

The surroundings monitoring apparatus according to the aforementioned embodiments, as an example, includes a control unit causing a display device to display a display image where an indicator which indicates a towed vehicle coupled to a towing vehicle is superimposed on a vehicle surrounding image including the towing vehicle and surroundings of the towing vehicle based on a captured image obtained by being imaged by an imaging unit which images the surroundings of the towing vehicle, the control unit acquiring towed vehicle information related to the towed vehicle and changing a display mode of the indicator based on the towed vehicle information. Thus, according to the surroundings monitoring apparatus of the embodiments, the towed vehicle may be easily imagined from the display image.

In addition, according to the surroundings monitoring apparatus of the embodiments, as an example, the control unit changes a length of the towed vehicle in a vehicle longitudinal direction in the indicator based on the towed vehicle information. Thus, according to the surroundings monitoring apparatus of the embodiments, the towed vehicle may be easily imagined from the display image, for example.

In addition, according to the surroundings monitoring apparatus of the embodiments, as an example, the control unit changes at least one of a size of a wheel of the towed vehicle in the indicator and a display position of the wheel based on the towed vehicle information. Thus, according to the surroundings monitoring apparatus of the embodiments, the towed vehicle may be easily imagined from the display image, for example.

Further, according to the surroundings monitoring apparatus of the embodiments, as an example, the indicator includes a connecting portion connecting between the towing vehicle and the towed vehicle. The control unit changes a length of the connecting portion in the indicator based on the towed vehicle information. Thus, according to the surroundings monitoring apparatus of the embodiments, the length of the connecting portion included in the indicator may be a length reflecting an actual length of the connecting portion even in a case where the length of the connecting portion is not obtainable on a basis of the captured image acquired by being imaged by the capturing unit, for example. The towed vehicle may be therefore easily imagined from the display image.

Further, according to the surroundings monitoring apparatus of the embodiments, as an example, the towed vehicle information is information used for a process which is different from a process for displaying the display image, the towed vehicle information corresponding to a length obtained by subtracting a length between a connecting position of the towing vehicle and the towed vehicle and a rear end of the towing vehicle from a length between the rear end of the towing vehicle and an axle of the towed vehicle. Thus, the surroundings monitoring apparatus of the embodiments may change the display mode of the indicator by using the length used for the other process such as a process for controlling the turning of the towing vehicle and the towed vehicle, for example, to thereby reduce a burden on the driver of the towing vehicle, for example, caused by such operation related to the change of the display mode of the indicator when the display image is displayed.

Further, according to the surroundings monitoring apparatus of the embodiments, as an example, the control unit differentiates a display mode from the axle of the towed vehicle to the rear end of the towed vehicle from a display mode from the axle of the towed vehicle to a front end of the towed vehicle. Thus, as an example, the surroundings monitoring apparatus of the embodiments may inhibit a collision with an obstacle which exists in the surroundings of the towed vehicle caused by the driver of the towing vehicle, for example, who drives the towing vehicle by only seeing the display image.

The surroundings monitoring apparatus of the embodiments includes an image acquiring portion acquiring a plurality of captured images which includes a rear-side captured image imaging a rear side of a towing vehicle which tows a towed vehicle, a left-side captured image imaging a left side of the towing vehicle and a right-side captured image imaging a right side of the towing vehicle, a captured image selecting portion selecting any of the plurality of captured images based on a connection angle serving as an angle of the towed vehicle relative to the towing vehicle or a type of the towed vehicle during a backward driving of the towing vehicle, and a display image generating portion generating a display image including a surrounding image generated from the selected captured image.

Accordingly, the surroundings monitoring apparatus of the embodiments may select the captured image where the region interrupted by the towed vehicle is small, depending on the connection angle and the type of the towed vehicle even in the backward driving and turning, so as to provide the display image including a more visible region in the rear including an obliquely rear side to the passenger.

According to the surroundings monitoring apparatus of the embodiments, the captured image selecting portion may select both the left-side captured image and the right-side captured image in a case where a magnitude of the connection angle is smaller than a predetermined threshold value during the backward driving of the towing vehicle. The display image generating portion may generate the display image including the surrounding image obtained by a left-side surrounding image and a right-side surrounding image which are connected to each other, the left-side surrounding image and the right side surrounding image being generated from the left-side captured image and the right-side captured image.

According to the surroundings monitoring apparatus of the aforementioned embodiments, in a case where the towing vehicle and the towed vehicle are arranged substantially in alignment with each other, the surrounding image is generated by the left-side captured image and the right-side captured image which are not interrupted by the towed vehicle. Thus, the display image including a more visible region in the rear including an obliquely rear side may be provided.

According to the surroundings monitoring apparatus of the aforementioned embodiments, the captured image selecting portion may select a captured image at a side at which the towed vehicle exists from between the left-side captured image and the right-side captured image in a case where the magnitude of the connection angle is greater than the predetermined threshold value during the backward driving of the towing vehicle.

Accordingly, the surroundings monitoring apparatus of the aforementioned embodiments may provide the display image where the target direction is easily confirmable because the surrounding image is generated by the captured image obtained by imaging the inner side of the turning circle where the target parking position exists, for example.

The surroundings monitoring apparatus of the aforementioned embodiments may further include a target parking position setting portion setting a target parking position to be selected by a passenger in a parking mode for assisting a parking. The captured image selecting portion may select the captured image at a side at which the target parking position selected by the passenger exists from between the left-side captured image and the right-side captured image.

Accordingly, the surroundings monitoring apparatus of the aforementioned embodiments may provide the display image where the side at which the target parking position exists is easily confirmable.

The surroundings monitoring apparatus of the aforementioned embodiments may further include a type determining portion determining a type of the towed vehicle. The captured image selecting portion may select both the left-side captured image and the right-side captured image in a case where the type determining portion determines that the towed vehicle is a box type and the magnitude of the connection angle is smaller than the predetermined threshold value during the backward driving of the towing vehicle.

The display image generating portion may generate the display image including the surrounding image obtained by connecting the left-side captured image and the right-side captured image.

According to the surroundings monitoring apparatus of the aforementioned embodiments, even in a case where the towed vehicle of the box type which interrupts most of the rear and the towing vehicle are arranged in alignment with each other, the both-side surrounding image is generated by connecting the left-side captured image and the right-side captured image which are hardly interrupted by the towing vehicle. The display image including a more visible region in the rear including an obliquely rear side may be thus provided.

According to the surroundings monitoring apparatus of the aforementioned embodiments, the captured image selecting portion may select the rear-side captured image in a case where the type determining portion determines that the towed vehicle is a frame type and the magnitude of the connection angle is smaller than the predetermined threshold value during the backward driving of the towing vehicle.

Accordingly, in a case where the towing vehicle and the towed vehicle are arranged substantially in alignment with each other and the towed vehicle is the frame type so that the rear side is hardly interrupted, the surroundings monitoring apparatus of the aforementioned embodiments may provide the display image where the rear immediately behind the towed vehicle is easily confirmable.

As mentioned above, the present invention is explained on a basis of the embodiments. The present invention is not limited to the constructions as described in the embodiments and may have various embodiments within a scope defined in a scope of claims. For example, the first to third embodiments are not limited to be performed individually and may be performed in combination.

The invention claimed is:

1. A surroundings monitoring apparatus comprising:
a control unit causing a display device to display a display image where an indicator which indicates a towed vehicle coupled to a towing vehicle is superimposed on a vehicle surrounding image including the towing vehicle and surroundings of the towing vehicle based on a captured image obtained by being imaged by an imaging unit which images the surroundings of the towing vehicle, the control unit acquiring towed vehicle information related to the towed vehicle and changing a display mode of the indicator based on the towed vehicle information; and
wherein the control unit changes at least one of a size of a wheel of the towed vehicle in the indicator and a display position of the wheel based on the towed vehicle information.

2. The surroundings monitoring apparatus according to claim 1, wherein the control unit changes a length of the towed vehicle in a vehicle longitudinal direction in the indicator based on the towed vehicle information.

3. The surroundings monitoring apparatus according to claim 1, wherein the indicator includes a connecting portion connecting between the towing vehicle and the towed vehicle,
the control unit changes a length of the connecting portion in the indicator based on the towed vehicle information.

4. The surroundings monitoring apparatus according to claim 2, wherein the indicator includes a connecting portion connecting between the towing vehicle and the towed vehicle,
the control unit changes a length of the connecting portion in the indicator based on the towed vehicle information.

5. The surroundings monitoring apparatus according to claim 1, wherein the towed vehicle information is information used for a process which is different from a process for displaying the display image, the towed vehicle information corresponding to a length obtained by subtracting a length between a connecting position of the towing vehicle and the towed vehicle and a rear end of the towing vehicle from a length between the rear end of the towing vehicle and an axle of the towed vehicle.

6. The surroundings monitoring apparatus according to claim 2, wherein the towed vehicle information is information used for a process which is different from a process for displaying the display image, the towed vehicle information corresponding to a length obtained by subtracting a length between a connecting position of the towing vehicle and the towed vehicle and a rear end of the towing vehicle from a length between the rear end of the towing vehicle and an axle of the towed vehicle.

7. The surroundings monitoring apparatus according to claim 1, wherein the control unit differentiates a display mode from the axle of the towed vehicle to the rear end of the towed vehicle from a display mode from the axle of the towed vehicle to a front end of the towed vehicle.

8. The surroundings monitoring apparatus according to claim 2, wherein the control unit differentiates a display mode from the axle of the towed vehicle to the rear end of the towed vehicle from a display mode from the axle of the towed vehicle to a front end of the towed vehicle.

* * * * *